United States Patent

[11] 3,593,309

[72] Inventors William A. Clark, IV
Poughkeepsie, N.Y.;
Kent A. Salmond, Los Gatos, Calif.;
Thomas S. Stafford, Boca Raton, Fla.

[21] Appl. No 788,807
[22] Filed Jan. 3, 1969
[45] Patented July 13, 1971
[73] Assignee International Business Machines Corporation
Armonk, N.Y.

[54] METHOD AND MEANS FOR GENERATING COMPRESSED KEYS
120 Claims, 55 Drawing Figs.

[52] U.S. Cl. .......... 340/172.5
[51] Int. Cl. .......... G11b 13/00
[50] Field of Search .......... 340/172.5; 235/157, 154

[56] References Cited

UNITED STATES PATENTS

| | | | |
|---|---|---|---|
| 3,185,823 | 5/1965 | Ellersick, Jr. et al. | 235/154 |
| 3,185,824 | 5/1965 | Blasbalg et al. | 235/154 |
| 3,223,982 | 12/1965 | Sacerdoti et al. | 340/172.5 |
| 3,225,333 | 12/1965 | Vinal | 340/172.5 |
| 3,237,170 | 2/1966 | Blasbalg et al. | 340/172.5 |
| 3,275,989 | 9/1966 | Glaser et al. | 340/172.5 |
| 3,278,907 | 10/1966 | Barry et al. | 340/172.5 |
| 3,289,169 | 11/1966 | Marosz | 340/172.5 |
| 3,413,611 | 11/1968 | Pfvetze | 340/172.5 |
| 3,422,403 | 1/1969 | Webb | 340/172.5 |
| 3,490,690 | 1/1970 | Apple et al. | 235/154 |

*Primary Examiner*—Raulfe B. Zache
*Attorneys*—Hanifin and Jancin and Bernard M. Goldman

ABSTRACT: Electronically compressing a sorted sequence of uncompressed keys, each having an associated pointer address for accessing the information represented by the key. Compression is by electronic transfer of the remaining part of any key after removing some or all of (1) high-order "factored" bytes, and (2) low-order "noise" bytes. The transferred parts of a key are delineated using an electronic device for comparing like-ordered bytes in their sorting order in adjacent uncompressed keys. The comparing device determines a difference-byte position as the highest-ordered unequal byte position in every pair of adjacent keys. The "noise" bytes are electronically sensed as the bytes having a lower-order than the difference byte. The "factored" bytes are electronically sensed at higher-order positions than the difference-byte; and they are vicariously represented in prior compressed keys due to the sorted nature of the key sequence. In some cases, the "-factored" bytes include the difference byte; and in other cases the "factored" bytes do not include all bytes having a higher-order than the difference-byte position. The pointer with each uncompressed key is associated with a related compressed key. A count field is generated with each compressed key to indicate the size of the factor field and number of transferred key bytes.

INVENTORS
WILLIAM A. CLARK
KENT A. SALMOND
THOMAS S. STAFFORD

BY Bernard M. Goldman

ATTORNEY

FIG.2A SEQUENCING AND BRANCHING CONTROLS (GENERAL)
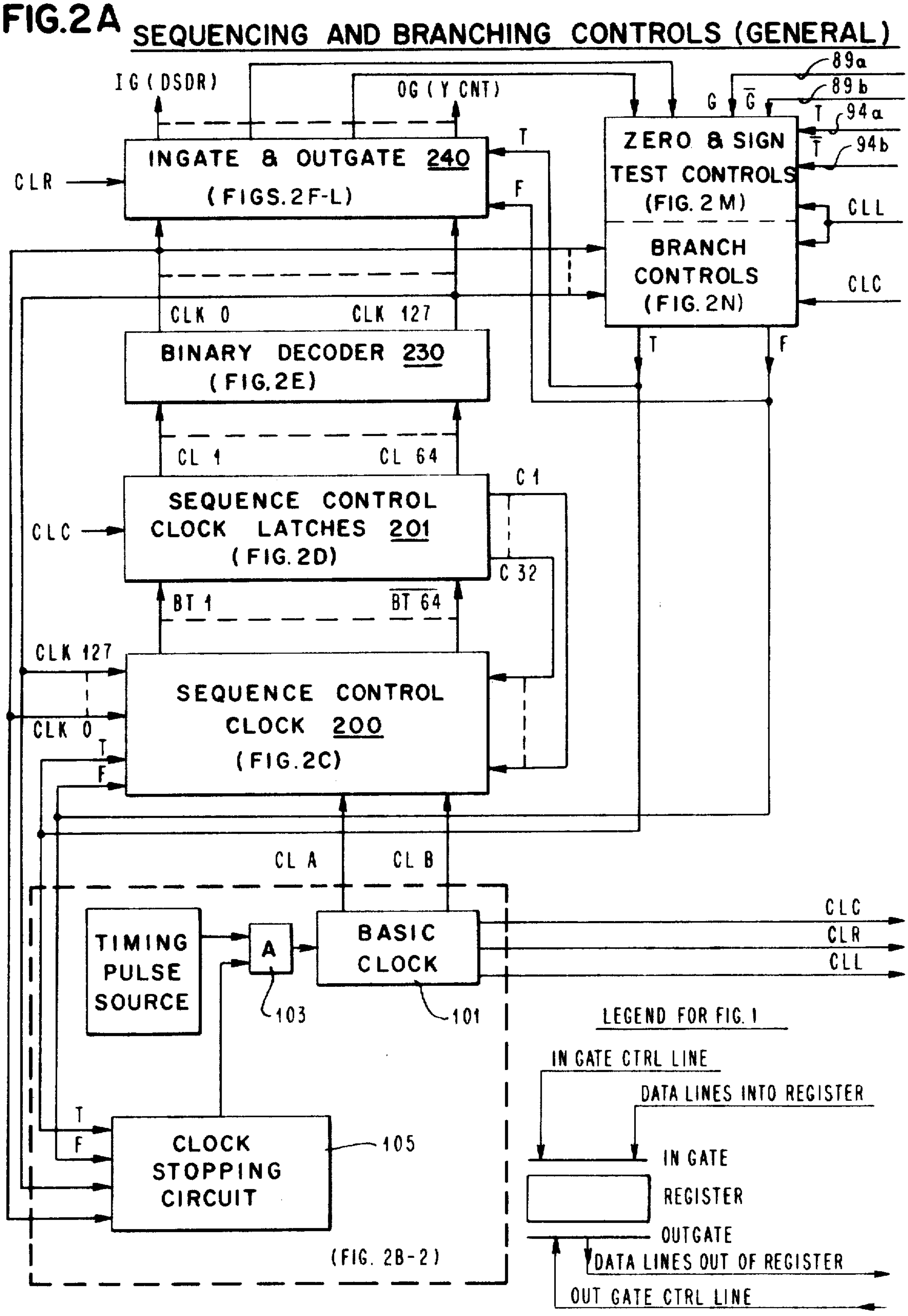

FIG. 2C-1 SEQUENCE CONTROL CLOCK 200
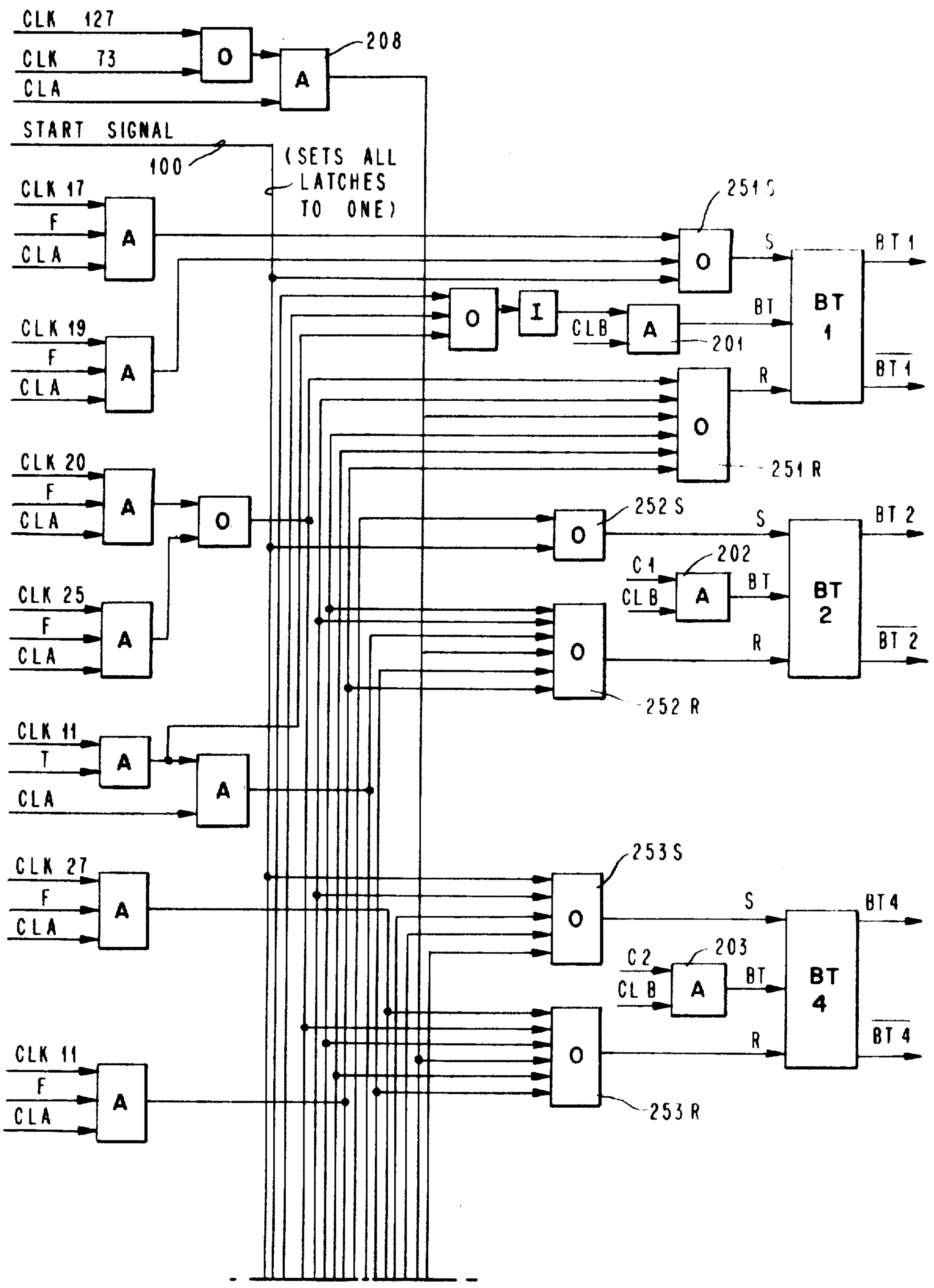

SEQUENCE CONTROL DECODER

ADDER INPUT A-BUS CONTROLS

FIG. 2H ADDER INPUT B-BUS CONTROLS
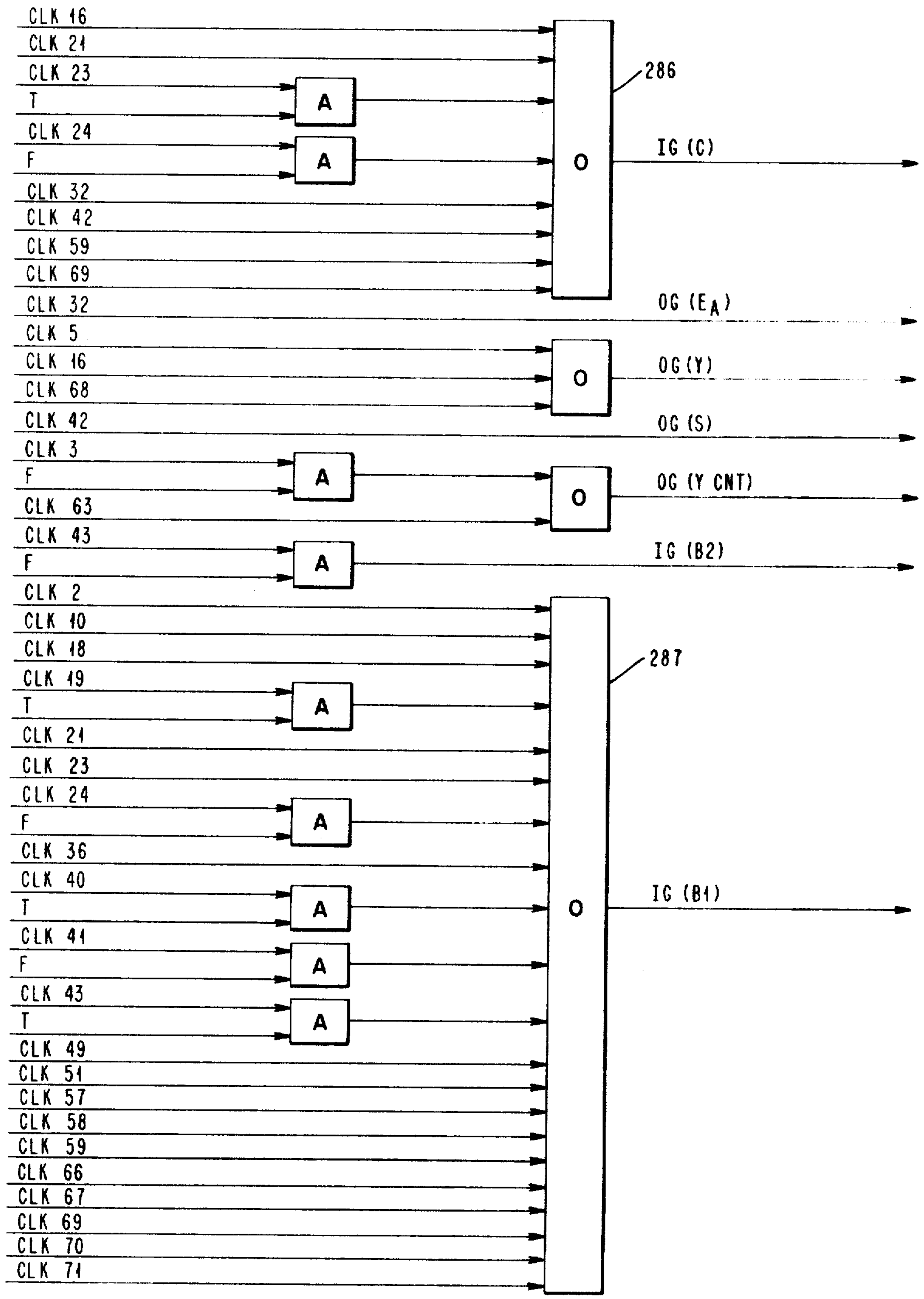

FIG. 2J SOURCE MEMORY ADDRESS BUS
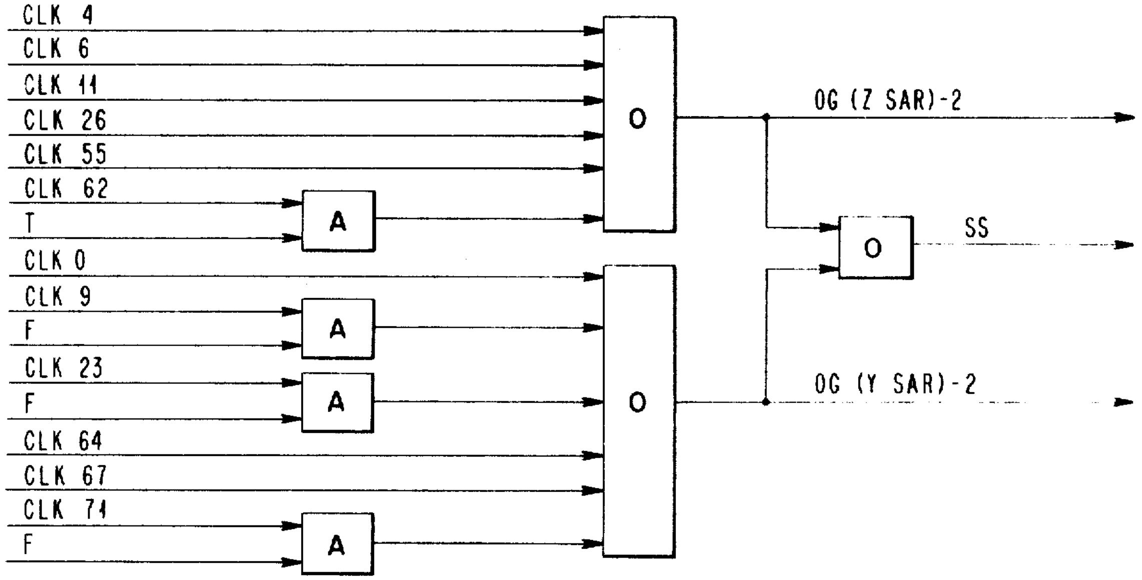
FIG. 2K SOURCE MEMORY OUTPUT CONTROLS
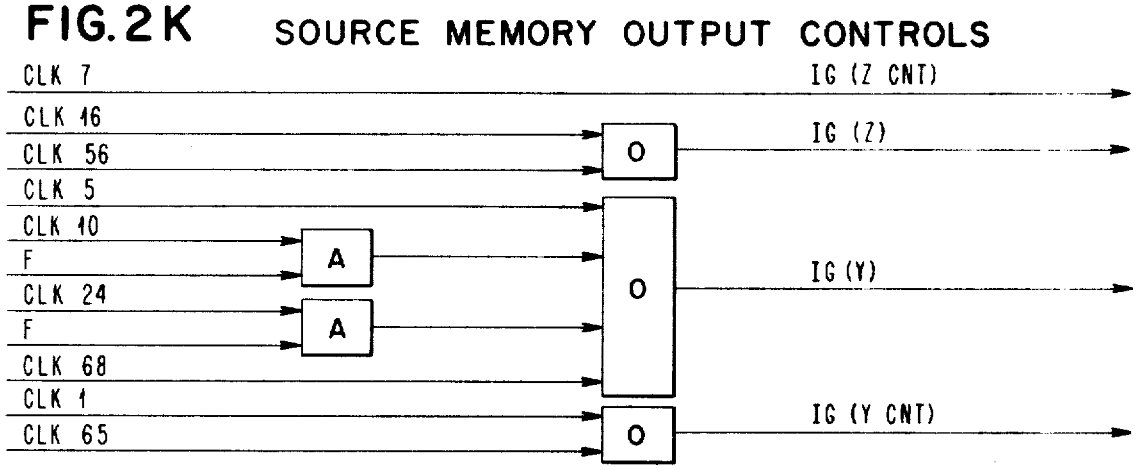
FIG. 2L DESTINATION MEMORY CONTROLS
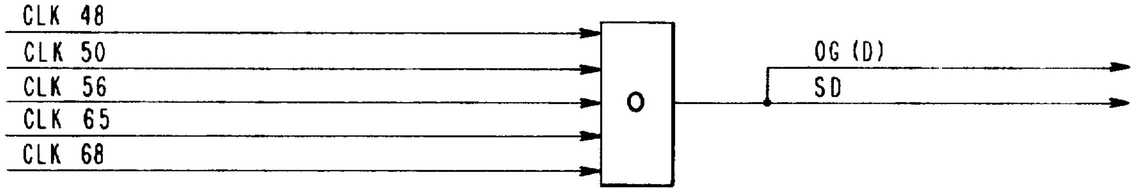

FIG. 2M TEST LOGIC IS FOR BRANCHING CONTROLS
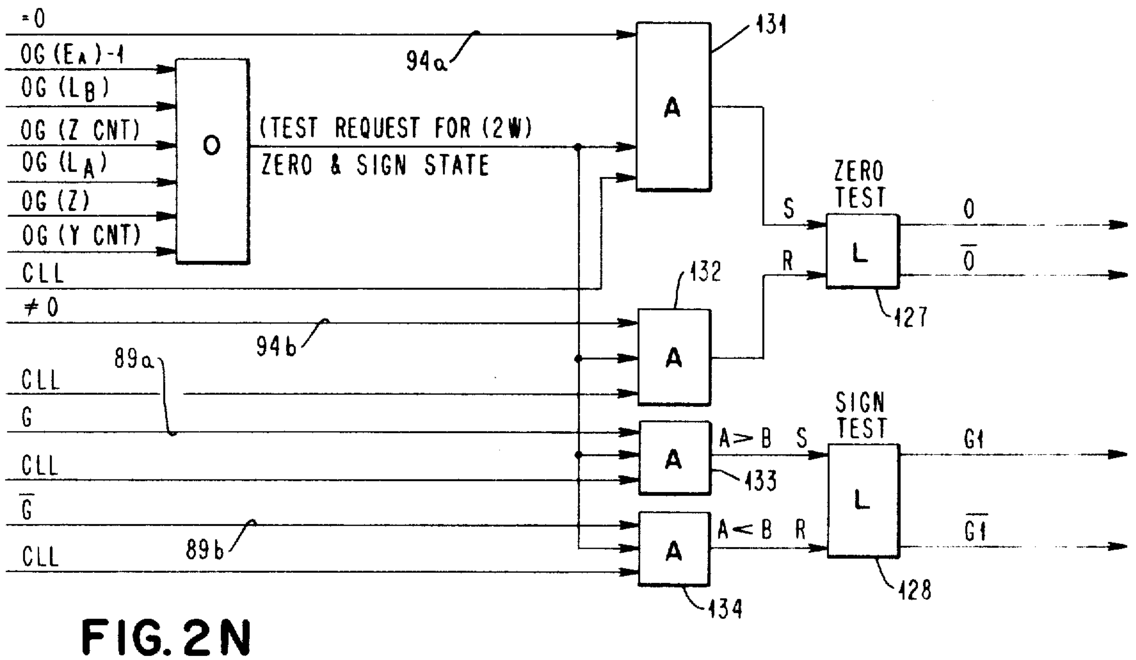
FIG. 2N
BRANCH CONTROLS
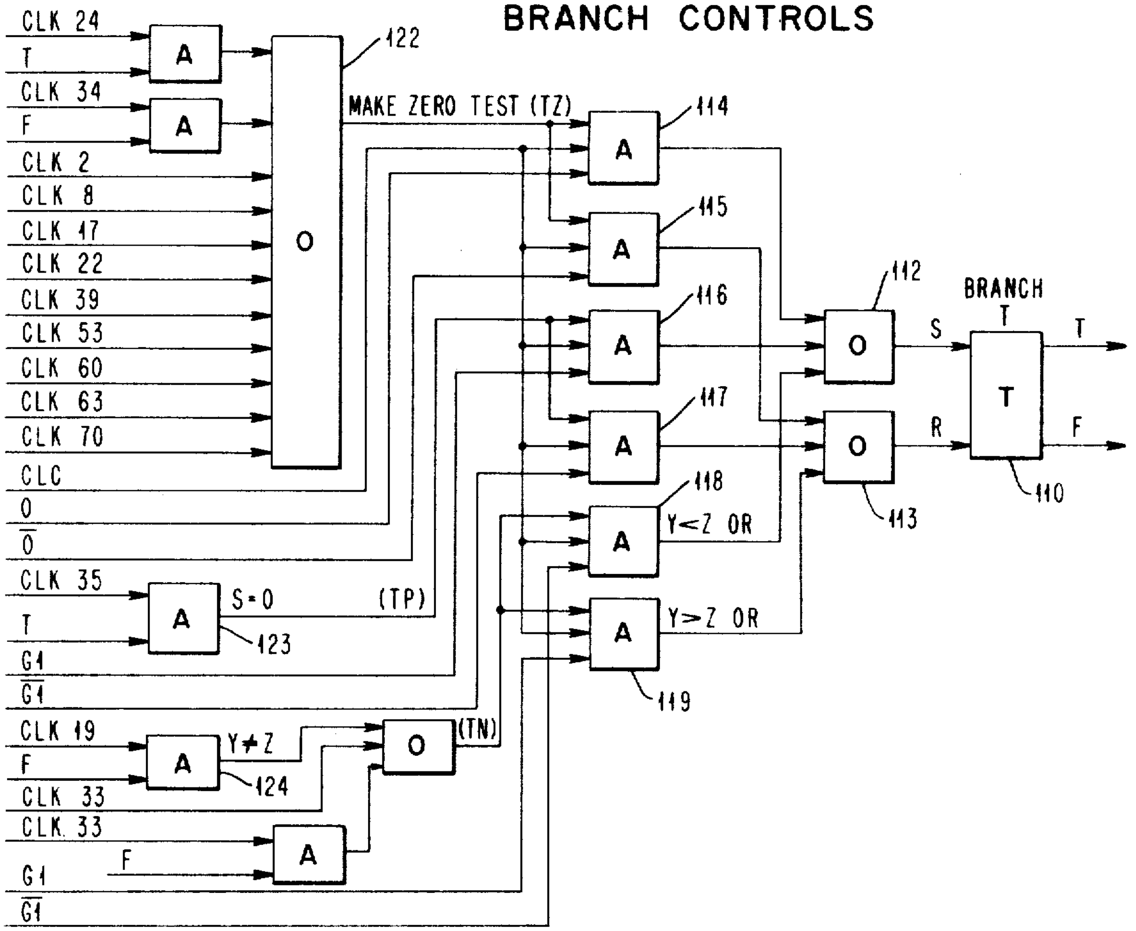

FIG. 2Q-1

CONTROL SIGNAL SEQUENCE CHART

| CLK Cycle | T | T or F | F |
|---|---|---|---|
| 127 | | RALL, INITIALIZE YSAR & DSAR. | |
| 0 | | OG(YSAR)-2, SS. | |
| 1 | | IG(YCNT)-2, OG(YCNT)-2. | |
| 2 | | TZ, OG(YSAR)-1, IG(B1). | |
| 3 | STOP. | | IG(YSAR), OG(YCNT)-1, OG(YSAR)-1. (Go to 4) |
| 4 | | IG(ZSAR), OG(ZSAR)-2, SS. | |
| 5 | | IG(Y), OG(Y), OG(ZSAR)-1. | |
| 6 | | IG(ZSAR), OG(ZSAR)-2, SS. | |
| 7 | | IG(ZCNT)-2, OG(ZCNT). | |
| 8 | | TZ. | |
| 9 | IG($L_B$). | | OG(YSAR)-2, SS. |
| 10 | IG($F_B$). | | OG(ZSAR)-1, IG(Y), IG(B1). |
| 11 | (Go to 48). | | IG(ZSAR), OG(ZSAR)-2, SS, (Go to 16). |
| 16 | | IG(Z), OG(Z), OG(Y), IG(C). | |
| 17 | | TZ. | |
| 18 | OG($E_B$), IG(B1). | | --- |
| 19 | IG($E_B$), OG(YSAR)-1, IG(B1), (Go to 21). | | TN. |
| 20 | STOP. | | (Go to 32). |
| 21 | | IG(YSAR), IG(B1), IG(C), OG(YCNT)-2. | |
| 22 | | IG(YCNT), TZ. | |
| 23 | OG(ZCNT), OG(B1), IG(C). | | OG(YSAR)-2, SS, OG(ZSAR)-1, IG(B1). |

FIG. 2Q-2

| CLK Cycle | T | T or F | F |
|---|---|---|---|
| 24 | IG(ZCNT), TZ. | | IG(Y), IG(ZSAR), IG(B1), OG(ZCNT), IG(C), (Go to 26). |
| 25 | STOP. | | (Go to 32). |
| 26 | | IG(ZCNT), OG(ZSAR)-2, TZ, SS. | |
| 27 | STOP. | | (Go to 16). |
| 32 | | OG($E_B$), OG($E_A$)-2, IG(C) | |
| 33 | | IG(S), TN. | |
| 34 | (Go to 36T). | | OG($L_A$), TZ |
| 35 | TP. | | (Go to 39). |
| 36 | IG($L_B$), OG($E_B$), IG(B1). | | IG(B1). |
| 37 | IG($F_B$), (Go to 48) | | IG($L_B$), OG($E_B$). |
| 38 | | IG($F_B$), (Go to 48). | |
| 39 | | TZ. | |
| 40 | OG(S)-1, IG(B1). | | OG(S)-1. |
| 41 | IG($L_B$), OG($E_A$)-1. | | IG($L_B$), OG($E_A$), IG(B1). |
| 42 | IG($F_B$), OG(ZSAR)-1 OG(S)-2, IG(C). | | IG($F_B$), OG(ZSAR)-1, OG(S)-2, IG(C). |
| 43 | IG(ZSAR), OG(ZSAR)-1, IG(B1). | | IG(ZSAR), OG(ZSAR)-1, IG(B2). |
| 44 | IG(ZSAR), (Go to 48). | | IG(ZSAR). (GO TO 48) |
| 48 | | OG(D), OG($L_B$). | |
| 49 | | IG(DSDR), OG(DSAR), IG(B1). | |
| 50 | | IG(DSAR), OG(D), OG($F_B$). | |
| 51 | | IG(DSDR), OG(DSAR), IG(B1). | |
| 52 | | IG(DSAR), OG($L_B$). | |

FIG. 2Q-3

| CLK Cycle | T | T or F | F |
|---|---|---|---|
| 53 | | TZ, IG($L_A$), OG($E_B$). | |
| 54 | IG($E_A$), (Go to 62). | | IG($E_A$). (Go to 55) |
| 55 | | OG(ZSAR)-2, SS. | |
| 56 | | IG(Z), OG(Z), OG(D), SD. | |
| 57 | | IG(DSDR), OG(ZSAR), IG(B1). | |
| 58 | | IG(ZSAR), OG(DSAR), IG(B1). | |
| 59 | | IG(DSAR), OG($L_B$), IG(B1), IG(C). | |
| 60 | | IG($L_B$), TZ. | |
| 62 | OG(YCNT)-2. | | OG(ZSAR)-2, SS, (Go to 56). |
| 63 | | OG(YSAR)-1, OG(YCNT)-1, TZ. | |
| 64 | OG(YSAR)-2, SS, (Go to 65). | | IG(YSAR), OG(YSAR)-2, SS. |
| 65 | | OG(YCNT)-2, IG(YCNT)-2, OG(D), SD. | |
| 66 | | IG(DSDR), OG(YSAR)-1, IG(B1). | |
| 67 | | IG(YSAR), OG(YSAR)-2, SS, OG(DSAR), IG(B1). | |
| 68 | | IG(DSAR), OG(D), SD, OG(Y). | |
| 69 | | OG(YCNT)-2, IG(B1), IG(C), IG(DSDR). | |
| 70 | | IG(YCNT)-1, IG(B1), OG(YSAR)-1, TZ. | |
| 71 | IG(YSAR), IG(B1), OG(DSAR). | | IG(YSAR), OG(YSAR)-2, SS, IG(B1), OG(DSAR), (Go to 68). |
| 72 | | IG(DSAR). | |
| 73 | | IG($E_B$), (Go to CLK 0). | |

FIG. 9

| KEY NO | UK FIELD 1 | 2 | 3 | 4 | 5 | 6 | 7 | 8 | 9 | 10 | 11 | 12 | 13 | 14 | $F_N$ | $F_X$ | L | POINTER FIELD 1 | 2 | 3 | 4 | 5 | 6 |
|---|---|---|---|---|---|---|---|---|---|---|---|---|---|---|---|---|---|---|---|---|---|---|---|
| 0 | B | B | B | B | B | B | B | B | B | B | B | B | B | B | 0 | 0 | 5 | R | R | R | R | R | R |
| 1 | B | B | B | B | D | B | B | B | B | B | B | B | B | B | 5 | 5 | 2 | R | R | R | R | R | R |
| 2 | B | B | B | B | B | B | D | B | B | B | B | B | B | B | 7 | 7 | 3 | R | R | R | R | R | R |
| 3 | B | B | B | B | B | B | B | B | B | D | B | B | B | B | 10 | 10 | 2 | R | R | R | R | R | R |
| 4 | B | B | B | B | B | B | B | B | B | B | B | D | B | B | 12 | 12 | 1 | R | R | R | R | R | R |
| 5 | B | B | B | B | B | B | B | B | B | B | B | B | D | B | 10 | 13 | 0 | R | R | R | R | R | R |
| 6 | B | B | B | B | B | B | B | B | B | D | B | B | B | B | 8 | 9 | 0 | R | R | R | R | R | R |
| 7 | B | B | B | B | B | B | B | D | B | B | B | B | B | B | 7 | 7 | 0 | R | R | R | R | R | R |
| 8 | B | B | B | B | B | B | D | B | B | B | B | B | B | B | 3 | 6 | 0 | R | R | R | R | R | R |
| 9 | B | B | D | B | B | B | B | B | B | B | B | B | B | B | 2 | 2 | 1 | R | R | R | R | R | R |
| 10 | B | B | D | B | B | B | B | B | B | B | B | B | B | B | 3 | 3 | 0 | R | R | R | R | R | R |
| 11 | B | B | D | B | B | B | B | B | B | B | B | B | B | B | 2 | 2 | 1 | R | R | R | R | R | R |
| 12 | B | B | D | B | B | B | B | B | B | B | B | B | B | B | 3 | 3 | 0 | R | R | R | R | R | R |
| 13 | B | B | D | B | B | B | B | B | B | B | B | B | B | B | 2 | 2 | 1 | R | R | R | R | R | R |
| 14 | B | B | D | B | B | B | B | B | B | B | B | B | B | B | 3 | 3 | 4 | R | R | R | R | R | R |
| 15 | B | B | B | B | B | B | D | B | B | B | B | B | B | B | 5 | 7 | 0 | R | R | R | R | R | R |
| 16 | B | B | B | B | D | B | B | B | B | B | B | B | B | B | 4 | 4 | 5 | R | R | R | R | R | R |
| 17 | B | B | B | B | B | B | B | B | D | B | B | B | B | B | 6 | 9 | 0 | R | R | R | R | R | R |
| 18 | B | B | B | B | B | D | B | B | B | B | B | B | B | B | 5 | 5 | 1 | R | R | R | R | R | R |
| 19 | B | B | B | B | B | D | B | B | B | B | B | B | B | B | 6 | 6 | 0 | R | R | R | R | R | R |
| 20 | B | B | B | B | B | D | B | B | B | B | B | B | B | B | 5 | 5 | 5 | R | R | R | R | R | R |
| 21 | B | B | B | B | B | B | B | B | B | D | B | B | B | B | 10 | 10 | 2 | R | R | R | R | R | R |
| 22 | B | B | B | B | B | B | B | B | B | B | B | D | B | B | 12 | 12 | 0 | R | R | R | R | R | R |
| 23 | B | B | B | B | B | B | B | B | B | B | B | D | B | B | 11 | 11 | 1 | R | R | R | R | R | R |
| 24 | B | B | B | B | B | B | B | B | B | B | B | D | B | B | 9 | 12 | 0 | R | R | R | R | R | R |
| 25 | B | B | B | B | B | B | B | B | D | B | B | B | B | B | 7 | 8 | 0 | R | R | R | R | R | R |
| 26 | B | B | B | B | B | B | D | B | B | B | B | B | B | B | 5 | 6 | 0 | R | R | R | R | R | R |
| 27 | B | B | B | B | D | B | B | B | B | B | B | B | B | B | 4 | 4 | 1 | R | R | R | R | R | R |
| 28 | B | B | B | B | D | B | B | B | B | B | B | B | B | B | 5 | 5 | 0 | R | R | R | R | R | R |
| 29 | B | B | B | B | D | B | B | B | B | B | B | B | B | B | 3 | 4 | 0 | R | R | R | R | R | R |
| 30 | B | B | D | B | B | B | B | B | B | B | B | B | B | B | 1 | 2 | 0 | R | R | R | R | R | R |
| 31 | D | B | B | B | B | B | B | B | B | B | B | B | B | B | 0 | 0 | 1 | R | R | R | R | R | R |
| 32 | D | B | B | B | B | B | B | B | B | B | B | B | B | B | 1 | 1 | 9 | R | R | R | R | R | R |
| 33 | B | B | B | B | B | B | B | B | B | D | B | B | B | B | 10 | 10 | 1 | R | R | R | R | R | R |
| 34 | B | B | B | B | B | B | B | B | B | B | D | B | B | B | 11 | 11 | 0 | R | R | R | R | R | R |
| 35 | B | B | B | B | B | B | B | B | B | B | D | B | B | B | 5 | 10 | 0 | R | R | R | R | R | R |
| 36 | B | B | B | B | D | B | B | B | B | B | B | B | B | B | 4 | 4 | 1 | R | R | R | R | R | R |
| 37 | B | B | B | B | D | B | B | B | B | B | B | B | B | B | 0 | 0 | 0 | R | R | R | R | R | R |

FIG. 10

| KEY NO | UK FIELD 1 | 2 | 3 | 4 | 5 | 6 | 7 | 8 | 9 | 10 | 11 | 12 | 13 | 14 | F | L | POINTER FIELD 1 | 2 | 3 | 4 | 5 | 6 |
|---|---|---|---|---|---|---|---|---|---|---|---|---|---|---|---|---|---|---|---|---|---|---|
| 0 | B | B | B | B | B | B | B | B | B | B | B | B | B | B | 0 | 5 | R | R | R | R | R | R |
| 1 | B | B | B | B | D | B | B | B | B | B | B | B | B | B | 5 | 2 | R | R | R | R | R | R |
| 2 | B | B | B | B | B | B | D | B | B | B | B | B | B | B | 7 | 3 | R | R | R | R | R | R |
| 3 | B | B | B | B | B | B | B | B | B | D | B | B | B | B | 10 | 2 | R | R | R | R | R | R |
| 4 | B | B | B | B | B | B | B | B | B | B | B | D | B | B | 12 | 1 | R | R | R | R | R | R |
| 5 | B | B | B | B | B | B | B | B | B | B | B | B | D | B | 10 | 0 | R | R | R | R | R | R |
| 6 | B | B | B | B | B | B | B | B | B | D | B | B | B | B | 8 | 0 | R | R | R | R | R | R |
| 7 | B | B | B | B | B | B | B | D | B | B | B | B | B | B | 7 | 0 | R | R | R | R | R | R |
| 8 | B | B | B | B | B | B | D | B | B | B | B | B | B | B | 3 | 0 | R | R | R | R | R | R |
| 9 | B | B | D | B | B | B | B | B | B | B | B | B | B | B | 2 | 1 | R | R | R | R | R | R |
| 10 | B | B | D | B | B | B | B | B | B | B | B | B | B | B | 2 | 1 | R | R | R | R | R | R |
| 11 | B | B | D | B | B | B | B | B | B | B | B | B | B | B | 2 | 1 | R | R | R | R | R | R |
| 12 | B | B | D | B | B | B | B | B | B | B | B | B | B | B | 2 | 1 | R | R | R | R | R | R |
| 13 | B | B | D | B | B | B | B | B | B | B | B | B | B | B | 2 | 1 | R | R | R | R | R | R |
| 14 | B | B | D | B | B | B | B | B | B | B | B | B | B | B | 3 | 4 | R | R | R | R | R | R |
| 15 | B | B | B | B | B | B | D | B | B | B | B | B | B | B | 5 | 0 | R | R | R | R | R | R |
| 16 | B | B | B | B | D | B | B | B | B | B | B | B | B | B | 4 | 5 | R | R | R | R | R | R |
| 17 | B | B | B | B | B | B | B | B | D | B | B | B | B | B | 6 | 0 | R | R | R | R | R | R |
| 18 | B | B | B | B | B | D | B | B | B | B | B | B | B | B | 5 | 1 | R | R | R | R | R | R |
| 19 | B | B | B | B | B | D | B | B | B | B | B | B | B | B | 5 | 1 | R | R | R | R | R | R |
| 20 | B | B | B | B | B | D | B | B | B | B | B | B | B | B | 6 | 4 | R | R | R | R | R | R |
| 21 | B | B | B | B | B | B | B | B | B | D | B | B | B | B | 10 | 2 | R | R | R | R | R | R |
| 22 | B | B | B | B | B | B | B | B | B | B | B | D | B | B | 11 | 1 | R | R | R | R | R | R |
| 23 | B | B | B | B | B | B | B | B | B | B | B | D | B | B | 11 | 1 | R | R | R | R | R | R |
| 24 | B | B | B | B | B | B | B | B | B | B | B | D | B | B | 9 | 0 | R | R | R | R | R | R |
| 25 | B | B | B | B | B | B | B | B | D | B | B | B | B | B | 7 | 0 | R | R | R | R | R | R |
| 26 | B | B | B | B | B | B | D | B | B | B | B | B | B | B | 5 | 0 | R | R | R | R | R | R |
| 27 | B | B | B | B | D | B | B | B | B | B | B | B | B | B | 4 | 1 | R | R | R | R | R | R |
| 28 | B | B | B | B | D | B | B | B | B | B | B | B | B | B | 4 | 1 | R | R | R | R | R | R |
| 29 | B | B | B | B | D | B | B | B | B | B | B | B | B | B | 3 | 0 | R | R | R | R | R | R |
| 30 | B | B | D | B | B | B | B | B | B | B | B | B | B | B | 1 | 0 | R | R | R | R | R | R |
| 31 | D | B | B | B | B | B | B | B | B | B | B | B | B | B | 0 | 1 | R | R | R | R | R | R |
| 32 | D | B | B | B | B | B | B | B | B | B | B | B | B | B | 1 | 9 | R | R | R | R | R | R |
| 33 | B | B | B | B | B | B | B | B | B | D | B | B | B | B | 10 | 1 | R | R | R | R | R | R |
| 34 | B | B | B | B | B | B | B | B | B | B | D | B | B | B | 10 | 1 | R | R | R | R | R | R |
| 35 | B | B | B | B | B | B | B | B | B | B | D | B | B | B | 5 | 0 | R | R | R | R | R | R |
| 36 | B | B | B | B | D | B | B | B | B | B | B | B | B | B | 4 | 1 | R | R | R | R | R | R |
| 37 | B | B | B | B | D | B | B | B | B | B | B | B | B | B | 0 | 0 | R | R | R | R | R | R |

| CLK Cycle | T | T or F | F |
|---|---|---|---|
| 127, 0-35 | (Same as CLK 127, 0-35 in Figures 2Q-1 and 2). | | |
| 36 | IG($L_B$), OG($E_A$), IG(B1). | | IG(B1). |
| 37 | IG($F_B$), OG($L_A$), (Go to 45). | | IG($L_B$), OG($E_B$) |
| 38-44 | (Same as CLK 38-44 in Figure 2Q-2). | | |
| 45 | | TZ | |
| 46 | OG($E_A$). | | (Go to 48) |
| 47 | | IG($F_B$). | |
| 48-72 | (Same as CLK 48-72 in Figures 2Q-2 and 3). | | |

(MODIFICATION OF FIG. 2F-1)

(MODIFICATION OF FIG. 2G-2)

(MODIFICATION OF FIG. 2N)

METHOD AND MEANS FOR GENERATING COMPRESSED KEYS

This invention relates generally to information retrieval and particularly to a new electronically controlled method and means for generating machine-readable indexes for use in the retrieval of information. The method and means for machine-use of indexes generated by the invention in this application are disclosed and claimed in another U.S. Pat. application Ser. No. 788,835 (P09–68–024B) filed on the same day as the subject application, by the same inventors, and is owned by the same assignee.

We live in an information explosion era. Information of every sort is being generated at an ever increasing rate. It is becoming ever more apparent that a bottleneck sometimes exists in not being able to quickly retrieve an item of information from the mass of information in which it is buried. Although much work has been done on information retrieval, no overall solution has been found thus far, even though many sophisticated information retrieval techniques have been conceived for accessing of information involving large numbers of documents or records.

Within the information retrieval environment, the invention relates to a tool useful in controlling a machine to locate documents indexed by keys. Any type of keys arranged in sorted sequence can be handled by this invention, which is not concerned with the choice of the keys per se. The invention only requires that each key have with it an indication of the location of the item it represents. The location information may be an attached address, pointer, or may be derivable from the key itself by means not part of this invention.

The subject invention is inclusive of an inventive algorithm which greatly improves the speed of searching a sorted index by generating a compressed index from the sorted index, so that searching is thereafter done in the compressed index in a hierarchical manner.

Many different methods and means for searching an uncompressed sorted index are known and have been researched in the past. Uncompressed index searching is being electronically performed with computer systems, using special access methods, control means, and cataloging techniques. U.S. Pat. Nos. 3,315,233 to R. De Camp et al.; and 3,366,918 to R. Rice et al.; 3,242,470 to Hagelbarger et al.; and 3,030,609 to Albrecht are examples of the state of the Art.

Current computer information retrieval is limited in a number of ways, among which is the very large amount of storage required by current indexing search techniques, and the need to scan a large number of entries having a large number of bytes per entry before a search argument can be found. This is time consuming and costly per search of a large index. It is this area which is attacked by the subject invention. It can greatly reduce the number of bytes per entry in the searched index. This results in smaller search-storage requirements and faster searching due to less bytes needing to be machine-sensed.

Current electronic computer search techniques, such as in the above cited patents, have uncompressed keys accompanying records on a disc or drum for indexing the subject matter contained in the associated record. A search for the associated record may be done either by the key or by the address of the record. For example in U.S. Pat. Nos. 3,350,693; 3,343,134; 3,344,402; 3,344,403 and 3,344,405 uncompressed key can be indexed on a magnetically recorded disc. A key can be electronically scanned by a search argument for a compare-equal condition. Upon having a compare-equal condition, a pointer (address) associated with the respective uncompressed key is obtained and used to retrieve the record represented by the key which may be elsewhere on the disc. This pointer, for example, may include the location on the disc device, or on another device, where the record is recorded. The computer system can thereby automatically access the addressed record. After being located, the record may be used for any required purpose.

This invention pertains to the compression of a sorted index by uniquely removing a type of redundancy attributable to the sorted characteristic of an index. The methods of this invention for sorting-redundancy removal are not directly applicable to unsorted information.

The prior art on redundancy removal has not recognized the removal of sorting-induced redundancy. Hence the methods of this invention do not overlap prior art redundancy-removal or data-compression techniques.

Examples of other types of prior compression techniques are found in: U.S. Pat. Nos. 2,978,535 (E. F. Brown) and 3,225,333 (A. W. Vinal) on digitized TV signals; 3,185,824 (H. Blasbalg) and 3,185,123 (F. W. Ellersick, Jr.) on counting numbers of mismatches between successive frames of a digital communication signal; 3,237,170 (H. Blasbalg) for coding repetitious bit patterns; 3,275,989 (E. L. Glaser et al.) relates to commands which only contain that portion which is changed from the previous command; 3,223,982 (G. Sacerdoti et al.) relates to the use of the changed part of an address in relation to the prior address; 3,278,907 (H. J. Barry et al.) for time compressing Doppler radar signals, and 3,490,690 by C. T. Apple et al. (assigned to the same assignee as the subject application) relates to a technique for reducing test data.

Many of the above patents pertain to data compression techniques which are intended to be reversible. That is, they compress the data, transmit it, and reconstruct the original uncompressed data from the received compressed data. Reversibility is not a requirement with the subject invention, because the primary purpose of index compression is fast searchability, rather than index reconstruction.

It is therefore an object of this invention to provide a key compression method and system which can greatly reduce the amount of immediate storage needed for a machine searchable index.

It is another object of this invention to provide a key compression method and system which can translate a sorted source index into a compressed form which greatly reduces the number of bytes needed to be machine scanned during a search. This greatly increases the machine search speed in relation to the speed of searching the sorted uncompressed source index at the same machine byte rate.

It is a more specific object of this invention to generate a compressed index in which the size of each key entry is in a compressed form. Each compressed entry has a byte length which is largely independent of the length of the entry's corresponding uncompressed key. For example, an uncompressed key which is hundreds or thousands of bytes long might be represented as a compressed key having a single byte in the compressed index. The amount of index compression is primarily dependent on the "rightness" of the index, that is the amount of variation in the sorted relationship among the uncompressed keys in the index.

The invention requires as its input a sorted sequence of uncompressed keys with associated locators of the data items represented by the keys. The locators may be pointer addresses next to their respective keys. The keys and their associated pointers may be collected and sorted by means known in the art which is not part of the subject invention. Hence the input to the invention may be a sorted sequence of uncompressed keys, each followed or preceded by its respective location pointers.

The invention uses an electronic comparing device for comparing adjacent Uncompressed Keys (UK's) in the sorted order of the index. Initially the first two keys are compared as the first pair, then the second and third keys are compared as the second pair, the third and fourth keys as the third pair, etc., until every pair of keys in the index is compared. A Compressed Key (CK) is generated from each comparison of a pair of UK's. The pointer associated with one of the UK's in a pair (preferably with the first UK) is associated with the CK generated from that pair. The comparison is between like-ordered byte-positions in the pair of UK's and extends from their highest-order byte position through their highest-order unequal byte position, which may be called the "difference"

byte position. In the preferred form of the invention, the byte comparison of a pair need not extend beyond the "difference" byte position. In special cases, it can also be the highest-order byte position of a pair of UK's. An electronic counter means retains an "equal-count" of the number of byte positions which compare-equal in the compared pair. The "equal-count" is retained for generating a byte-location field in the current CK. The "equal-count" is also retained during the next pair comparison for controlling the generation of the next CK, according to whether the next "equal-count" is equal to, greater than, or less than its prior "equal-count." This equal-count relationship categorizes the next CK into one of three types: right-shift, no-shift, and left-shift. The right-shift CK receives one or more bytes from one of the two UK's in the compared pair, preferably from the second UK of the pair. The left-shift CK need not have any bytes transferred from any UK. A no-shift CK has not more than one K byte derived from one of the UK's in the pair, preferably the second UK. A sequence of no-shift CK's alternately has one K byte and no K byte, etc. The choice of one or no K byte is respectively dependent on and opposite from the adjacent prior CK having none or at least one K byte. Each CK must also indicate the location of its K byte (s) in relation to the UK from which they were derived. This may be done by providing each CK with two count fields, comprising a "factor-byte count," and a "K-byte count." The "factor-byte count" for CK's having K bytes is the number of byte positions having a higher-order than the K bytes in the UK from which the K bytes were derived. For CK's not having any K byte, the "factor-byte count" locates the "difference" byte position, which is at the "equal-count" plus 1. The "K-byte count" is the number of K bytes in the CK. In CK's not having any K bytes or factor bytes, the nonexistence of each is indicated.

The minimum K-byte requirements are defined in the prior paragraph. Any number of additional bytes from the same UK may be transferred to a CK as K bytes as long as the additional bytes maintain the same relative order as K bytes as they had in the UK. Such additionally transferred bytes will have redundant characteristics, but a degree of redundancy may be desirable under certain conditions.

The foregoing and other objects, features and advantages of the invention will be apparent from the following more particular description of preferred embodiments of the invention, as illustrated in the accompanying drawings.

FIG. 1 illustrates a first data path embodiment of the invention;

FIG. 2A shows a layout for a Sequencing and Branching Control embodiment for use in FIG. 1;

FIGS. 2B-1 and 2B-2 illustrate Clock timing waveforms and a Clock circuit for use in FIG. 2A;

FIGS. 2C-1, 2C-2, 2D, 2E, 2F-1, 2F-2, 2G-1, 2G-2, 2H, 2J, 2K, 2L, 2M and 2N illustrate one embodiment of circuits used in the Sequencing and Branching Controls represented in FIG. 2A;

Figure 4:
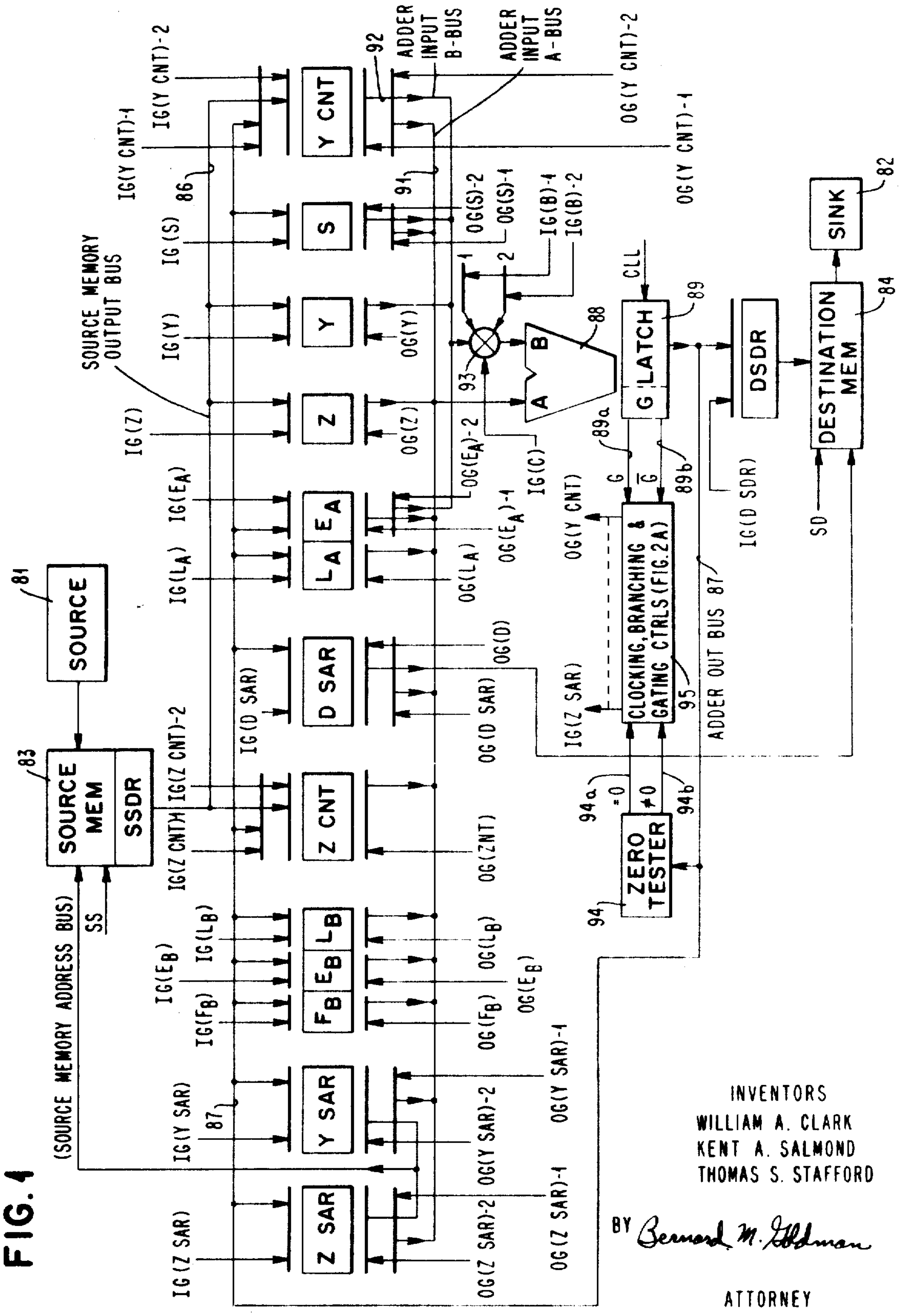
Figures 1, 2B:
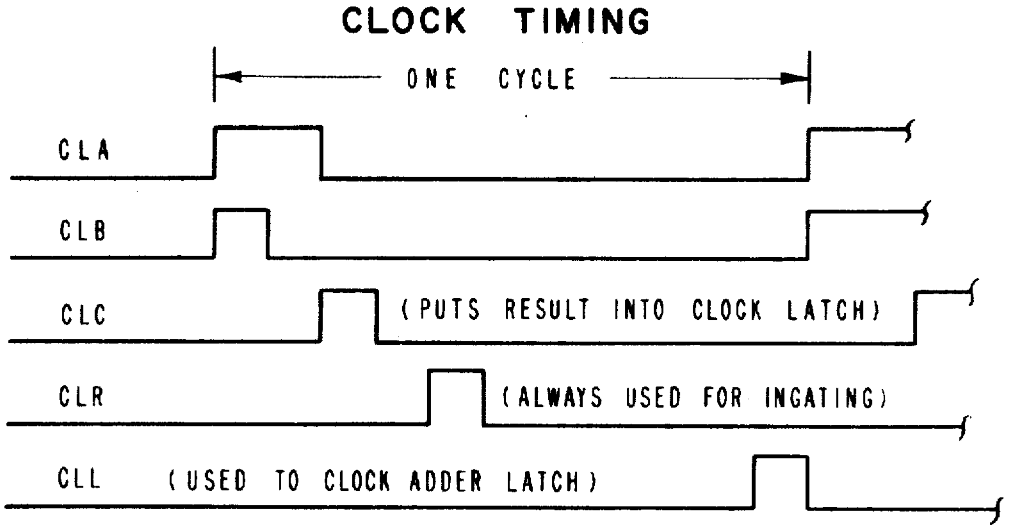
Figures 2, 2B:
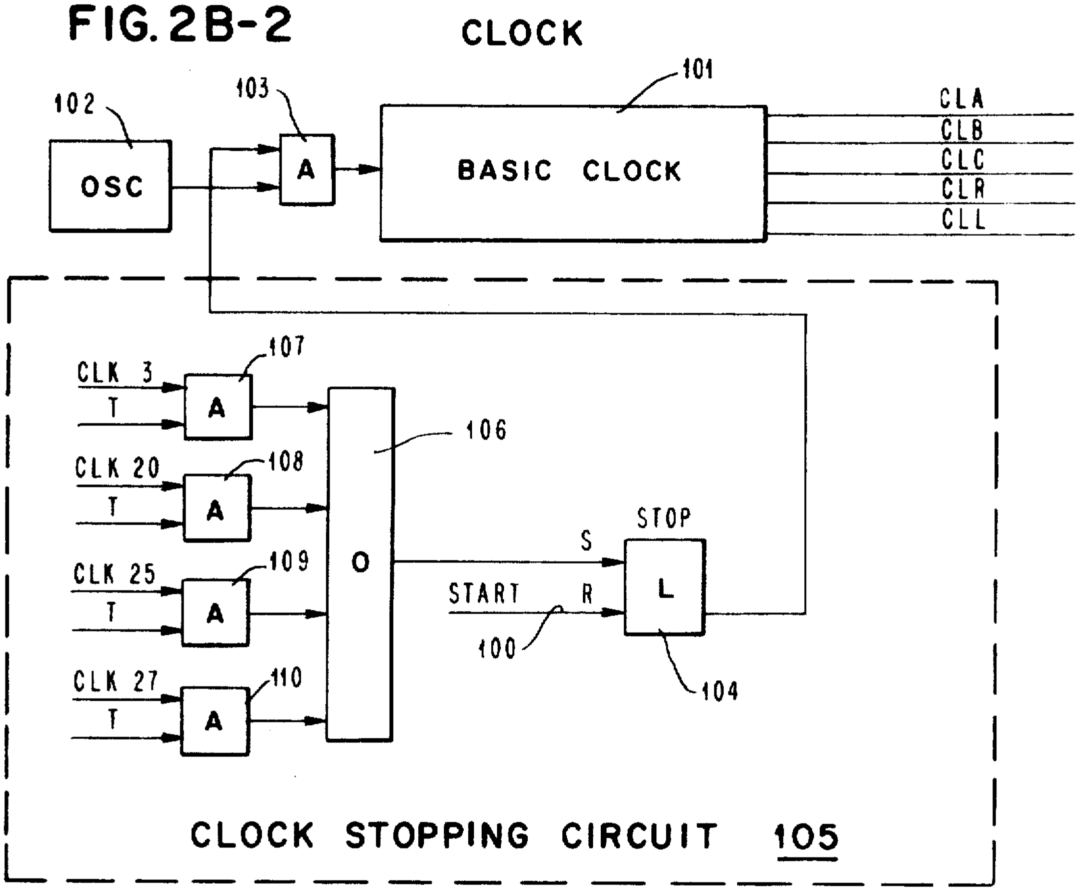
Figures 2, 2C:
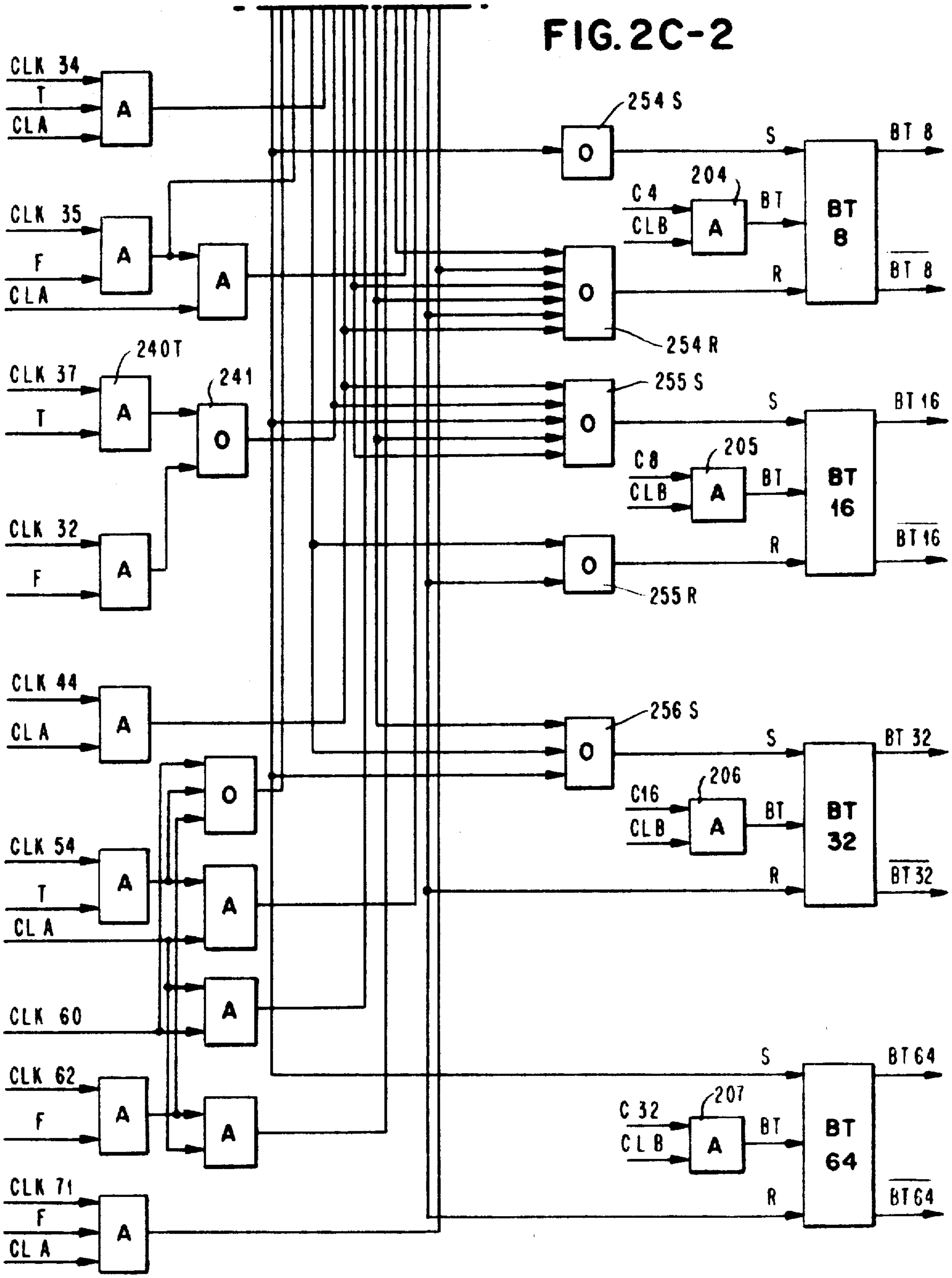
Figures 3, 3A:
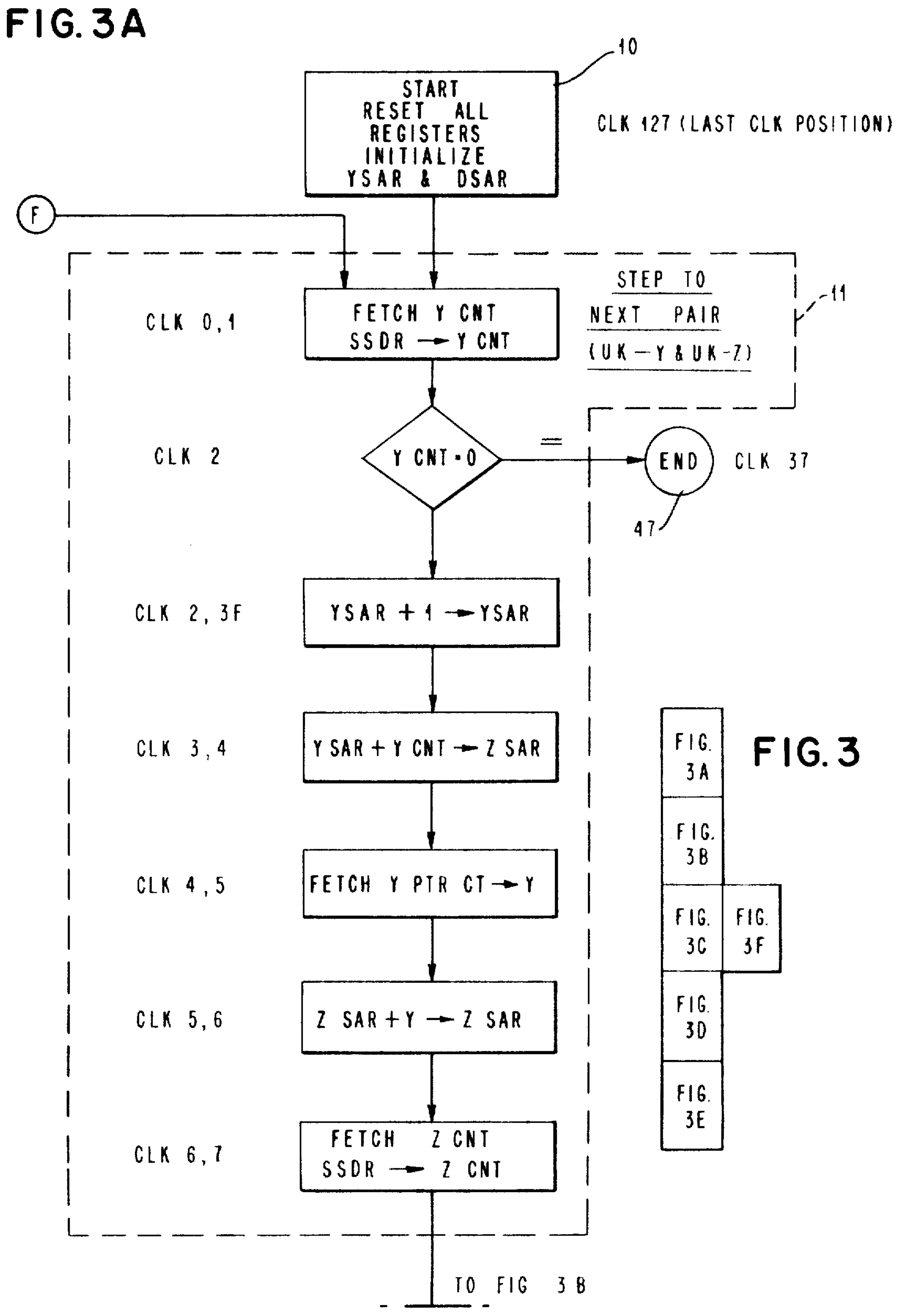
Figure 3B:
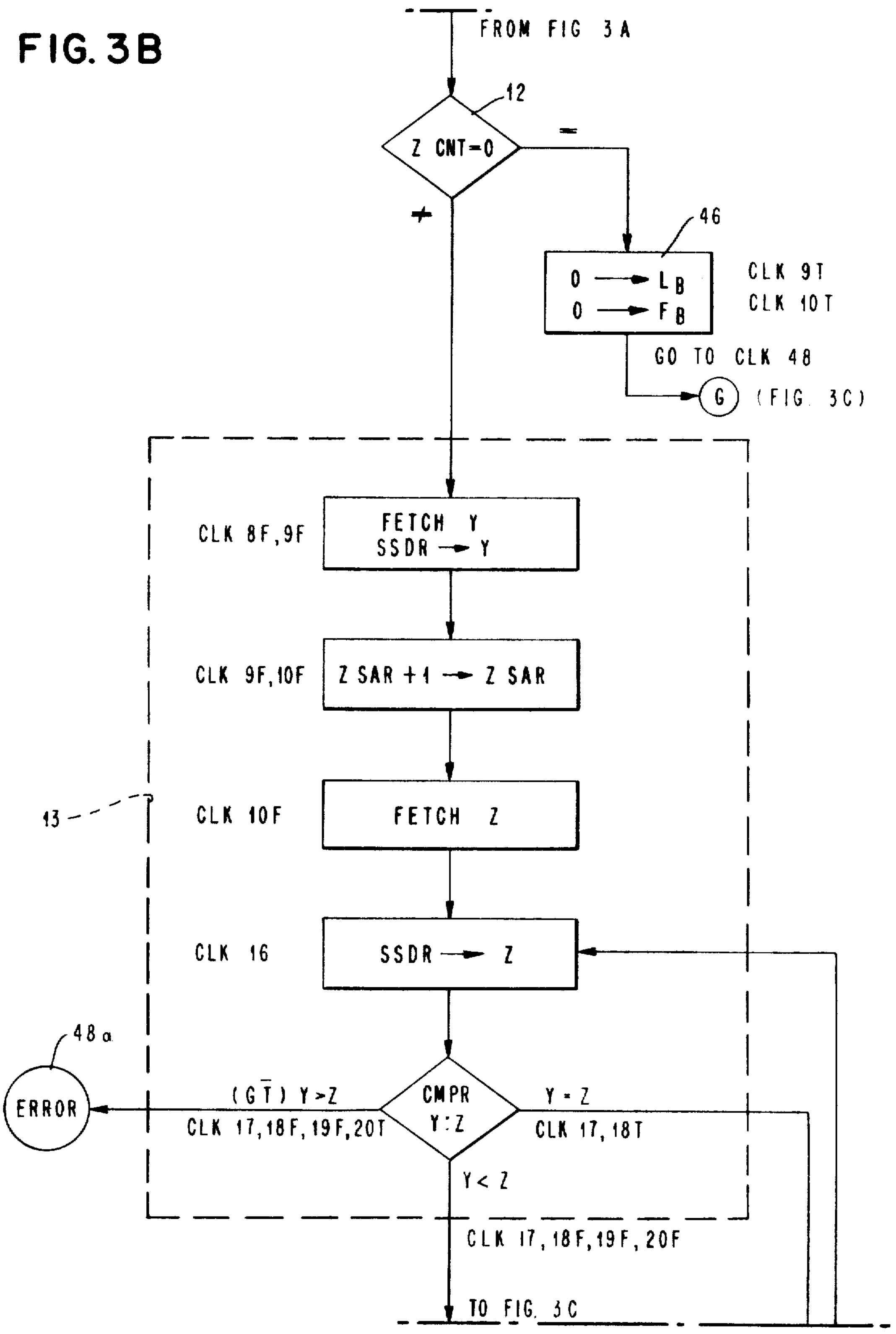
Figure 3C:
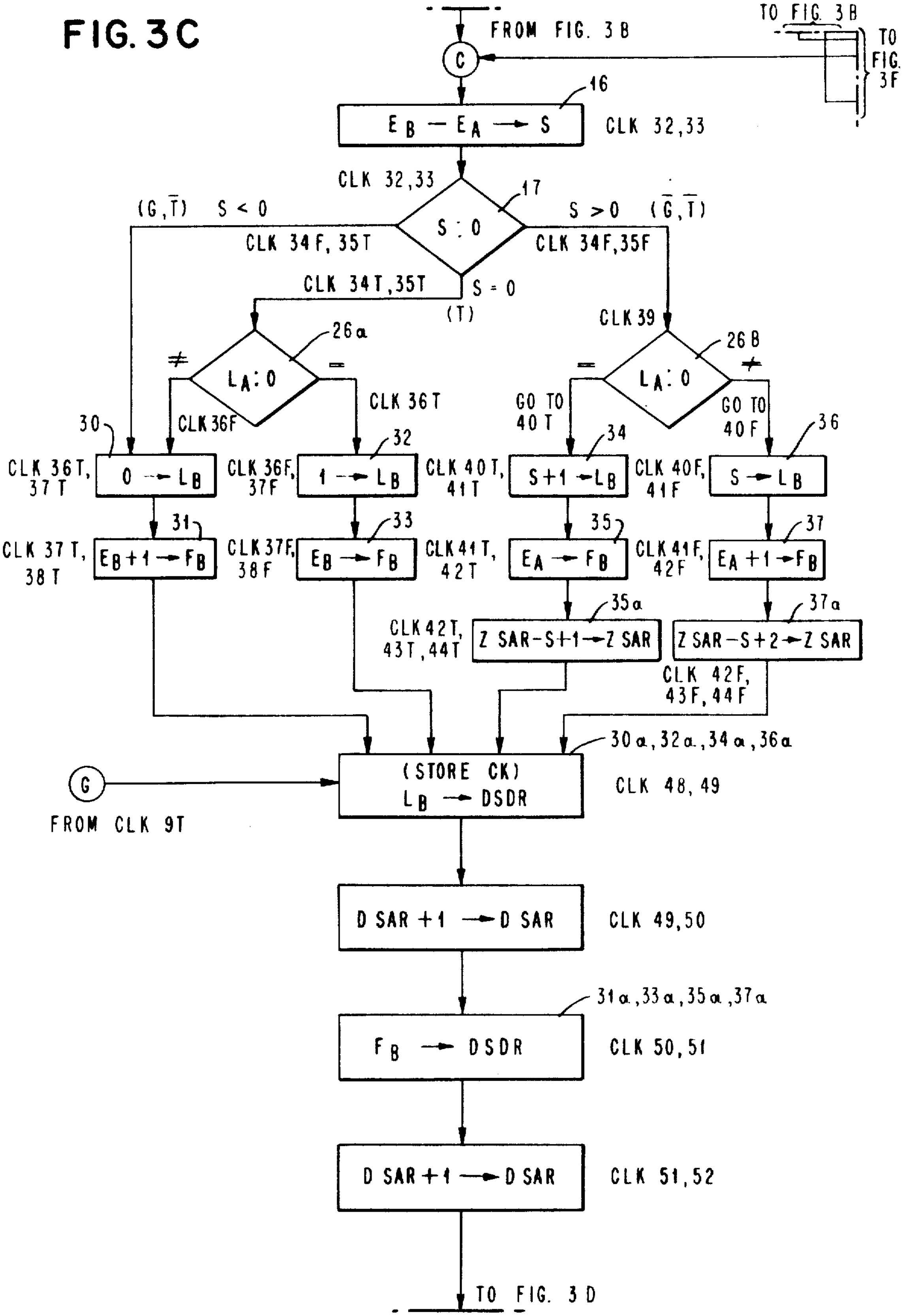
Figure 3D:
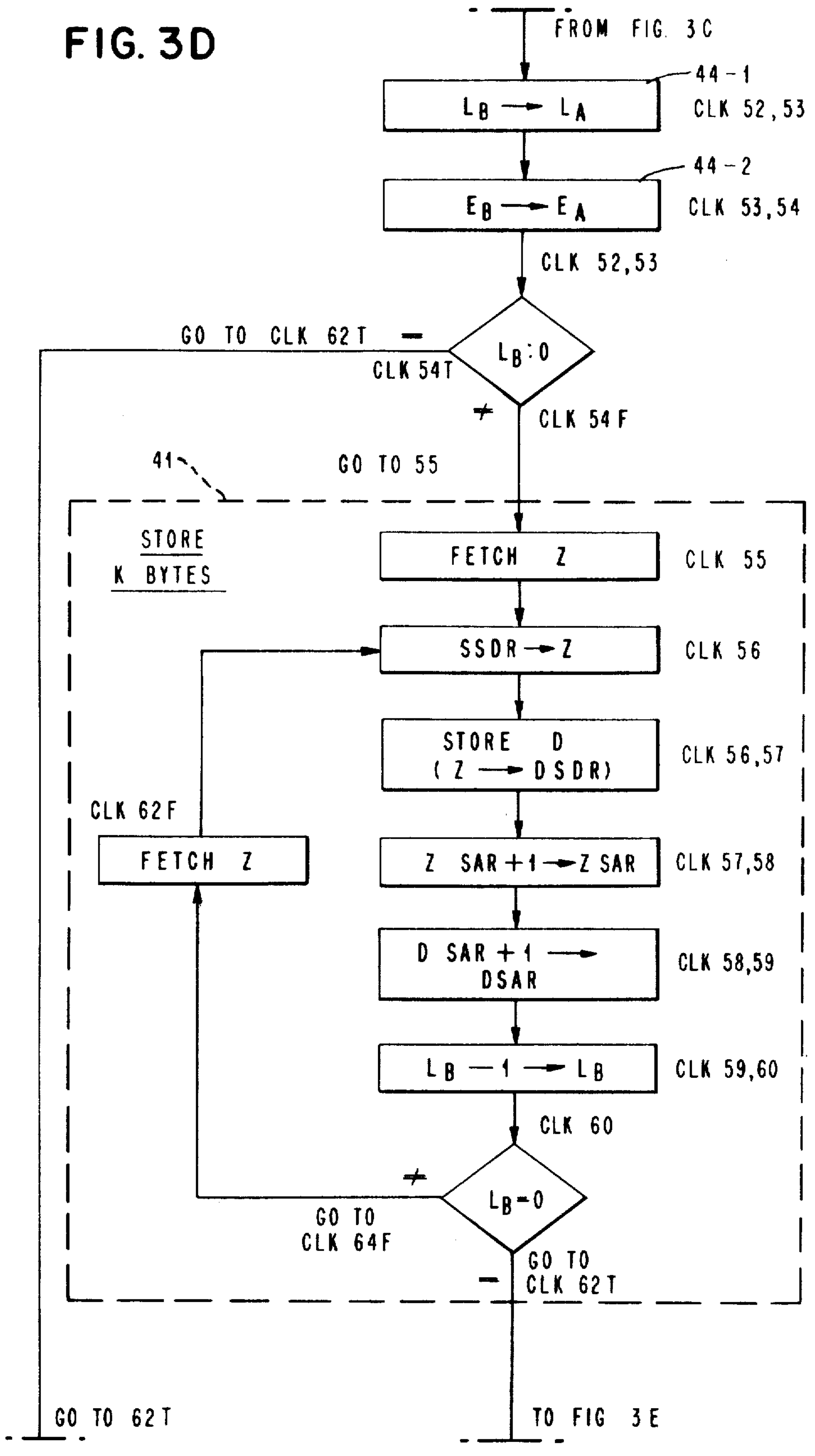
Figure 3E:
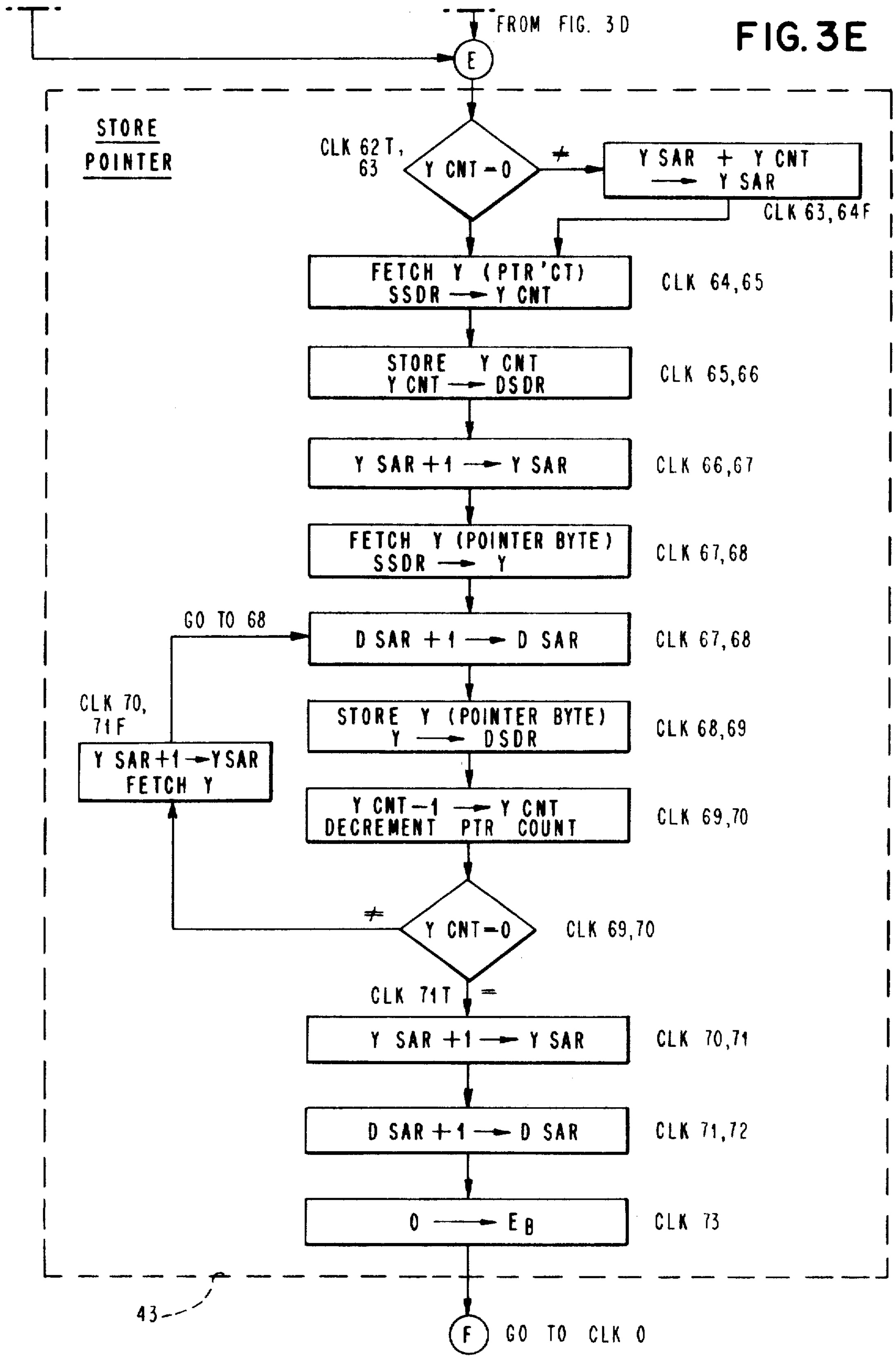
Figure 3F:
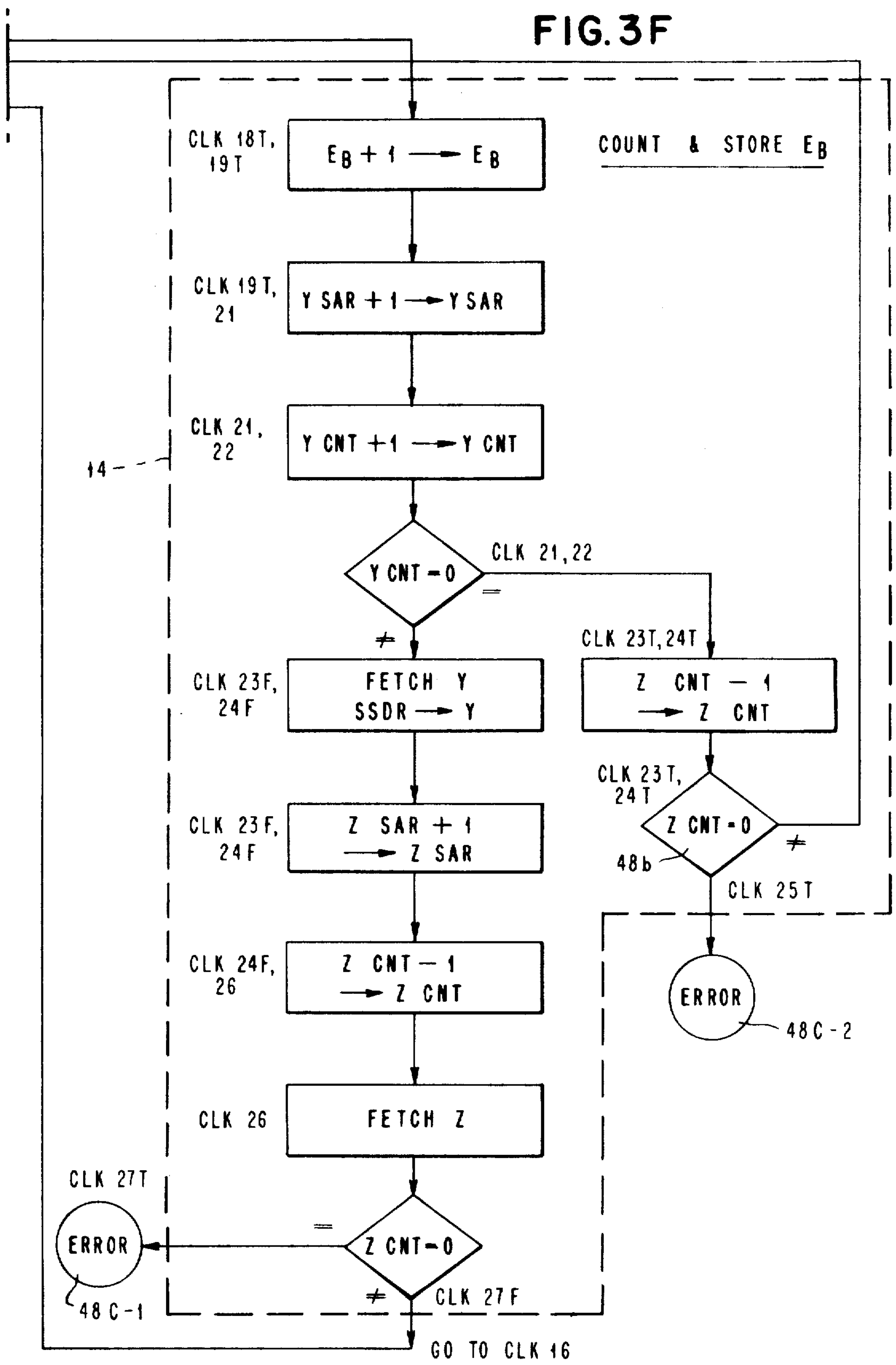
Figure 4:
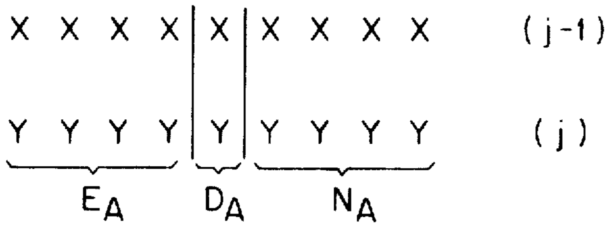
Figure 5:
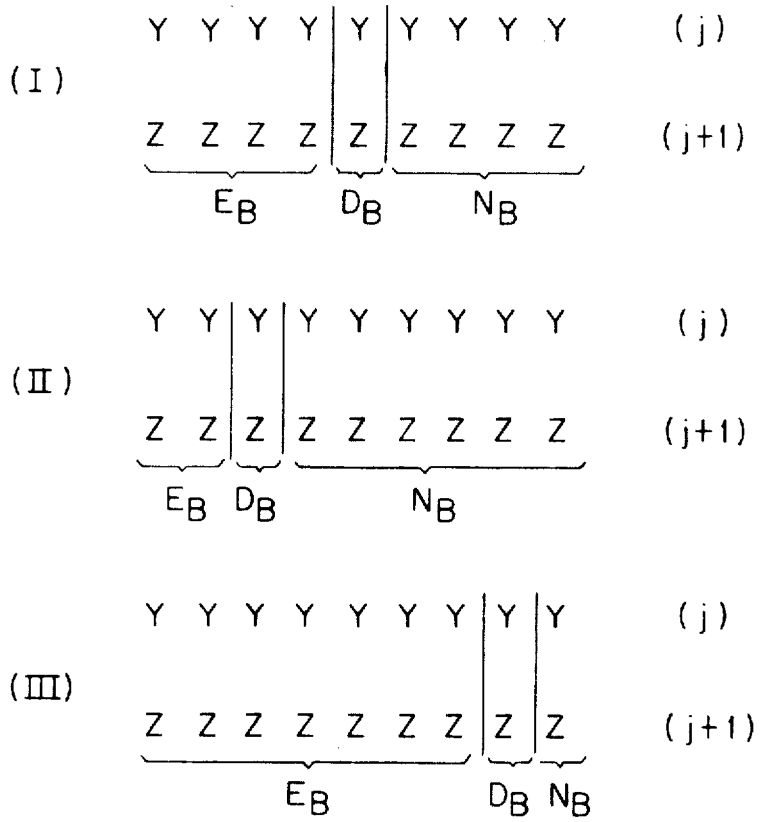
Figure 6A:
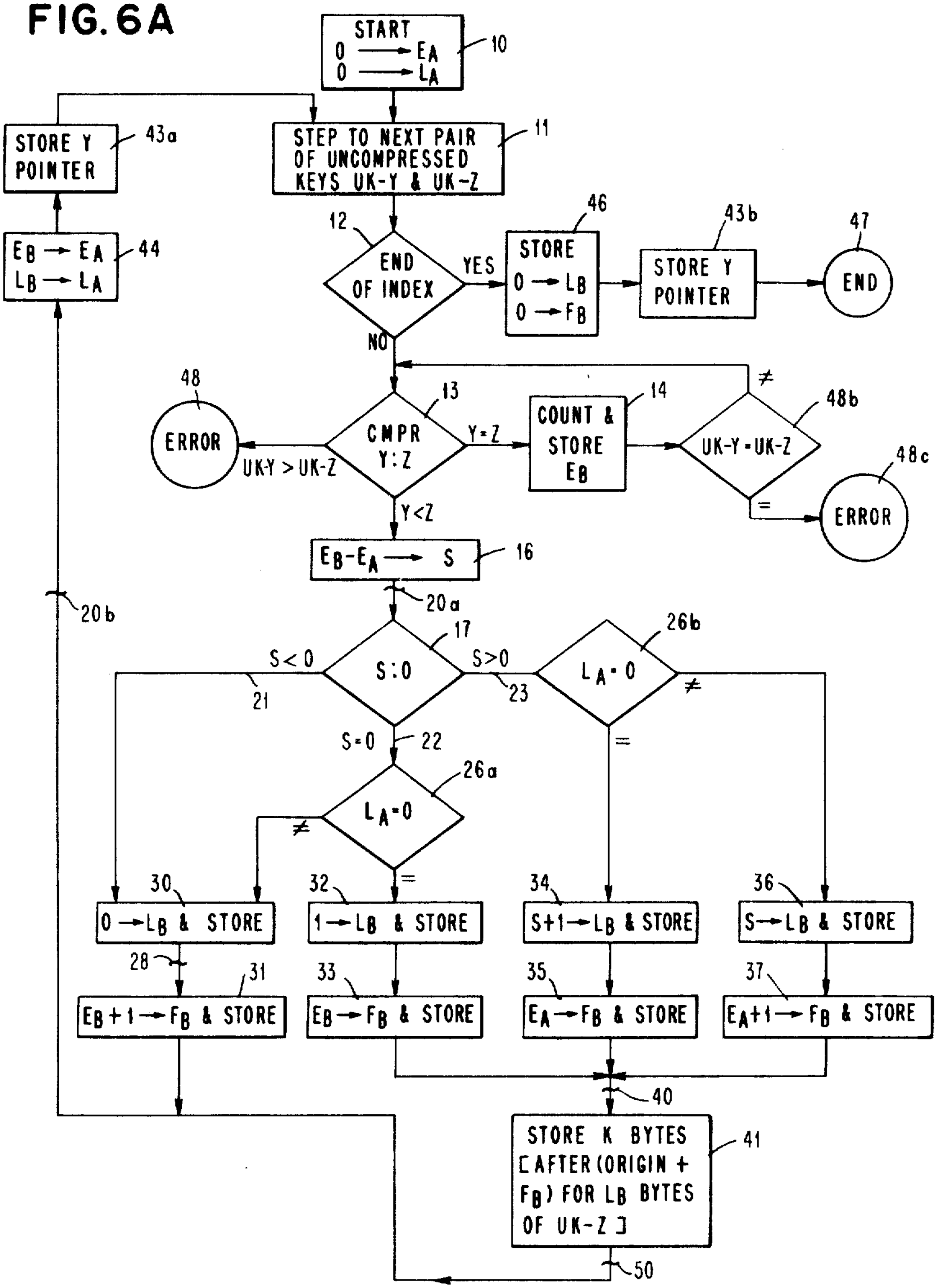
Figure 6B:
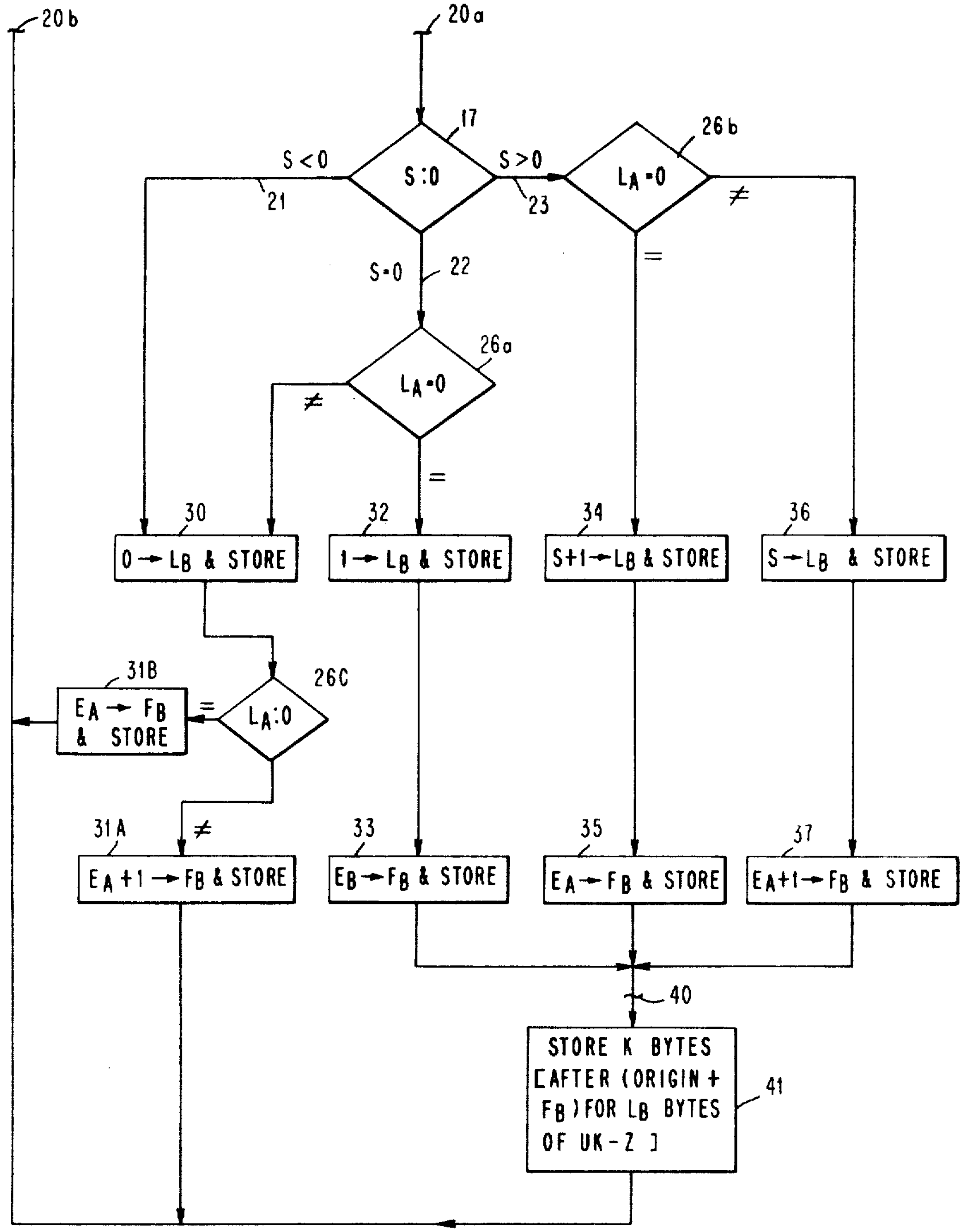
Figure 7:
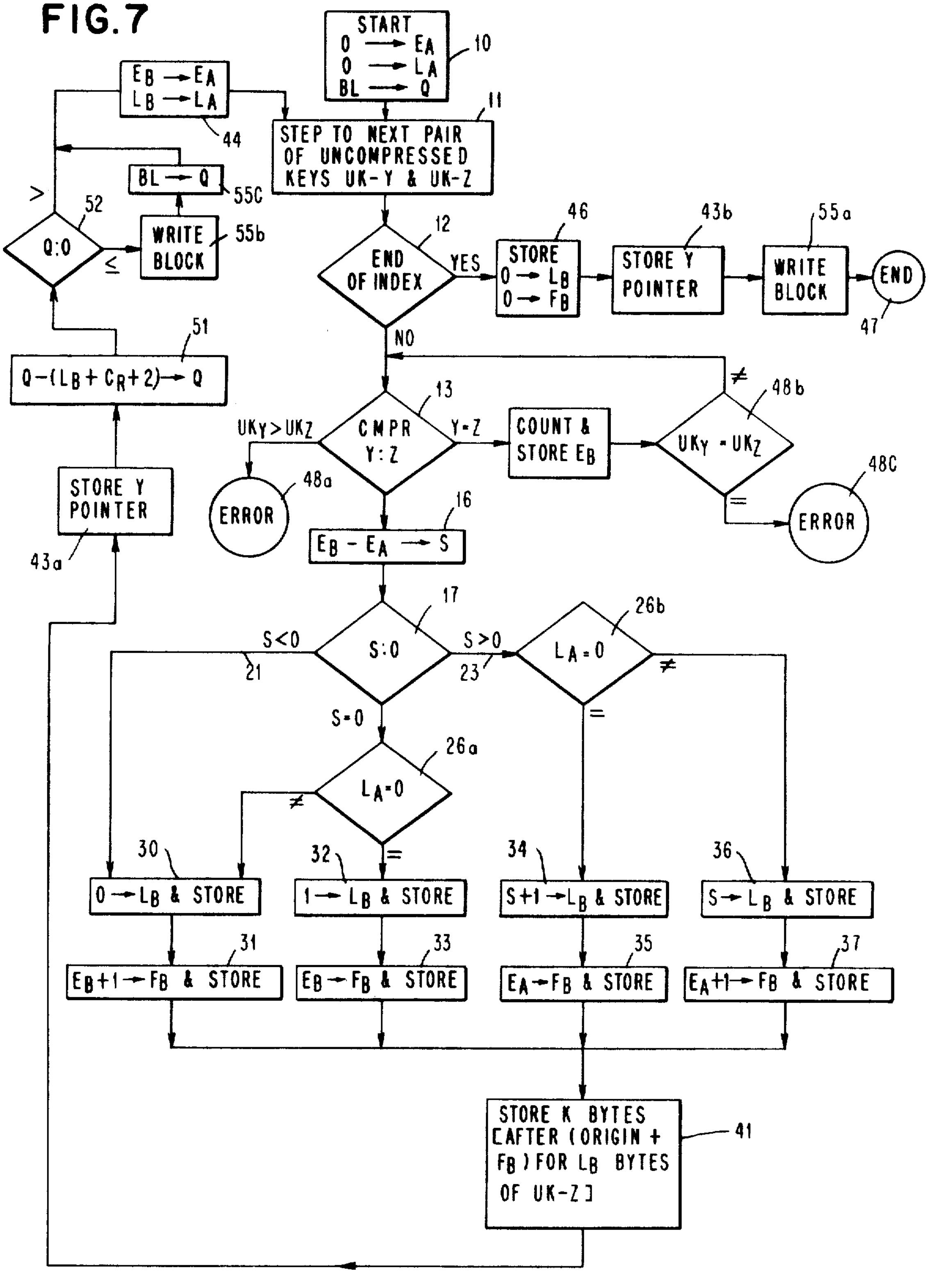
Figure 8A:
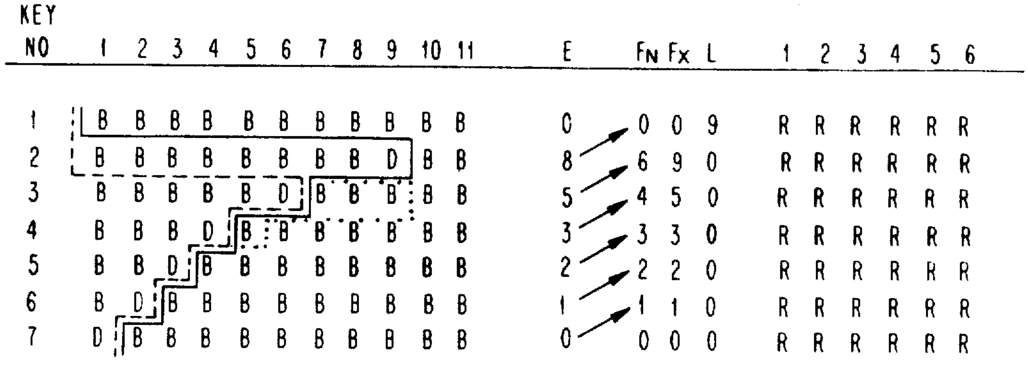
Figure 11:
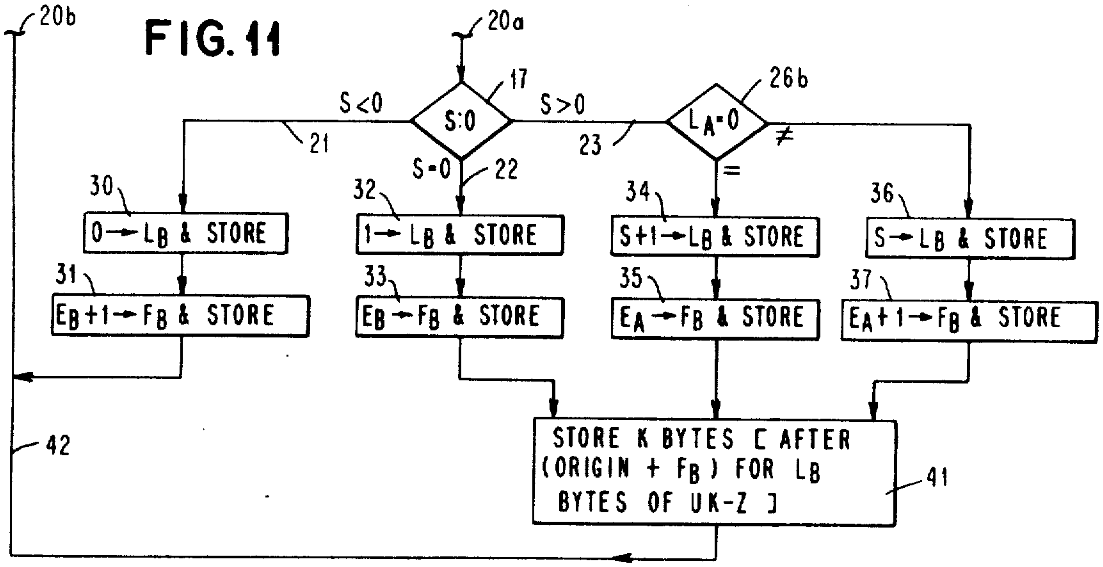
Figure 12B:
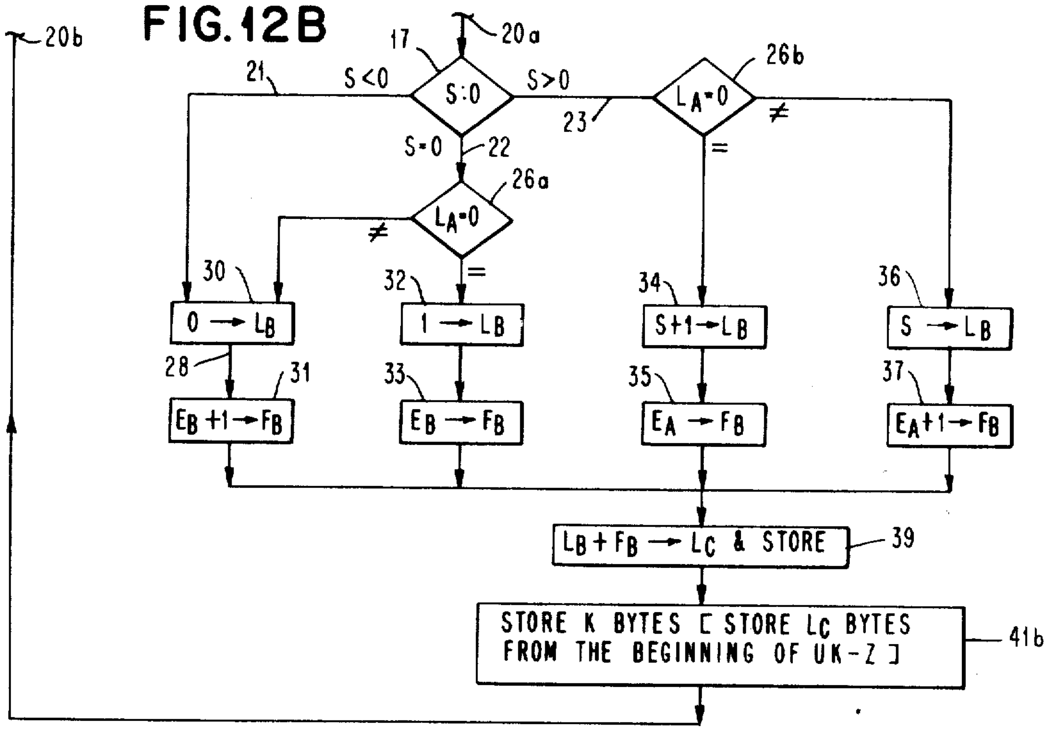
Figure 12A:
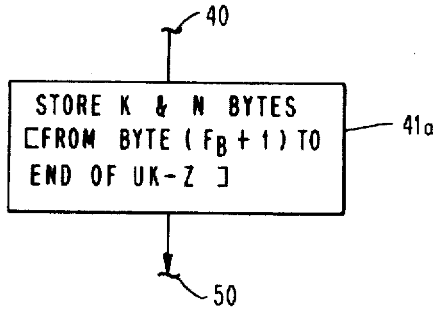
Figure 12C:
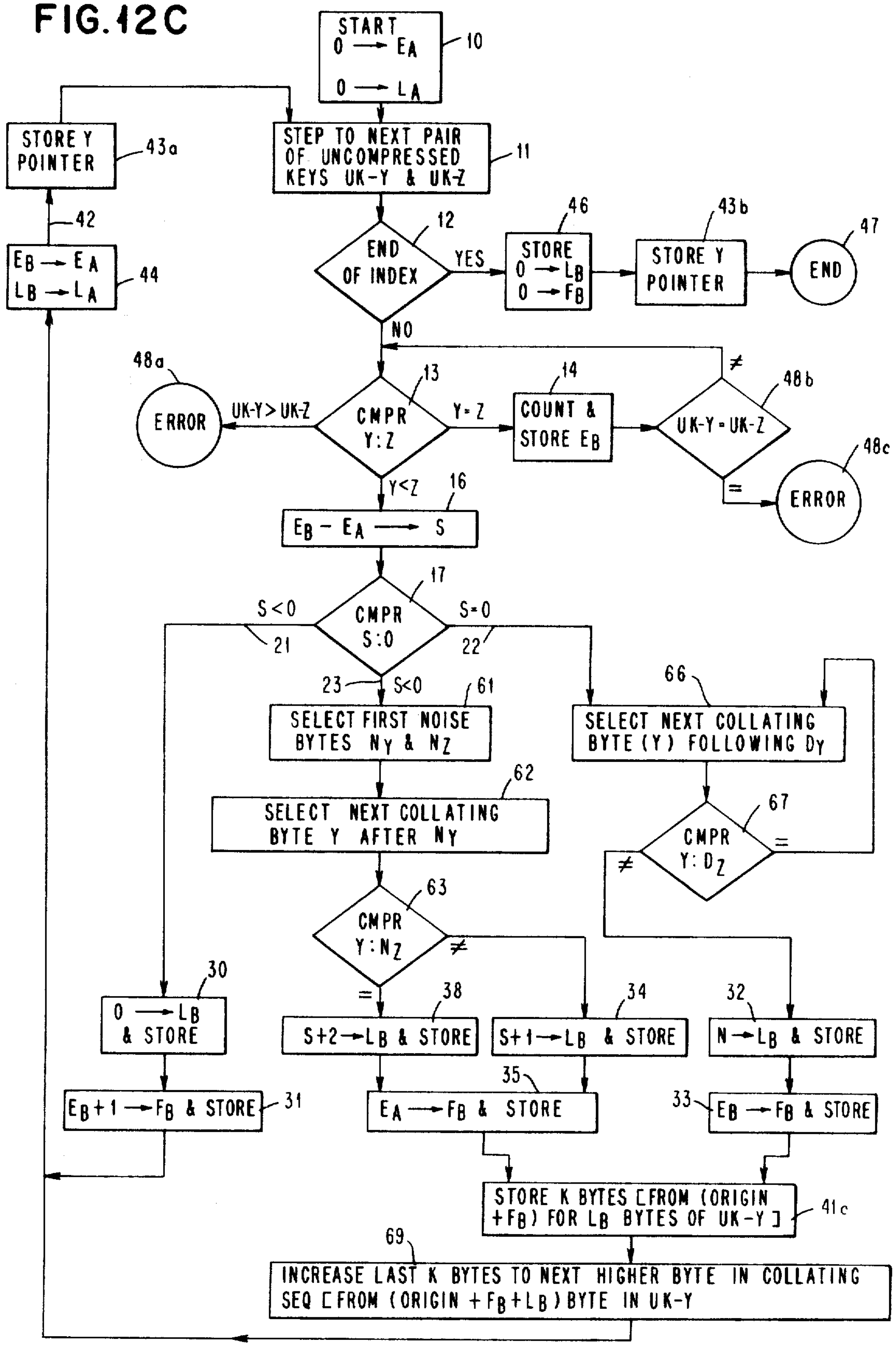
Figure 13:
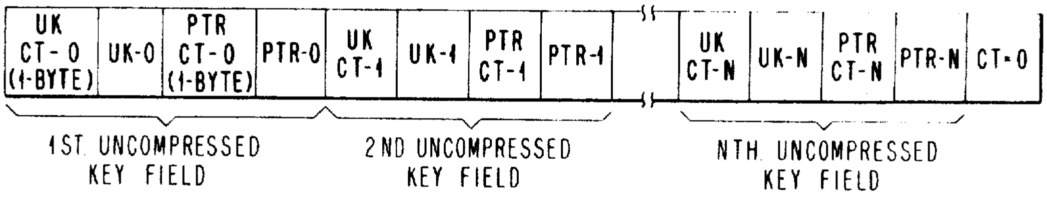
Figure 14A:
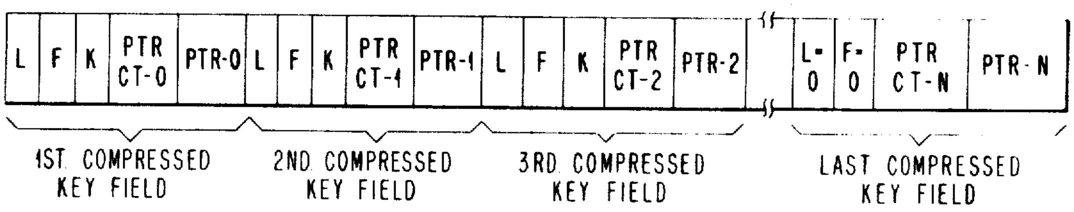
Figures 15, 15A:
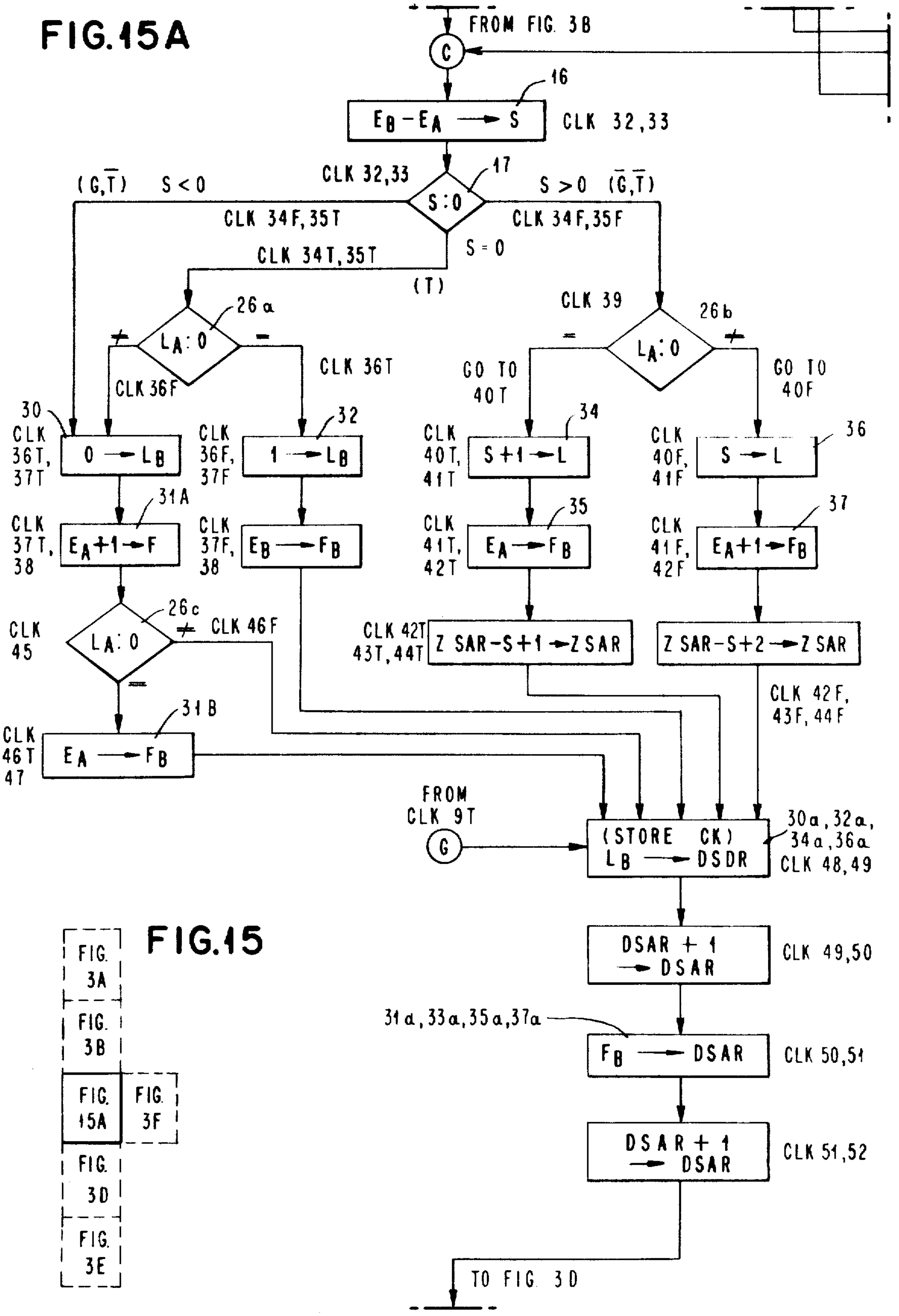
Figures 15B, 15C:
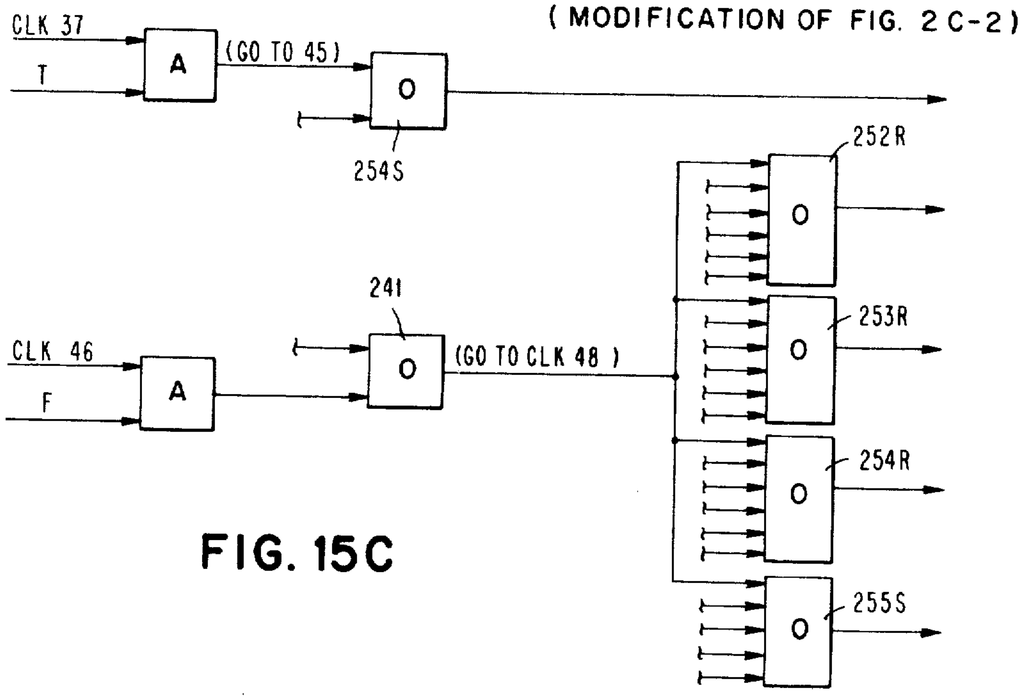

FIGS. 2Q-1 through 2Q-3 provide a Control Signal Sequence Chart representing the cycle timing for one embodiment of control signals generated for gating the data flow path in FIG. 1 with the method represented in FIG. 3;

FIG. 3 illustrates a layout for FIGS. 3A—3F;

FIGS. 3A—3F represent a detailed flow diagram of one inventive method which can be performed with the data path of FIG. 1;

FIG. 4 assists in defining certain basic characteristics of a UK pair used in the subject invention;

FIG. 5 assists in defining certain basic characteristics between two adjacent UK pairs used in the subject invention;

FIG. 6A illustrates an embodiment of one inventive method which can be performed with the data path of FIG. 1;

FIG. 6B illustrates another inventive method which can be performed with the data path of FIG. 1;

FIG. 7 represents the method in FIG. 6A with CK index blocking shown;

FIGS. 8A, B and C represent sorted UK sequences from which are respectively generated left-shift, right-shift, and no-shift types of CK's;

FIG. 9 illustrates a sorted UK sequence and a CK sequence generated therefrom with maximum byte compression;

FIG. 10 illustrates a sorted UK sequence and a CK sequence generated therefrom in which every no-shift key has one K byte;

FIG. 11 represents another inventive method embodiment of the invention which can be performed on the data path in FIG. 1;

FIGS. 12A and 12B represent still other method variations within the subject invention;

FIG. 12C illustrates a further method within the subject invention;

FIG. 13 represents a recording or communicating media format for a sorted UK sequence;

FIG. 14A represents a recording or communicating media format for a generated CK sequence;

FIG. 14B–E represent different recording formats for compressed keys;

FIG. 15 shows a drawing layout which includes FIG. 15A;

FIG. 15A is a detailed flow chart of another inventive method embodiment of the invention;

FIG. 15B provides a Control Signal Sequence Chart representing the cycle timing for another embodiment of control signals generated for gating the data path in FIG. 1 with the method represented in FIG. 15;

FIGS. 15C—F represent circuit modifications to FIGS. 2C–2 through 2N for another embodiment of a Sequencing and Branching Control for generating the control signal sequence in FIG. 15B.

The "Compressed Index Generation" operates on an input stream of the index keys which are in normal uncompressed form and are in sorted order. They may be sorted in ascending or descending order, and the respective keys may be variable length. Additional information may be appended with each key, such as associated information, a pointer address which can locate either directly or indirectly a record with which the respective key is associated.

FIG. 4 shows any two adjacent keys in any sorted uncompressed index stream, in which Uncompressed Keys (UK's) *x...x* and *y...y* are any two successive keys in the sorted sequence. Each key is comprised of a plurality of bytes (characters). The X's and Y's in the respective UK's represent their byte position, which can vary in number among the different UK's. The byte positions in any key differ in importance during the sorting operation from the leftmost byte position being the most-significant, to the rightmost being the least significant. The keys in FIG. 4 are shown aligned at their leftmost bytes, which are their most-significant bytes for the purposes of this invention as well as in the sorting sequence. The bytes in any key likewise decrease in significance as their position increases from the leftmost byte in any key, in regard to the operation of this invention.

The invention generates Compressed Keys (CK's) by using a sequence of comparisons between all adjacent UK's in an index or subindex. Thus a comparison is made between the pair $(j-1)$, and $j$ followed by a comparison between a next pair $j$ and $(j+1)$. Thus each UK, except the first and last in the index, is the second UK of one comparison pair and then is the first UK of the next comparison pair. Each comparison is made between the byte positions having the same sorting significance, i.e. the leftmost X and Y bytes are compared, the second leftmost bytes are compared, etc. The result of these byte comparisons will invariably find an unequal comparison (D), since each key in the index differs in some way from every other key. For example, such difference may be found in the addresses with identical names in an index.

Any UK comparison operation in this invention need not go beyond the leftmost *unequal* byte position D (i.e. most significant). The unequal byte position D may be the leftmost or any other byte. If not the leftmost, it has equal bytes (E) on its left.

The lesser-significant byte positions to the right of unequal byte position D are designated noise bytes N since they are not required in the generation of compressed keys.

Thus in any comparison of adjacent uncompressed keys, such as *x...x* and *y...y*, it is possible for no byte position or for all but the least-significant byte position to be equal "E" positions. With most UK pairs, the leftmost difference (D) byte position will be a byte position between the leftmost and rightmost in the comparison.

Often two compared keys *x...x* and *y...y* will have different byte lengths. In this case the first byte of the longer key beyond the least-significant byte position of the shorter key is by definition an unequal byte position. This unequal byte comparison defines the byte from the longer key as greater than the lack of a byte from the shorter key. Whenever this happens, the shorter key can be assumed to have on its right side the lowest byte in the collating sequence being used, such as the blank byte.

It is assumed in FIG. 4 that an ascending sort is used for the uncompressed index stream. If a descending sort were instead used, the greater than, and less than operations would be reversed throughout the embodiment.

FIG. 4 represents a comparison A between UK*x* and UK*y*, which have positions $(j-1)$ and $j$ in the UK sorted index sequence. The equal positions in this comparison are identified as $E_A$, the most-significant unequal byte position is $D_A$, and the noise bytes are $N_A$.

FIG. 5 represents the next sequential comparison B between UK*y* and UK*z*, which are the next pair at index positions $j$ and $(j+1)$.

The next comparison B uses the second uncompressed key *Y...Y* of the prior comparison as the first uncompressed key for the next comparison. Thus, in FIG. 5 uncompressed key *Y...Y* is the same uncompressed key as *Y...Y* in FIG. 4 which represents the immediately preceding comparison A. The uncompressed key *z...z* thus immediately follows uncompressed key *Y...Y* in the sorted sequence of uncompressed keys.

The subscripts A and B in FIGS. 4 and 5 represent any two sequential comparisons from which respective E, D and N are derived.

The invention relates the difference byte positions (D) in any two adjacent comparisons. There are three possibilities in this adjacent comparison relationship, which are represented in FIGS. 5, by Cases I, II and III. The first Case I in FIG. 5 represents the difference position $D_B$ as being at the *same* byte position as the difference position $D_A$ in the immediately preceding uncompressed key comparison shown in FIG. 4. The Case I $D_B$ may be called a "no-shift" with respect to $D_A$ because $D_B$ has not shifted its byte position therefrom.

The second Case II in FIG. 5 represents the difference position $D_B$ as being at a more-significant byte position than difference position $D_A$ in FIG. 4. The Case II $D_B$ may be called a "left-shift" with respect to $D_A$. The third Case III in FIG. 5 represents the difference position $D_B$ as being at a less-significant byte position than difference position $D_A$ in FIG. 4. The Case III $D_B$ may be called a "right-shift" with respect to $D_A$.

As the relative difference position $D_B$ varies in relation to the preceding difference position $D_A$ the number of equal byte position $E_B$ will correspondingly vary, and the number of noise byte position $N_B$ will vary. Since the difference position D is always one position to the right of the equal byte positions, then $D=E+1$.

Each UK in an index sequence represents an item of data. Each of these UK items of data must be represented in any generated sequence of Compressed Keys (CK's).

The *j*th CK represents the item of information represented by the *j*th UK.

Any comparison of the $j$ and $(j+1)$ UK's generates the *j*th CK while using certain information derived from the immediately prior comparison of the $(j-1)$ and $j$ UK's. The contents of CK is dependent upon the information from the immediately preceding comparison, of which the most important information is the $D_A$ position determined during the immediately prior comparison. Whether the prior CK bytes were zero or not may also be required. The $D_A$ position information can be stated in any of a number of ways, such as its byte count from the most-significant byte position in the respective comparison, or by stating the number of equal positions ($E_A$) determined during the same comparison since the $D_A$ position is one byte position greater than the $E_A$ value.

In the case of the first pair of UK's being compared, zero conditions are presumed to precede the first comparison operation.

The first comparison in any index sequence of Uncompressed Keys (UK's) for generating compressed keys preferably starts with a comparison between the first two uncompressed keys in the sorted sequence. This first comparison is used for generating the first Compressed Key (CK) which may represent the item of information represented by the first UK, such as being appended to it. Next a second comparison of the second and third UK's and information from the first comparison are used for generating the second CK, which then will represent the item represented by the second UK. Then the third comparison compares the third and fourth UK's in the sorted sequence, etc. until the end of the uncompressed index is reached. Hence each CK represents the item of information represented by the first UK in the pair from which the CK was generated.

The minimum Compressed Key (CK) format has a minimum number of K bytes derived from one of the uncompressed keys during a comparison. The minimum CK format takes one or more K bytes from any "right-shift" UK, does not take any K bytes from a "left-shift" UK, and takes either one or zero K bytes from a "no-shift" UK. It is always possible to have more than the minimum byte format for a CK by adding to it more bytes from the UK from which the K bytes were derived, while maintaining the relative positions among the K bytes. Such nonminimum information is redundant, but may be useful under special circumstances, such as where part of the information is erroneous.

Two additional elements of information are needed with any CK in addition to the K bytes in order to properly use the CK during a searching operation. One element of information locates each K byte of any CK by byte-position count from the most-significant byte in the UK from which the K byte was derived.

The second additional element locates the next CK. In this embodiment, these two elements take the form of two fields called: a factor length (F) field, and a compressed key length (L) field. They are part of each CK. The complete CK format then becomes FLK or LFK depending on where the preference is for F or L to appear first in the format.

The byte length (L) of the K field in a CK is dependent upon which of the three cases shown in FIG. 5 (no-shift, left-shift, or right-shift) occurs during a particular comparison. In the second case of FIG. 5 (left-shift), no K bytes appear in the CK, and L is zero. In the first case in FIG. 5 (no-shift), the minimum K bytes is zero ($L=0$) or one ($L=1$) depending upon whether the prior CK has not-zero or zero K bytes, respectively. Hence if the D position continues with the same value during an unbroken sequence of comparisons, the CK's with no K bytes ($L=0$) will alternate with the CK's with one K byte ($L=1$) because of the dependency upon the zero or nonzero condition immediately preceding K bytes. In the third case in FIG. 5 (right-shift), the CK will have one or more than one K byte ($L\neq 0$). Hence in Case III, the K field may have a variable number of bytes, which are equal to the number of byte positions from after the $D_A$ position through the $D_B$ position; this may be defined in a number of ways, such as $L=D_B-D_A=(E_B+1)-(E_A+1)=E_B-E_A$.

The factor (F) of a CK represents the number of continuous byte positions from and including the most-significant, which are not any K byte in the current CK, but which were represented by *previous* K bytes in the compressed index. The subscript B designates a value in the current CK, while subscript A designates a value in the immediately prior CK.

The factor $F_B$ is dependent upon whether the current UK does a "no-shift," "left-shift" or "right-shift" as described in regard to FIG. 5. Also $F_B$ is influenced by $L_A$ being zero or not.

For the minimum K byte conditions, the $F_B$ field has the following values: for a "no-shift" or a "left-shift" CK, the $F_B$ value is dependent upon whether the $L_A$ value for the immediately prior CK is zero or not. When $L_A$ is zero in the "no-shift" case, the $F_B$ value is the same as the equal ($E_B$) value. While $L_A$ is not zero in the "no-shift" case, $F_B$ can be any value from a maximum of $E_A+1$ through a minimum of $E_B+1$. In the "left-shift" case regardless of whether L=0, $F_B$ can be any value from $E_A+1$ through $E_B+1$. But where L=0 for the "right-shift" case, $F_B=E_A$; and where L is not zero, $F_B=E_A=1$.

An example of CK's with minimum K fields is illustrated by the following Table I:

TABLE I

| UK | CK E | CK F | CK L | CK K |
|---|---|---|---|---|
| Englehard, Hans | 11 | 0 | 12 | Engelhard, L. |
| Engelhard, Ludwig | 3 | 12-4 | 0 | |
| English, Irvine J | 9 | 3 | 7 | lish, J. |
| English, Jas. J | 1 | 10-2 | 0 | |
| Ericson, Oscar | 1 | 1 | 1 | s. |
| Eskind, Ralph R | 2 | 2 | 1 | p. |
| Esposito, Blas | 1 | 3-2 | 0 | |
| Evancie, Kenneth G | 1 | 1 | 1 | z. |
| Ezequelle, Jonathan A | 0 | 2-1 | 0 | |
| Fahnestock & Co | 2 | 0 | 3 | Fam. |
| Famularo, Jos. J | 2 | 3 | 0 | |
| Farewell, Richd. L | 3 | 2 | 2 | rr. |
| Farrar, Carl E | 1 | 4-2 | 0 | |
| Feeney, Kermit | 2 | 1 | 2 | en. |
| Fennell, Lee T | 2 | 3 | 0 | |
| Ferris, Harriet Akin, Mrs | 8 | 2 | 7 | rris, R. |
| Ferris, Raymond W | | | | |

With Case I in FIG. 5, a simplification in operation may be obtained by having a single K byte, which is the $D_B$ byte, and L=1 always. However this results in less compression for any index having "no-shift" sequences, which is a common occurrence in large indexes. An example of CK's using this operation is illustrated by the following Table II:

TABLE II

| UK | CK E | CK F | CK L | CK K |
|---|---|---|---|---|
| Englehard, Hans | 11 | 0 | 12 | Engelhard, L. |
| Engelhard, Ludwig | 3 | 4 | 0 | |
| English, Irvine J | 9 | 3 | 7 | lish, J. |
| English, Jas. J | 1 | 2 | 0 | |
| Ericson, Oscar | 1 | 1 | 1 | s. |
| Eskind, Ralph R | 2 | 2 | 1 | p. |
| Esposito, Blas | 1 | 3 | 0 | |
| Evancie, Kenneth G | 1 | 1 | 1 | z. |
| Ezequelle, Jonathan A | 0 | 1 | 0 | |
| Fahnestock & Co | 2 | 0 | 3 | Fam. |
| Famularo, Jos. J | 2 | 2 | 1 | r. |
| Farewell, Richd. L | 3 | 3 | 1 | r. |
| Farrar, Carl E | 1 | 2 | 0 | |
| Feeney, Kermit | 2 | 1 | 2 | en. |
| Fennell, Lee T | 2 | 3 | 1 | r. |
| Ferris, Harriet Akin, Mrs | 8 | 3 | 6 | ris, R. |
| Ferris, Raymond W | | | | |

Accordingly any compressed index can be represented by the format FLK. The values of F and L can be represented by a byte each, or they might occupy a fraction of a byte, such as one-half byte each. If F and L each occupy one-half of an 8-bit byte, each can accommodate values from 0 through 15; this has been found to be sufficient in practice to accommodate almost all compressed indexes, because the average number of K bytes per CK has been found to be less than one in large indexes. In general, K decreases as the indexes become larger, because large indexes are generally more tightly packed, i.e. more redundant.

To accommodate L values longer than 15 bytes, and/or F values longer than 15 bytes, one of the 4-bit codes for each half-byte F and L can be used to extend a CK to the next following CK entry. This extension would reduce the maximum length of F or L to 14 for any nonextended CK. The extended CK would indicate an extension of either or both of F or L by placement of the 4-bit extension code (such as 15) respectively in either or both of F or L. If only F has an extension code, the extension CK will not have any K bytes and its L is zero; hence it is 1 byte long. If L has the extension code, the same CK has 14 K bytes, and the L field in the following extension CK will indicate how many more K bytes are being carried with the extension CK which should be chained to the K bytes in the immediately preceding index entry. Any number of extension CK's may be used in this manner to accommodate a CK of any F or L length. However, CK's having more than 14 K bytes are very rare in known indexes. CK's having more than 14 F bytes are more common. Each such extension CK adds only 1 byte for the additional F and L fields. Chained K bytes do not cause any redundancy in the system.

Two basic alternative situations exist in determining the derivation of the K bytes of the CK's in an index. That is, the K bytes can be derived from either UK in a pair being compared. In "Basic Situation-I" the K bytes are derived from the bytes in the first UK of the compared pair of UK's. In "Basic Situation-II" the K bytes are derived from the bytes in the second UK of the compared pair of UK's.

Once a choice is made between Situation I or II, all CK's in the index must thereafter be derived using the rules of the chosen situation. In general, Situation-II has been found preferable to Situation-I, because the K bytes derived from the second UK will be *greater* than the K bytes derived from the first UK in a compared pair. The *greater than* condition has an advantage in search operations.

Most indexes lead to a more basic source of information than the index itself, although in some cases the information is directly appended with the index. In most cases the indexed information is too large to efficiently have it appended to the UK or CK. Accordingly it is necessary in most cases to append with each key entry an additional item of information which will directly or indirectly lead to the indexed information.

Such additional item of information may be the address of the required information, or it may instead be the address of another address which is part of a chain of addresses that lead to the indexed information. In such case, a pointer is appended with each key. The pointer is an address which can be used to locate the indexed information or to locate the next pointer in a chain leading to the indexed information.

There are two possibilities in appending a pointer to any CK. These two possibilities may be identified as "Pointer Appendage I" or "Pointer Appendage II." Pointer Appendage I associates the first UK pointer with the CK generated from every compared pair of UK's. Pointer Appendage II associates the second UK pointer with the CK generated from every compared pair of UK's. Once one of these pointer appendage choices is made between I and II, consistency is essential thereafter in continuing to use the same pointer appendage rule. Considerations in the choice involve the fact that there is one more pointer than there are real CK's generated by comparison between real UK's. That is, each UK will have its pointer, and there will be one less CK generated than there are compared pairs of UK's. This difference between the number of real CK's and real pointers can be alleviated in an advantageous way by adding a fictitious CK at the beginning or the end of the index.

Pointer Appendage I requires an initial dummy CK to accommodate the pointer with the first UK. Pointer Appendix II requires a dummy CK at the end of the index to accommodate the last pointer which otherwise might not be accommodated. Pointer Appendage II is the preferred method because the dummy CK can also be used to identify the end of the compressed index.

Compressed Keys with a minimal or greater number of bytes derived from the corresponding Uncompressed Key have been described. The minimal size compressed key eliminates all byte redundancy found in the sorted list of uncompressed keys. However there are circumstances under which it is desirable to retain some of the redundancy For example, if only the noise bytes are eliminated, and all factored bytes are retained, sufficient redundancy remains to search the partly compressed index on the same basis as the corresponding uncompressed index could be searched The following Table III illustrates this type of compression:

TABLE III

| UK | CK | | |
|---|---|---|---|
| | E | L | K |
| Engelhard, Hans | 11 | 12 | Englehard, L. |
| Engelhard, Ludwig | 3 | 3 | Eng. |
| English, Irvine J | 9 | 10 | English, J. |
| English, Jas. J | 1 | 1 | E. |
| Erickson, Oscar | 1 | 2 | Es. |
| Eskind, Ralph R | 2 | 3 | Esp. |
| Esposito, Blas | 1 | 1 | E. |
| Evancie, Kenneth G | 1 | 2 | Ez. |
| Ezequelle, Jonathan A | 0 | 1 | F. |
| Fahnestock & Co | 2 | 3 | Fam. |
| Famularo, Jos. J | 2 | 2 | Fa. |
| Farewell, Richd. L | 3 | 4 | Farr. |
| Farrar, Carl E | 1 | 1 | F. |
| Feeney, Kermit | 2 | 3 | Fen. |
| Fennell, Lee T | 2 | 2 | Fe. |
| Ferris, Harriet Akin, Mrs | 8 | 8 | Ferris, R. |
| Ferris, Raymond W | | | |

With any CK in Table III, one or more additional bytes (noise bytes) may be added to the right of its K bytes from the same UK that the required K bytes were derived. The limiting case with such added noise bytes is when the CK has all of the bytes of its UK, and then no compression exists.

Alternatively to Table III, the minimum K bytes and the noise (N) bytes may be retained, and the factor (F) bytes eliminated. This is not equivalent to retaining the D byte and N byte as illustrated by the following Table IV, which is searchable under this invention:

TABLE IV

| UK | CK | | | |
|---|---|---|---|---|
| | E | F | L | K |
| Engelhard, Hans | 11 | 0 | 6 | Ludwig. |
| Englehard, Ludwig | 3 | 4 | 14 | lish, Irvine J. |
| English, Irvine J | 9 | 3 | 11 | lish, Jos. J. |
| English, Jas. J | 1 | 2 | 13 | ricson, Oscar. |
| Ericson, Oscar | 1 | 1 | 14 | skind, Ralph R. |
| Eskind, Ralph R | 2 | 2 | 12 | posito, Blas. |
| Esposito, Blas | 1 | 3 | 17 | vancie, Kenneth G. |
| Evancie, Kenneth G | 1 | 1 | 20 | zequelle, Jonathan A. |
| Ezequelle, Jonathan A | 0 | 1 | 15 | Fahnestock & Co. |
| Fahnestock & Co | 2 | 0 | 13 | mularo, Jos. J. |
| Famularo, Jos. J | 2 | 2 | 15 | rewell, Richd. L. |
| Farewell, Richd. L | 3 | 3 | 11 | rar, Carl E. |
| Farrar, Carl E | 1 | 2 | 14 | eeney, Kermit. |
| Feeney, Kermit | 2 | 1 | 12 | nnell, Lee T. |
| Fennell, Lee T | 2 | 3 | 23 | rris, Harriet Akin, Mrs. |
| Ferris, Harriet Akin, Mrs | 8 | 3 | 9 | Raymond, W. |
| Ferris, Raymond W | | | | |

Another less than minimum variation is to include with the minimal K bytes at least the most significant noise byte by increasing it to the next higher character in the collating sequence being used. This is particularly appropriate when the rules described for Basic Situation I are used, since it causes a greater than situation for the K bytes, which is advantageous for searching the compressed index. In the latter case, whenever the first noise byte is the highest character in the collating sequence, the next noise byte is also added to the K bytes because the highest character cannot be raised in value. If any added noise byte is the highest character, the next noise byte is added until an added noise byte is not the highest character in the collating sequence. Only the last-added noise byte is raised to the next higher value in the collating sequence. It will be rare that more than one noise byte is required. The following Table shows an example of index compression using the latter type of operation with the Binary-Coded-Decimal Collating sequence in which byte A follows the comma (,):

TABLE V

| UK | F | L | K |
|---|---|---|---|
| Boon, Clyde E | 0 | 5 | BOONA |
| Boonstra, Piet W | 4 | 0 | |
| Boos, Donald | 3 | 2 | SA |
| Booth, Richard R | 3 | 5 | TH, RJ |
| Booth, Robert A | 7 | 2 | OC |
| Booth, Ronald | 8 | 0 | |
| Booth, Vernon | 6 | 0 | |
| Borchlewicz, Robert J | 2 | [illegible] | |
| : | | | |
| Boyd, Darrell C | 0 | 0 | |

F=0 of bytes factored from the left end of the key.

L=0 of bytes of the key recorded in this index entry.

FIG. 6A illustrates a flow diagram which embodies one of the methods of this invention. In this figure, starting act 10 resets the registers holding the $F_A$ and $L_A$ values to zero. Then act 11 causes the system to step to the next pair of Uncompressed Keys Y and Z, which are the $j$ and $j+1$ keys respectfully shown in FIG. 5. Initially they will be the first two keys in an Uncompressed Index which are taken from some storage medium, such as magnetic tape, magnetic disc, core memory, etc. The next act 12 is an End Of Index test to determine if step 11 has reached the end of the Uncompressed Index. The End Of Index may be indicated in a number of ways, such as for example, a special character, a special record, a particular combination of characters, or by sensing an invalid byte count for any UK.

If no End Of Index is reached, comparison step 13 is performed which must find UK-Y less than UK-Z, since the keys in the Uncompressed Index must be in sorted order, and each key must be unique in index. Accordingly, if the comparison should find UK-Y equal to or greater than UK-Z, then the keys are not in their proper sorted order, and an error is flagged by act **48*a* or 48*c*, respectively. Normally no such error should exist since the prior sorting operation for the UK's should have been done correctly. The number of equal byte positions $E_B$ is determined by comparison act 13, and they are counted by act 14. In effect, step 14 increments a count $E_B$ by one for each equal comparison between correspondingly positioned Y and Z bytes, and branches back to act 13 for a comparison of the next Y and Z bytes. As soon as any Z byte is greater than the Y byte, the operation goes to step 16. The last $E_B$ count by act 14 before entering act 16** is stored as the proper $E_B$ count for the current CK and defines the location of the difference position $D_B$ which is one byte count higher than the $E_B$ value. The $E_B$ value is stored in a register or word position allocated for it.

Then step 16 is performed by a mechanical or electronic subtracting device which subtracts the value in an $E_A$ register from the value in a $E_B$ register; and stores the result of the subtraction in a S register.

The value in the S register is then compared to zero by step 17, which will find S to be less than, equal to, or greater than zero. This determines if the $D_B$ position has respectively shifted left, not shifted, or shifted right in relation to the prior $D_B$. In the first pair of UK's in an Index, the $D_B$ is a right shift case because its prior $D_B$ is presumed to be zero. Depending upon which of these three determinations is made by step 17, a different path 21, 22, or 23 respectively, is selected. Paths 22 and 23 first test at A for being zero, and splits into two paths according to whether $L_A$ is zero or not zero. Five possible paths result. Only one path is used for any single iteration through step 17. Different values may be generated for $L_B$ and $F_B$ along the different paths. If S is less than zero, step 30 is performed which sets a zero into the $L_B$ register, and stores this $L_B$ value as the L component of the current CK being generated. Then step 31 is entered; it increments the value in the $E_B$ register by 1 and places it in the $F_B$ register. The resulting $F_B$ value is stored as the F component of the CK being generated. No K bytes are generated when S is less than zero in FIG. 6A, and step **43*a* follows step 31** to transfer the UK-Y pointer with the CK currently generated.

Step 44 is executed prior to step **43*a* in preparation for the next iteration through the method in FIG. 6A, the value in the $E_B$ register is reassigned as the $E_A$ value, and the value in the $L_B$ register is reassigned as the $L_A$ value. Then step 11 is reentered which causes the next pair of uncompressed keys to be examined. This next pair includes the second key (UK-Z) of the last pair A, which becomes the first key (UK-Y) of the next pair B, and the UK after UK-Z of the last pair becomes UK-Z of the next pair. In this manner, each next pair of Uncompressed Keys, UK-Y and UK-Z, is obtained when step 11 is reentered until the sequence of Uncompressed Keys is exhausted, which is indicated in step 12**.

As long as step 12 causes the method in FIG. 6A to pass to step 13, the iterations continue. Each time step 17 is reached, a branch is taken to one of the three branch paths 21, 22, or 23. Path 21 was previously described for the left-shift case. Path 22 is taken when step 17 determines that S is zero, which identifies a no-shift case. Then a test step 26a is made to determine if the currently stored $L_A$ is zero. If $L_A$ is not zero for the no-shift case, steps 30 and 31 are entered and performed in the same manner as previously described for the left-shift case. However, if $L_A$ is zero for the no-shift case, step 32 is entered from step 26a. Step 32 causes a 1 digit to be placed into the $L_B$ register, and this value is stored in the L field for the current CK being generated. Then step 33 is executed which causes the value in the $E_B$ register to be transferred to the $F_B$ register; and this F value is stored as part of the current CK. Then step 41 is entered for transferring $L_B$ number of K bytes are taken from the register in which the current UK-Z is stored. The first K byte is taken from this register at its byte position $(F_B+1)$ from the most significant bytes position of UK-S. This byte is stored as the first K byte. Other K bytes are taken, if necessary, from adjacent less significant byte positions, until $L_B$ number of bytes are taken from UK-Z. Then step 43 is performed to store the pointer address associated with UK-Z; and the next iteration is taken.

An iteration may find a right-shift case during step 17, indicated by S being greater than zero. Hence, path 23 is taken. Then the $L_A$ register is tested for a zero value by step 26b. If $L_A$ is zero, step 34 is entered which causes a 1 to be added to the value in the S register, and the incremented value is placed in the $L_B$ register. This $L_B$ value is stored as the L component of the current CK being generated. Step 35 is entered upon completion of step 34 wherein the $E_A$ register value is transferred to the $F_B$ register as the F value for the current CK; and it is stored in the current F field. Then step 41 is entered which acts to generate the K bytes in the same manner as previously described.

On the other hand if the step 26b finds register $L_A$ as having a nonzero quantity, step 36 is entered which stores the value in the S register as the $L_B$ value. Then step 37 is entered, which increments the value in the $E_A$ register with the digit 1, and loads the incremented value into the $F_B$ register and stores it in the F field for the current CK. Then the K bytes are generated by step 41 in the manner previously explained.

Steps 43 and 44 are entered after completion of steps 31 or 41. Step 44 redefines the current $E_B$ and $L_B$ values as the $E_A$ and $L_A$ values for the next iteration. Step 43 stores the pointer associated with the current UK-Y as the pointer with the current CK. Since steps 43 and 44 are independent of each other, their relative order of execution is not critical.

When step 12 senses an End of Index indication for the UK stream, it generates a last CK in a special manner by storing zero bytes in the L and F fields and no K bytes. The pointer with the last UK is stored as the pointer with the last CK by step 43b, and the operation is ended by entering step 47.

FIG. 6B provides step 31B,26C and 31A which are substituted for step 31 in FIG. 6A, while retaining the other steps in FIG. 6A. Step 31 in FIG. 6A generates a minimum F value for left-shift cases, while step 31A in FIG 6B generates maximum F values for left-shift CK's. The minimum F value is preferred, although any value from the minimum to the maximum will work for searching the compressed index. These F values are minimum and maximum in regard to enabling searching of the compressed keys, in which case F can also be any value between these limits.

The L, F and K bytes generated for the current CK are stored sequentially in a memory device of any kind such as tape, core, disc, or drum. Each succeeding CK is stored to follow the preceding CK without any wasted byte position being required. Such sequential outputting of the CK stream may continue without interruption until an End Of Index is reached. On the other hand, it may be interrupted momentarily at any specified block size required for storing on a magnetic storage medium, such as tape, disc, or drum. Hence a block may comprise an entire index, or a block may end whenever a particular byte or work count is reached, which may be variable in length.

FIG. 7 adds blocking steps to the steps in the method of FIG. 6A. Thus, in FIG. 7, a blocking counter Q is initially set during step 10 to approximately a required byte block size BL, which is tested by step 51 after any of the steps 30 through 37 and 41 are performed. Counter Q is decremented in Step 51 by the byte length $L_B$ of the current CK and its pointer length $C_R$ for every CK outputted from any of steps 30—37, 41 and 43a. The decrementing quantity includes $L_B$ (the number of current K bytes) plus 1 (the byte number for the F and $L_B$ fields) plus $C_R$ (the pointer byte count) plus 1 (the $C_R$ byte itself for a total decrement of $(L_B+C_R+2)$ per operation of step 51. When the value of Q reaches zero, a block is written by step 55b.

Step 52 tests the current Q counter contents. As long as step 51 finds Q greater than zero, the step 44 is entered from step 52 and the next iteration begins. However, if Q is equal to or less than zero, step 55b is entered and the recently generated part of Compressed Index is written, and step 55C initializes Q for the next block. A new block is started as step 55b transfers control to step 44 to begin the next iteration, which continues the Compressed Index in the next block, etc., until an End of Index is sensed by step 12.

FIGS. 8A, B, and C represent UK sequences for illustrating the operations of the methods in FIGS. 6A, 6B, or 7 for the different iterations using paths 21, 22, and 23, respectively. The UK's and corresponding CK's in FIG. 5 are numbered in the left vertical column titled "Key No." The byte positions in each UK are numbered 1 through 11 across the top of FIG. 5A. Each UK byte is represented by a symbol B, which may be any character in any character set, within the constraints of the sorted sequence of UK's. That is, any byte in any column can only be equal or higher in the collating sequence than it's immediately preceding byte in that column; it cannot be lower than its preceding byte in the same column for ascending sort conditions. The reverse is true for a descending sort.

Although a fixed number of byte positions is assumed for each UK illustrated in FIGS. 8, the representation is true for varying numbers of bytes in the UK's. The difference position identified as $D_B$ in FIG. 5 (obtained by comparing any pair of UK's) is designated by a D in FIGS. 8A, B, and C to indicate the different byte position in the second UK of any pair being compared. Equal E bytes for any pair comparison are found to the left of each D byte, and noise N bytes are found to the right of each D byte.

A solid vertical line is drawn to the right of each D byte, and it is connected to each adjacent vertical line by a horizontal line.

The vertical dashed lines in FIGS. 8A, B, and C similarly are drawn on the right boundary of the factor byte positions F.

The $F_N$ column represents the minimum F values generated by the method in FIG. 6A. The $F_X$ column represents the maximum F values for the CK's generated by the method in FIG. 6B. The $F_N$ and $F_X$ values differ only for some left-shift CK's, and they are equal for no-shift and right-shift CK's. The vertical dotted lines are drawn on the right side of only those $F_X$ positions which differ from the $F_N$ positions in the same UK. Where $F_X$ and $F_N$ are equal, the vertical dashed lines represent both $F_N$ and $F_X$.

The K byte field for any CK is bounded on the left by a vertical dashed line and is bounded on the right by a vertical solid line. Where the solid line ($D_B$ boundary) and dashed line (F boundary) bound the *same* UK byte, or where the solid line is to the *left* of either the dashed line or dotted ($F_X$ boundary), no K byte field exists for the corresponding CK and its $L_B$ is zero. The byte lengths of the fields F (factor), L (number of K bytes), and E (number of Equal bytes) are represented in FIGS. 8A, B, and C by the respectively identified columns therein. The pointer byte associated with each UK is represented by R's in the Figures.

The first CK for each FIG. 8A, B, or C always represents a right shift case, because $L_A$ and $F_A$ are initially set to zero by step 10 in FIGS. 6A, 6B, or 7. Hence the difference byte position can only shift to the right during the comparison of the first and second UK's. Thereafter in FIG. 8A, the difference byte positions (represented by the solid line) move to the left to illustrate the left shift cases. It is apparent in FIG. 8A that the first CK has an F value of zero, and it has nine K bytes defined by the D position in UK-2 and accordingly its L field is 9. The compressed keys following the first in FIG. 8A are left-shift keys as can be seen from the decreasing values of E. The left-shift keys have no K bytes and hence each has an L of zero. The F and L quantities for the CK's are shown in the respectively marked columns in FIG. 8A and each is associated with the pointer at the same key number.

FIG. 8A illustrates the minimum $F_N$ value obtained by the method of FIG. 6A and the maximum $F_X$ value obtained by the method FIG. 6B (vertical dotted lines). In any case, the F field can be any value between $F_N$ and $F_X$ (the vertical dashed and dotted lines). The $F_N$ dashed line position may be preferred because it obtains a lower numerical value. In any case, no K byte is required for a left-shift CK.

Figure 8B:
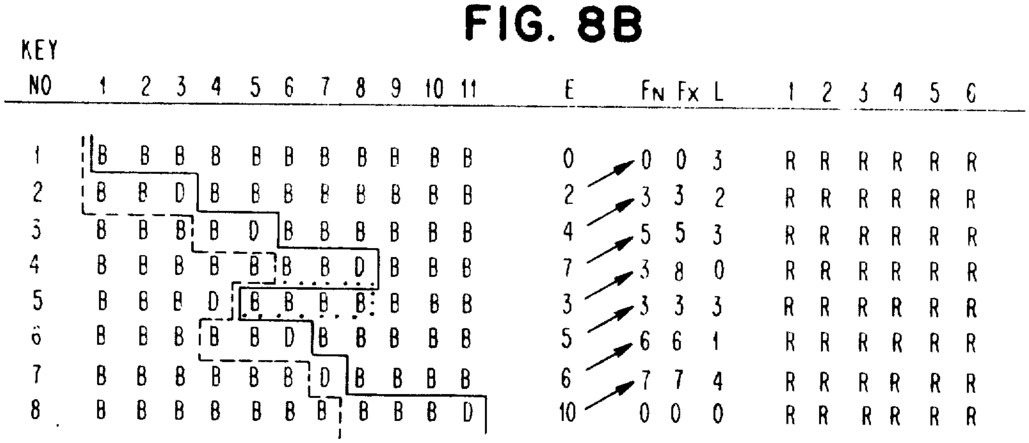

FIG. 8B illustrates the right-shift key follows an $L_A$ value of zero or not zero respectively. For example, CK-3 having an F and L of 5 and 3 is a right-shift key having a prior nonzero $L_A$ of 2. However, Key Number 5 is a right-shift key following a key having an $L_A$ of zero. When $L_A$ is zero for a right-shift case, the prior difference byte position is included as a K byte, which is required for searching continuity. Where the prior $L_A$ is not zero, the prior difference position is not included as a K byte, since it is represented by an E (equal) byte in the F field of the current CK. The $F_N$ and $F_X$ values are equal for right-shift keys.

Figure 8C:
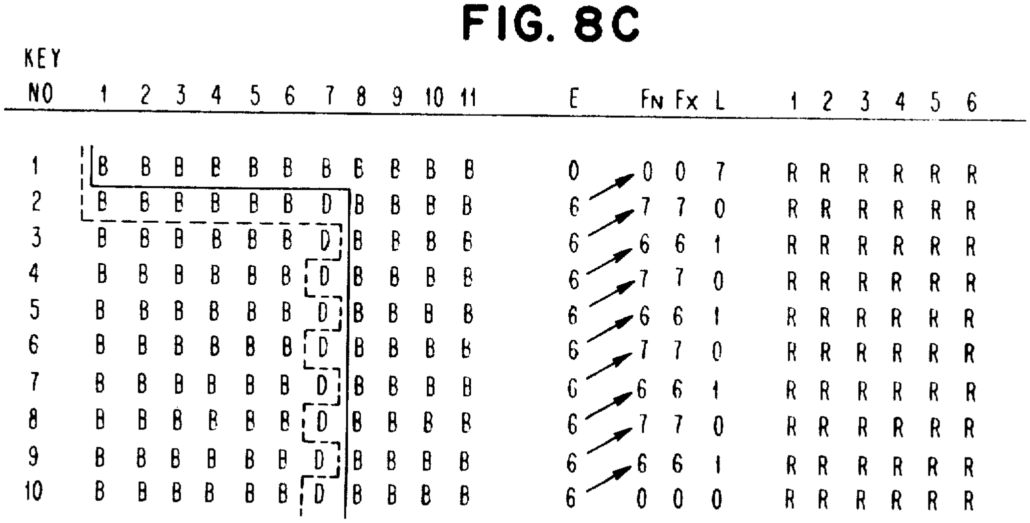

FIG. 8C illustrates the alternation in $L_B$ between zero and one when a sequence of no-shift cases occur, i.e. where the difference byte position $D_B$ remains the same during a sequence of UK compare operations. Accordingly, where a prior $L_A$ is not zero, $L_B$ becomes zero; and where prior $L_A$ is not zero, $L_B$ becomes one. The alternation in FIG. 8C occurs as L changes from 0 to 1 and back to zero, while F varies oppositely between 7 and 6. The $F_N$ and $F_X$ values are equal for no-shift keys.

FIG. 9 represents a general sequence of UK's in which the dotted, dashed, and solid lines defining $F_X$, $F_N$ and K byte boundries represent the operation of the methods in FIGS. 6A and B. The corresponding F and L values for the CK's generated from the illustrated UK's are therein represented along with a representation of the associated pointer. This type of chart gives a dynamic view of what happens during the generation of CK's from a sequence of UK's. It is noted in FIG. 9 that a total of 48 K bytes represent the 37 CK's therein illustrated out of a total of 518 UK bytes. Accordingly FIG. 9 illustrates a key compression of less than one-tenth of the number of UK bytes. With one byte added to each CK to represent the F and L values, the compression for the CK's in FIG. 9 is about one-seventh of the Uncompressed Key bytes. In practice with large indexes, the compression has been found to average less than one K byte per key.

FIG. 11 modifies the method in FIG. 6A for the no-shift case to eliminate the alternation between 0 and 1 for $L_B$ and the alternate existence or nonexistence of a K byte, i.e. where $D_B$ remains in the same byte position for a sequence of UK's. The method of FIG. 11 causes $L_B$ to be one, and the difference byte $D_B$ to be the K byte for all no-shift keys. FIG. 11 is substituted for that part of FIG. 6A from the output of step 16 to the input of step 43, identified between break-points 20*a* and 20*b* in FIG. 6A. The only difference between the methods in FIG. 11 and 6A, is along operational path 22. In FIG. 11, path 22 enters step 32 only. Accordingly, step 26*a* in FIG. 6A is not found in FIG. 11, and step 30 is not entered from path 22.

FIG. 10 represents the same UK sequence shown in FIG. 9. The method of FIG. 11 is applied to the UK sequence in FIG. 10, while the methods of FIGS. 6A and B are applied to FIG. 9. Thus, FIG. 10 shows the lack of alternation for the no-shift sequences, which have a single K byte and an $L_B$ of 1. The apparent simplication in the method of FIG. 11 over the method in FIGS. 6A or 6B results in less average key compression, where no-shift sequences are encounted. No shift-sequences are expected to be common in any large index. In FIG. 10, 51 K bytes result among the total of 518 UK bytes, compared to 48 K bytes in FIG. 9 for the same set of UK's.

FIG. 12A substitutes step 41*a* for step 41 in FIG. 6A between the breakpoints 40 and 50. The operation of FIG. 6A with the FIG. 12A substitution obtains CK's of the type represented in Table IV. These CK's eliminate the factor bytes but retain any K bytes and all the noise bytes. As previously stated, the noise bytes are redundant; but under certain conditions, redundancy may be required, such as to obtain error detection or correction.

FIG. 12B is substituted in FIG. 6A between breakpoints 20A and 20B and thus, replaces the corresponding portion in FIG. 6A. The method of the FIG. 12A substitution into FIG. 6A obtains CK's of the type represented in Table III, herein. These CK's retain their factor bytes and the K bytes, and eliminate noise bytes. Since these CK's do represent any bytes removed from their more-significant side, each CK has an F value of zero. Thus, it is unnecessary to include any F value in the CK format for Table III and the method of FIG. 12B since $L_B$ is implied to always be zero. Hence, the method of FIG. 12B only stores an L value with the K bytes. Although not stored in the CK format, FIG. 12B determines $L_B$, and $F_B$ values, which are maintained in registers as was done in the method of FIG. 6A. Instead, an additional step 39 is provided in FIG. 12B which adds the currently determined $L_B$ and $F_B$ values in an $L_C$ register. Then, step 41*b* is entered which stored $L_C$ number of bytes from the beginning of the current UK–Z. Then the method reinterates, and continues until the end of the UK index is sensed.

FIG. 12C represents a method which generates the compressed keys represented in Table V. In the method of FIG. 12C, the K bytes are selected from UK–Y in any comparison, rather than from UK–Z which was used in the method of FIG. 6A.

Another distinction is that a nonuniform code increase in the used character collating sequence is not important to the method in FIG. 6A, while a nonuniform code increase must be specially accommodated in the method of FIG. 12C, in which a next higher character in the used collating sequence must be selectable. If the collating set is represented by sequential codes, any next character may be selected by adding one to the code for a given character. On the other hand, if the sequence of characters in a collating set does not permit a respective incrementing by one of the binary code for any character to obtain the next character, next character is obtained by other means, such as by tale lookup. In the latter case, the sequence of characters in the collating set may be placed in sequential address positions in a table stored in a randomly accessible memory device. Thus, the next character may be obtained by incrementing the address by one for a given character to obtain the address for fetching the next character in the collating sequence, regardless of the actual code values for the characters.

The initial part of FIG. 12C from the Start step 10 through the comparison step 17 is identical to the like numbered steps in FIG. 6A. Also, identity among these Figures is found for the left-shift case along path 21 when S is less than zero and through steps 30, 31, 43, 44 and back to step 11.

However in FIG. 12C, differences arise from FIG. 6A when step 17 is exited along path 22 for the no-shift case, or along path 23 for the right-shift case.

For the no-shift case, step 66 is entered from path 22. Step 66 addresses the difference byte position $D_B$ in uncompressed key Y, which character is designated $Y_D$. Then the next higher character after $Y_D$ in the used collating sequence is selected, and this next higher character is designated Y'. Then Step 67 is entered which compares Y' with the $Z_D$ byte in UK-Z at its difference position $D_B$ to determine equality or nonequality therebetween. This test is necessary in order to assure that $Z_D$ is greater than Y', which is indicated by inequality in the comparison. Then the steps 32, 33a and 68 are executed, which involve storing a 1 as $L_B$, storing $E_B$ as $F_B$, and Y' as the K byte for the current CK. On the other hand, if equality is found between Y' and $Z_D$, one or more noise bytes after $Y_D$ must be obtained from UK-Y in order to force a distinction between the K bytes being generated and the bytes in the corresponding positions in UK-Z. This distinction is obtained by taking the first noise byte N1-Y from UK-Y and entering step 66 to obtain the next higher byte Y' after N1-Y in the collating sequences. Then step 67 is entered and if an unequal is found, $L_B$ is two and both $Y_D$ and Y' are stored as K bytes. $E_B$ is stored as $F_B$ for this CK. The K field will be increased as long as equality is found between Y' and $Z_D$ and N in step 32 as increased by one for each such equality found.

Step 41C follows step 33 and stores the K bytes from the UK-Y as previously was done from UK-Z by step 41 in FIG. 6A.

Then step 69 is entered from step 41c which causes the last byte of the stored K bytes to be the Y' byte used in step 67 when it found an unequal condition. Thereafter the flow diagram in FIG. 9C proceeds as previously explained for FIG. 6A.

In any embodiment utilizing the method of this invention, it is essential that a particular format be provided for the input stream of Uncompressed Keys and for the output stream of Compressed Keys. Many aspects of the format are arbitrary, but once a format is selected, it must be adhered to since an operating embodiment is generally restricted to a particular format to obtain minimization in its design. FIG. 13 illustrates a particular format for the input string of UK's and their Pointers. Similarily, FIG. 14A provides a particular format for the resulting output string of CK's and their pointers.

In FIG. 13 each UK designation is subfixed with a number from 0 to N representing the position of the UK in the sorted sequence beginning with UK-0 and ending with UK-N.

The input format in FIG. 13 accommodates variable-length UK's by having a UK count field (UK CT) precede each UK; it may comprise a single byte of eight bits for accommodating UK-lengths up to 255 bytes. The count field is also subfixed with the same subfix number (*o–n*) as is the UK to which it is applicable. A pointer (PTR) field is associated with each UK and has the same subfix as the UK with which it is associated. The pointer addresses the item represented by the UK. The pointer may also be variable length, and the length may be specified by a pointer count field (PTR CT) preceding each pointer field (PTR) with the same subfix. The pointer count (PTR CT) also need not use more than one byte of eight bits to accommodate a pointer address of up to 255 bytes.

The end of a UK stream is indicated after the last pointer (PTR-*n*) by an all zero byte. This all zero byte will occur when the next UK count field is expected, and therefore a valid count field cannot be zero. Accordingly, the UK generation operation terminates when a zero UK count is sensed.

Figure 14B:
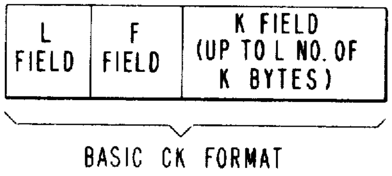

The CK (Compressed Key) format in Fig. 14A arbitrarily presumes the sequence LFK for each CK. L is the number of K bytes in the CK, F is the number of bytes factored from the most significant side of the UK, and K represents the UK bytes in the CK, which can be absent. Any order among L and F may be used, although the order chosen must be used without exception. The format in Fig. 14A is preferred. The Basic CK format is shown in Fig. 14B. The L and F fields may each occupy a single byte of eight bits, or they may together occupy a single byte of eight bits, such as four bits each. The choice is dependent on the size of the L and F fields expected for the contemplated Index usage. The K bytes, if any, are last in the format, with the K bytes sequenced in the same order as in the UK from which they were derived. The pointer count (PTR-CT), and pointer (PTR) immediately follow the LFK field, and they are taken directly from the corresponding fields associated with the UK which is being represented by the CK. The last CK in a Compressed Index in Fig. 13 is indicated by having all zero bits in its L field and F field which are followed by the PTR CT-N and PTR-N fields, which is the corresponding field associated with the last UK in the Uncompressed Index.

It is possible to extend the L or the F fields to represent large numbers of characters for a relatively few CK's even though the average CK length for a Compressed Index might be small, for example between one and two bytes. Usually only a small percentage of CK's in an Index will have more than a few bytes. Accordingly it may be efficient to have an LF representation which is small, such as a single byte, which is adequate to represent for example over 95 percent of the CK's in an Index. Then special extender fields can be used for the less than 5 percent remaining of the CK's.

Figure 14C:
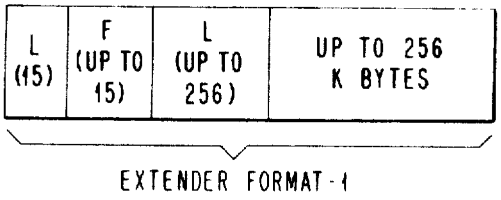
Figure 14D:
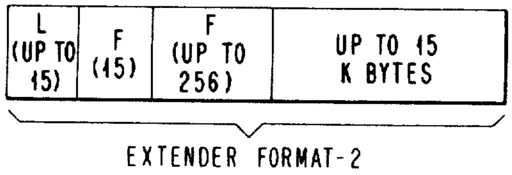

FIG. 14C shows an extender format which permits one-half byte L and F fields to be extended to accommodate up to 255 bytes each. As previously mentioned, L and F cannot both be zero in the format of FIG. 14A except for the last CK in a Compressed Index.

The four bits for either L or F can be coded to 15 codes other than zero. One of these 15 codes, such as the code for 15, may be reserved to indicate an *extended situation* for each field. In the latter case, the L and F fields can each accommodate a maximum value of up to 15 bytes, i.e. a maximum value of 14. However, if either or both of the L and F fields should overflow beyond 14, the overflow condition is indicated by the 15 code placed in the respective field which has overflowed 14. The 15 code for either of both L or F indicates that one or two extender bytes such as in FIG. 14C, D or E immediately follow the basic L, F byte and before the K bytes.

One extender byte is added if either the basic L or F field contains the 15 code indicating an overflow. The extender byte then entirely contains the L or F field for representing up to 255 bytes. An extender byte can hence be taken as the sole representation of the L or F value. If the L field is extended, the number of following K bytes is equal to the value represented in the extender byte for L.

Figure 14E:
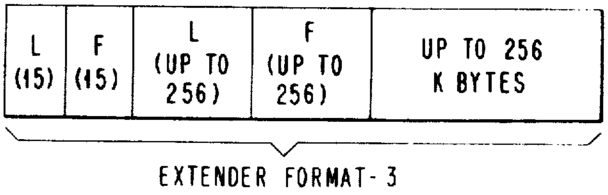

FIG. 14E represents the case where both the L and F fields are required to be extended beyond 14. Thus two extender bytes are added, and they have the same order as the basic L and F fields. Each extender value therefore contains the respective true L and F values. For example, if 33 K bytes exist, and the F value is 21, the L and F fields in the Basic CK Format for that CK will each contain a 15 code to indicate following L and F extender bytes which will have the quantities 33 and 21 respectively. Thirty-three K bytes will follow the F extender byte in the CK.

FIG. 1 illustrates a data path controlled to obtain the generation of Compressed Keys from Uncompressed Keys.

The embodiments herein use the format in FIG. 13 for the UK's as their input stream of N number of UK fields, where N can be any integer. This stream of input UK's is the result of a prior computer UK sorting operation, such as sorting program of conventional type for handling variable-length keys, each immediately proceeded by a count field of the number of bytes in the following key, and each UK immediately followed by a pointer field for locating the data represented by the UK. The embodiment uses a variable length pointer field which is inclusive of a fixed length pointer field as a special case. For example, a fixed length pointer may comprise two bytes from which the address of the respective key can be derived by an appropriate algorithm, such as the algorithm being used in the IBM OS/360 System Program called Basic Direct Access Method (BDAM). A discussion of the addressing under this program may be found in the publicly available IBM Manual having form Number Z28-6617.

The variable pointer field may nevertheless be used with a fixed length pointer to accommodate some of the information indexed by the UK, hence the pointer count byte would designate the end of the pointer and information field and the beginning of the next UK field The number of bytes allocated to the UK count field must of course be compatible with the maximum permissible length for the UK's The single byte count field (UK CT) used in FIG. 13 accommodates a maximum UK length of 255 bytes which is considered adequate for almost all situations. If required, a two byte count field can be used, which will accommodate a maximum UK length of over 16,000 bytes.

The input byte sequence described in connection with FIG. 13 is transmitted from a source 81 into a source memory 83 shown in FIG. 1 which may be any type of byte-randomly accessible memory, such as magnetic core memory, thin film memory, monolithic memory, etc.

FIG. 14A illustrates the format for the compressed keys (CK's) outputted from a Destination Memory 84 in FIG. 1 to a sink 82. This CK stream is in a form which can thereafter be used for searching for the information indexed therein.

The destination memory may be any kind of memory including a sequential memory such as a disc or drum, continuous or incremental tape, or a random accessible memory such as even the same memory which provides source memory 83.

In FIG. 1, a source 81, which may be an I/O device, provides an Uncompressed Index string of bytes having the format represented in FIG. 13 to a source memory 83.

A sink 82 in FIG. 1, which may be an I/O device, receives the output of the system in FIG. 1 which is a Compressed Index string of bytes having the format shown in FIG. 14A from a Destination Memory 84.

Source Memory 83 and Destination Memory 84 may be in different memories, or may be in different or overlapping areas in the same memory device, such as in a core memory, monolithic memory, magnetic drum, or disc memory.

The computer system between memories 83 and 84 comprises a plurality of registers, input gates (IG), output gates (OG), and busses.

A Source Storage Data Register (SSDR) connects the output of Source Memory 83 to a Source Memory Output Bus 86. The Source Storage Data Register (SSDR) provides a byte of signal to a Source Memory Output Bus 86 when Memory 83 is actuated by a Start Signal SS while receiving an address from either a Y Storage Address Register (YSAR) or a Z Storage Address Register (ZSAR) when either is respectively outgated by either an OG(YSAR)-2, or an OG(ZSAR)-2 signal.

An Adder 88 provides its output to an Adder Latch 89 which stores the magnitude of inputs A and B provided to the Adder 88. Latch 89 has a sign position G to indicate the sign for the magnitude stored in latch 89. Position G operates by being set by an overflow from the other digit positions in Latch 89.

A comparison between inputs A and B to Adder 88 is performed by adding A to the two's complement of B. In this case, A and B are equal if a zero magnitude results in latch 89. A nonzero magnitude indicates inequality between A and B, in which case the G position indicates which is greater than the other. If G is one, A is greater than B; and if G is zero, A is less than B.

The two's complement of any true value of B applied to a complementer 93 can be obtained by actuating a gating signal IG(C) which obtains the one's complement of B and adds a "-hot" one, sometimes called an "elusive" one in the computer arts.

An Adder Input A-Bus 91 is connected to the A input of adder 88, while an Adder Input B-Bus 92 is connected to complementer 93 at the B input to adder 88. The true value of the B-Bus signals pass through complementing circuit 93 when its control signal IG(C) is not actuated.

Two other inputs IG(B1) and IG(B2) are connected via complementing circuit 93 to respectively provide the digit one or a two as true-valued inputs to the lowest digit position of adder input B, unless the IG(C) signal is actuated in which case the two's complement value is provided A Zero Tester 94 is connected to Adder Out Bus 87 to receive all output signals from latch 89 except the G output.

Clocking, Branching, and Gating controls 95 receive the signals from Zero Tester 94 on lines 94*a* and *b* and the signals from Sign Position G of Latch 89 and provide the proper ingating (IG) and outgating (OG), and memory start control signals required throughout the system of FIG. 1.

A plurality of registers are connected between Adder Out Bus 87 and Adder Input A-Bus 91. Each of these registers can ingate from Bus 87 when its input gate is appropriately actuated by an ingating (IG) control signal. Likewise, each of these registers can provide an output to B-Bus 91 when its output gate is actuated by appropriate outgating (OG) control signal. These registers are defined in the following table in which the symbol for the register is in the left hand column, and the meaning of the symbol is given in the right hand column.

| | |
|---|---|
| ZSAR | The Z Storage Address Register. It contains the address for the next byte of the UK-Z to be fetched from source memory 83 |
| YSAR | The Y Storage Address Register. It contains the address for the next byte of UK-Y to be fetched from source memory 83. |
| $F_a$ | Current F Register. It receives the F value for the current CK being generated. |
| $E_a$ | Current Equal Bytes Register. It stores the number of Equal bytes in the currently compared UK-Y and UK-Z. |
| $L_a$ | Current L Register. It receives the current L value representing the number of K bytes in the current CK being generated. |
| ZCNT | Z Count Register. It stores the number of remaining bytes in the current UK-Z being processed that have not been fetched. |
| DSAR | Destination Memory Storage Address Register. It contains the address of the next byte to be stored in Destination Memory 84. |
| $L_l$ | Last L Register. Stores the L value of the last CK generated |
| $E_l$ | Last Equal Bytes Register. It stores the number of Equal bytes determined in the immediately prior UK comparison. |
| Z | Z Byte Register. It stores the current byte of UK-Z being processed. It can also be used to store the pointer count (PTR CT) byte. |
| Y | Y Byte Register. It stores the current byte of UK-Y being processed. |
| S | S Value Register. It stores the S value which is the difference between the current $E_a$ and $E_l$ values. |
| YCNT | Y Count Register. It stores the number of remaining bytes in current UK-Y being processed that have not been fetched. |

Source memory 83 in FIG. 1 uses a single CLK clock cycle to read a byte to the Source Storage Data Register (SSDR), which provides the byte during the next following cycle to Source Memory Output Bus 86.

A Start Storage signal SS is provided to Source Memory 83 to start the internal memory controls for reading the byte at the address location into the SSDR register, from which the byte is provided to Bus 86.

Destination memory 84 requires two CLK cycles to write a byte received from Destination Storage Data Register DSDR. During one CLK cycle, memory 84 receives a Start Destination Memory signal SD and is addressed by the DSAR register output in response to a signal OG(D), and it clears the addressed byte position. During the next CLK cycle, the contents of the DSDR register are transferred to the byte position which was addressed in Memory 84.

Some of the registers have a second input or output gate so that they can input or output to or from more than one bus. Where a register has more than one input or output gate, such plural gates are distinguished by post-fixed numbers after the respective control signal identification in FIG. 1.

The ZCNT and YCNT registers each have a second input gate connected to Source Memory Bus 86 from which they can ingate the addressed byte from Source Memory 83 when respectively gated by an IG(ZCNT)-2, IG(YCNT)-2 control signal. Their other input gates connect to Adder Output Bus 87 when respectively actuated by IG(ZCNT)-1, or IG(YCNT)-1 control signal.

The ZSAR and YSAR registers each have second output gates which connect to the addressing input of Source Memory 83 when outgated respectively by control signals OG(ZSAR)-2, or OG(YSAR)-2. Their other output gates connect them to A-Bus 91 when respectively actuated by OG(ZSAR)-1, or OG(YSAR)-1.

The $E_a$, S, and YCNT registers have second output gates which connect to B-Bus 92 when outgated by a respective control signal OG($E_A$)-2, OG(S)-2, and an OG(YCNT)-1. Their other gates connect them to the A-Bus 91 when respectively actuated by control signals OG($E_A$)-1, OG(S)-1, or OG(YCNT)-2. The DSAR register is connectable to either A-Bus by signal IG(DSAR), or to Destination Memory 84 by signal OG(D).

FIGS. 2 A—N provide a particular embodiment of clocking, branching, and gating controls 95 for generating the control signals needed to operate the data path in FIG. 1 according to the method illustrated in FIG. 6A.

It will be obvious to one skilled in the computer architectural design arts, after studying this specification, that many other data paths than shown in FIG. 1 can be provided; and that with respect to the data path in FIG. 1 many different forms of controls 95 may be designed in many different ways other than the particular form of controls shown in FIGS. 2A—2Q-3.

FIG. 2A shows an overview of the detailed form of the Clocking, Branching, and Gating controls 95 in FIG. 1, which are shown in greater detail in the following FIGS. 2B—N.

FIG. 2B—1 illustrates a single cycle of wave forms provided at the output of Clock 101 in FIG. 2B-2. Clock 101 is a conventional binary clock and matrix designed to provide the illustrated waveforms. The five waveforms provided are labeled CLA, CLB, CLC, CLR, and CLL. Waveform CLB rises simultaneously with the rise of CLA, but waveform CLB falls before CLA falls. Waveform CLC rises at the fall of CLA and is up for approximately the same duration as CLB. Waveform CLR is up after CLC for approximately the same duration as CLC during the midpart of the clock cycle. The CLL waveform is up at the end of a clock cycle for approximately the same duration as the CLC waveform. The CLA, CLB and CLC waveforms gate the Sequence Control Clock and Latch circuits shown in FIG. 2C and D.

The design of a clock, such as clock 101, providing the illustrated waveforms is currently within the common skill of the computer arts; and hence no further detail need be given on its design.

An oscillator 102, or other timing source, provides an output wave which drives clock 101 through a gate 103. Oscillator 102 might, for example, have an output rate of 10 million or more pulses per second.

A Clock Stopping Circuit 105 controls the enablement of gate 103 by means of a Stop Latch 104.

A Start Signal line 100 connects to the reset input of latch 104 which when pulsed, enables gate 103 to pass oscillator pulses to drive the clock 101 continuously through its cycles until the oscillator pulses are blocked by the setting of latch 104 with a signal from an OR circuit 106. Accordingly, clock 101 cycles continuously after latch 104 is reset by a Start Signal, and clock 101 stops cycling when latch 104 is set by a signal from OR circuit 106.

OR circuit 106 provides a Stop signal output whenever the method of FIG. 6A requires an end of operation. For example, a Stop signal occurs when the End of Index is sensed, or whenever any error condition is sensed which prohibits further reliable operation of the method. The timing of particular stop signals is indicated by the labeling on the inputs to AND gates 107 through 110 in FIG. 2A-a.

FIG. 14Q provides a Control Signal Sequence Chart for obtaining the method of FIGS. 3A—E with the data-flow path in FIG. 1. The Chart in FIG. 2Q illustrates the sequencing of a plurality of CLK cycles and illustrates the control signals provided during each CLK cycle. The Chart includes 62 different CLK cycles identified on the left side of the Chart by a number between 0 and 127. The Chart has three columns of which the center column s titled "T or F," and it is the normal column for sequential cycling operations. The other two columns, T (True) on the left, and F (False) on the right in FIG. 2Q, are used during the branching operations.

The output state of a Branch trigger 110 in FIG. 2N controls which of the T or F column in FIG. 2Q is to be used. However, the T or F output state of Branch trigger 110 is ignored when the middle column in FIG. 2Q is being used. The use of the T or F output to chose a particular column in FIG. 2Q is determined by the Input and Output circuits in FIGS. 2 F—K in combination with the input gating to the clocks in FIGS. 2 B-2, and 2C. This clock input gating interrupts the normal clock stopping by switching its cycling to an out-of-sequence CLK, which may be forward or backward in the CLK sequence in FIG. 2Q.

The CLK cycles in FIG. 2Q begin at 127, which resets all critical circuits. The Chart ends at CLK cycle 73, which causes a branch back to CLK cycle 0. Each cycling from CLK 0 to 73, is a single pass through the method in FIG. 6A for generating a single CK from a pair of UK's.

The CLK cycles initially move from CLK to CLK 0. Cycle 127 is executed only once at the beginning of generation of a CK index. Thereafter the continuity of CLK cycles is: 0—11, 16—27, 32—44, 48—60, and 62—73. During CLK sequencing, certain CLK cycles can be skipped or can be repeated, which in some case depend upon the data configuration of the UK pairs being handled. The branching control circuits are sensitive to the data configuration.

The CLK cycles in FIG. 2Q execute the detailed operations represented in the flow chart in FIG. 3A—E which apply the method of FIG. 6A to the data path in FIG. 1. In FIGS. 3A—E a relationship is indicated between each step represented by a box and the corresponding CLK cycles which execute that step.

All gating signals that are grouped together by comma separation in a column of FIG. 2Q provided during the same CLK cycle to gates in FIG. 1, although some signals are provided at different times during the same cycles, such as at CLC, CLR, or CLL times.

All signals in FIG. 2Q are illustrated in FIG. 11 except the reset inputs, and the branching signals TZ, TP and TN. The branching signals are generated by the circuits in FIGS. 2M and N. The reset inputs to the registers, as well as the registers per se, are conventional and are not shown in detail to avoid cluttering the drawings.

Examples of the operation of the first four CLK cycles in FIG. 2Q follow, which with help from FIGS. 3A—E will show the reader how all CLK cycles in FIG. 2Q can be understood.

During the initial CLK cycles 127, the YSAR and DSAR registers are set to starting addresses for a CK Index generation operation. The YSAR register set to the address of the UK CNT-0 byte in Source Memory 83 at the beginning of the Uncompressed Index of the type represented in FIG. 13. The initial setting for the DSAR register is for addressing an initial byte position in Destination Memory 84 at which the L byte for the first CK of the resulting CK string is to be stored, using the format shown in FIG. 14A.

Memories 83 and 84 can be the same physical memory box in which the generated CK string overlays the UK source string; in this case DSAR can be initially set to the same address as YSAR.

During CLK cycle 0, the signals G(YSAR)-2, and SS are activated. They cause the address in YSAR to be outgated to Source Memory 83 where it addresses the count byte (UK CT-0) of the first UK. Signal SS starts a memory cycle to read the addressed byte into the SSDR register, which will be available on Memory Bus 86 during the next cycle time.

CLK cycle 1 actuates IG(YCNT)-2, and OG(YCNT)-2 to cause the UK CT-0 byte on Bus 86 to be ingated into the YCNT register and to be outgated from the YCNT register to Adder Input A-Bus 91. When any input is received by Adder 88, it is ingated into latch 89 by CLL at the end of the same cycle, and it will be available to Adder Outbus 87 and Zero Tester 94 during the next cycle. UK-0 will be UK-Y and in the first comparison between UK-Y and UK-Z.

CLK cycle 2 activates a TZ signal which causes the output of Zero Tester 94 to be examined, the OG(YSAR)-1 signal outgates the contents of the YSAR register to the A-input to Adder 88, and the IG(B1) signal gates a digit one to the B-input of Adder 88. During clock pulse CLL at the end of the current cycle, the contents of Adder latch 89 will contain the YSAR address incremented by one.

During CLK cycle 3, a branch is taken that was determined during the TZ signal in CLK cycle 2 by the T or F setting of Branch trigger 110 in FIG. 2N. The branch direction T or F depends on the input data conditions represented in FIG. 3A, which tested the UK CY-0 byte for an all zero condition. A UK count byte cannot legitimately be zero unless it is used to indicate an End of Index. Hence, an all-zero UK count byte stops the operation by causing a branch to 3T. If the UK count is not zero, operation continues with a branch to the 3F signals; and the IG(YSAR) signal ingates into YSAR the incremented YSAR address, the OG(YCNT)-1 signal outgates the YCNT register contents to A-Bus 91, and the OG(YSAR)-1 signal outgates the YCNT register to the B-Bus 92. The sum of these A and B bus adder inputs is available from adder latch 89 during the next cycle. This sum is the address of the UK CT-1 byte in Memory 83. UK-1 will become UK-Z in the first comparison of UK-Y and UK-Z.

In the preceding manner, one can trace the data flow operations in FIG. 1 using the Control Signal chart in FIG. 2Q, and the flow chart in FIGS. 3 A—E to obtain the method in FIG. 6A.

The branching control signals TZ, TP and TN are generated in the circuits of FIGS. 2M and N. Control signal TZ is generated by OR circuit 122, signal TP by gate 123, and signal TN by OR circuit 126 in FIG. 2N.

The TZ signal determines the time when the state of a Zero Test latch 127 in FIG. 2M is to be transferred to Branch trigger 110. A set state for latch 127 indicates zero magnitude in Latch 89, and a reset state indicates a nonzero magnitude. Thus, a zero (0) output from latch 127 is transferred as a T state for trigger 110, and a not-zero output is transferred as an F state for trigger 110.

Control signals TP and TN determine when the state of a Sign Test latch 128 in FIG. 2M is to be transferred to Branch trigger 110. The distinction between the TP and TN signals is that for the same output state from Sign Test latch 128, Branch trigger 110 is set to an opposite state by TP and TN. Thus, for a G1 output (Adder latch positive sign) from latch 128, a TP signal sets latch 110 to a T output, while a TN signal resets latch 10 to an F output state.

The particular CLK cycles in FIG. 2Q during which the TZ, TP, and TN signals are provided are indicated by the labeling on the inputs to respective circuits 122, 123, 124, and 126.

A Request circuit 121 in FIG. 2M determines when the contents of Adder Latch 89 are to be tested for zero magnitude and sign by transferring the output state of Zero Test circuit 95 and the G position of latch 89 in FIG. 1 to latches 127 and 128 respectively. Circuit 121 provides this Request signal in response to an ingating to Adder Latch 88 from any one of the $L_A$, $L_B$, ZCNT, $L_A$, Z, or YCNT registers. The Request signal is provided to AND circuits 131—134 in FIG. 2M. Thus, Zero Test latch 127 and Sign Test latch 128 are respectively set to indicate the zero and sign state of the adder latch contents in response to any input signal to OR circuit 121, at the end of a cycle by a clock pulse CLL.

When Zero Test latch 127 or Sign Test latch 128 is set, it retains its setting until the next time OR circuit 121 receives an input, which can be many cycles later. Hence, TZ, TP or TN signal causes the state of latch 127 or 128 to be transferred to Branch trigger 110 to control the operation of the system according to the sequence shown in FIG. 2Q. Branch trigger 110 is also set at the end of a clock cycle by a clock pulse CLL when a TZ, TP, or TN signal is present, so that this particular T or F output is available during the next and following CLK cycles until trigger 110 is again actuated.

Hence the output of Branch trigger 110 is used as shown in FIG. 2A to select out-of-sequence CLK cycles for the Sequence Control Clock in FIG. 2C using CLA clock pulses. Normal Sequential actuation downwardly in FIG. 2Q is caused by the Sequence Control Clock in FIG. 2C receiving the CLB pulses, and the Clock Latch in FIG. 2C receiving CLC pulses.

Figure 2D:
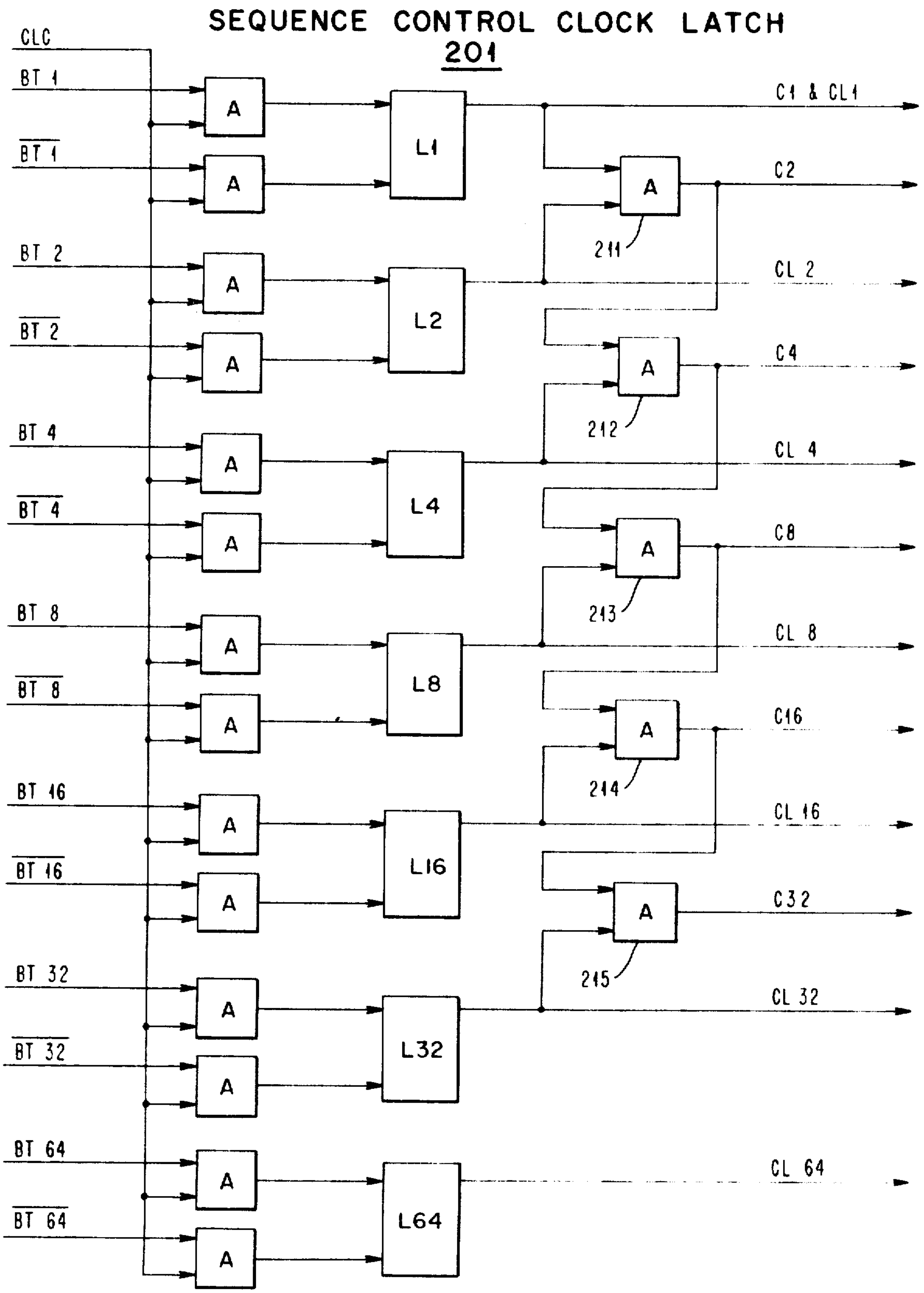

Sequence control clock in FIG. 2C provides its output to the input of the Sequence Control Clock Latch in FIG. 2D. The Sequence Control Clock has all of its Binary Triggers (BT) set to a one state by a pulse on Start Signal line 110 which also starts clock 101 in FIG. 2B-2 to provide its clock pulses. The all-ones output of BT's 1—64 is transferred to Latches 1—64 in FIG. 2D by the CLC Clock pulse to energize lines CL 1—64 to Binary Decoder 23 in FIG. 2E, which energizes its CLK 127 output line. The CLK 127 output conditions AND gate 208 in FIG. 2C, which at the next CLA pulse step the clock to an all-zero state by setting all BT's to zero. This setting is transferred in the manner previously described to the circuits in FIGS. 2D and E to activate the CLK 0 line. This begins normal CLK cycling, in which the CLK cycles are initiated by CLC pulses which cause the transfer into Latches L1—L64. Then the Sequence Control Clock is sequentially cycled under activation by CLB pulses until the sequential operation is interrupted by activation of one of the input gates in FIG. 2C.

Each CLB Clock pulse, except during CLK 11T, 35F, 54T, 60 and 62F, passes through AND gate 201 in FIG. 2C to flip BT-1 to its opposite state. AND gates 211—215 in FIG. 2D feedback their output C 2—64 to AND gates 203—207 in FIG. 2C. AND gate 202 receives the true output C1 from latch L-1 in FIG. 2D.

After CLK 0 causes a clock pulse CLA to set all BT's to zero (F state), the following CLB flips BT-1 to T state so that the Sequence Control Clock is set to one. The following CLC pulse transfers this one count to the Clock Latch in FIG. 2D, which activates CL1 and feeds back the C1 output to gate 202. CLK 1 generates CK-1 from the Decoding circuit in FIG. 2E. The next CLB pulse during CLK-1 passes through gate 202 and 201 to set the clock to count two, which is transferred to the Clock Latch with the CLC pulse to bring up CL2 and begin CLK 2. No feedback results, from AND gate 211, and the next cycles CLB pulse flips only BT-1 to provide the Control Clock with a count of three, which is transferred by CLC to the Clock latch and enables gate 211 to provide a CL2 and CL1 to start CLK 3. C2 is fedback to gate 203 in FIG. 2C, and the C1 is fedback to gate 202. Hence, the CLB pulse on the next Clock cycle flips BT-1, BT-2, and BT-3 to obtain a count of four for the Control Clock.

In this manner, the combination of the Sequence Control Clock and the Sequence Control Clock Latch act as a unit, so that sequential cycles from clock 101 step the Control Clock in a binary sequence. This binary stepping sequence is interrupted by activation of one of the input AND gates to circuit 14C which causes its sequence to be interrupted at the input condition indicated therein according to the branching representations in the Chart of FIG. 2Q under the control of the T and F settings of branch trigger 110 in FIG. 2N.

Figure 2E:
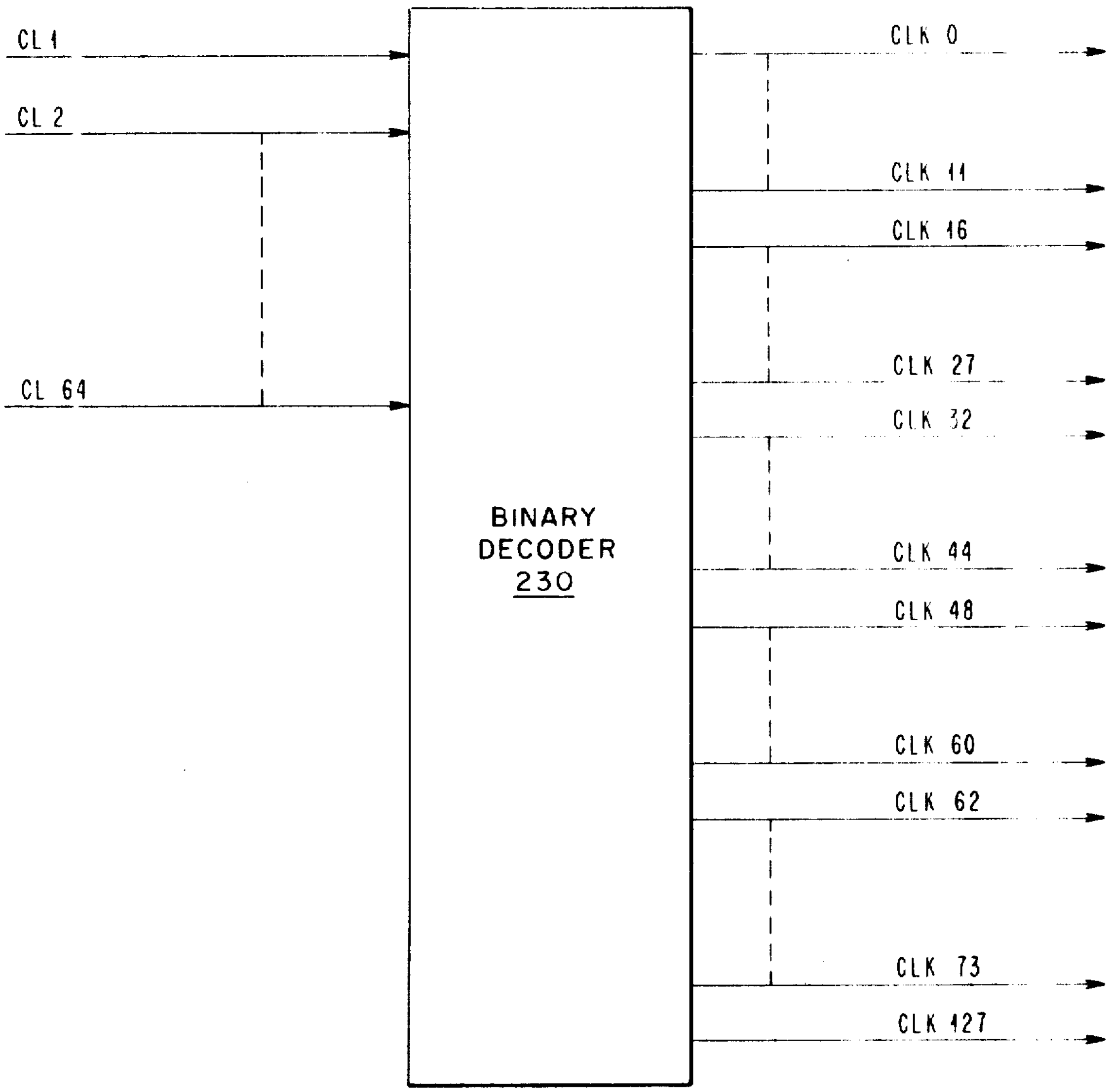

Signals CL 1—64 from the Clock Latch in FIG. 2D are provided as binary inputs to a Binary Decoder shown in FIG. 2E, which may be a conventional binary input to single-active output decoder, in which each unique binary input combination causes the actuation of a single different output line. The 62 output lines from the Decoder respectively correspond to the 62 different CLK cycles indicated in the left hand column of FIG. 2Q. Each CLK cycle line is active for one period of clock 101 at any one time.

The register ingating IG and outgating OG signals are generated by the control circuits shown in FIG. 2F—L which receive the CLK signals and the T, F signals from branching tripper 110 in FIG. 2N from which all of the IG and OG signals are derived.

Figures 1, 2F:
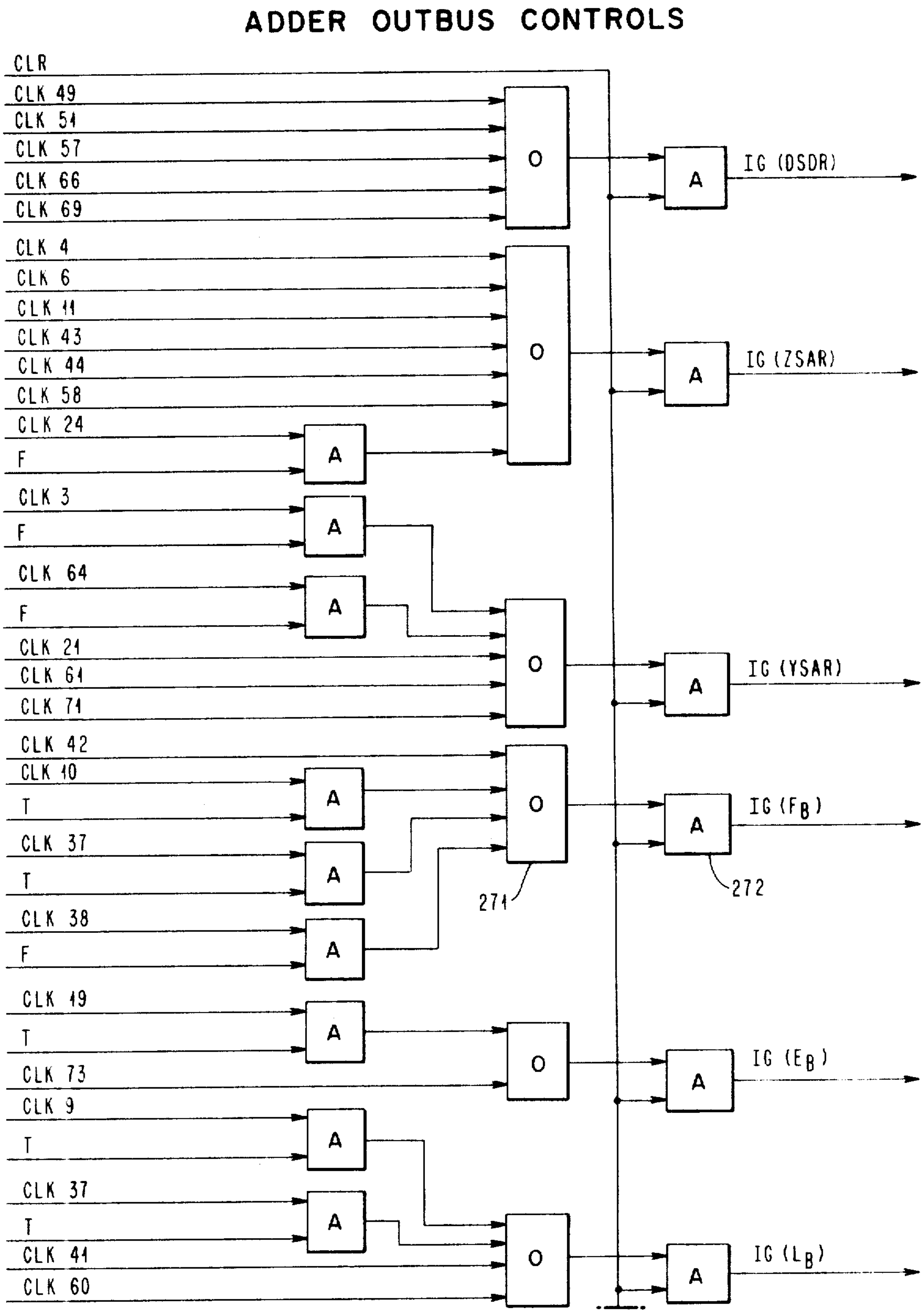
Figures 2, 2F:
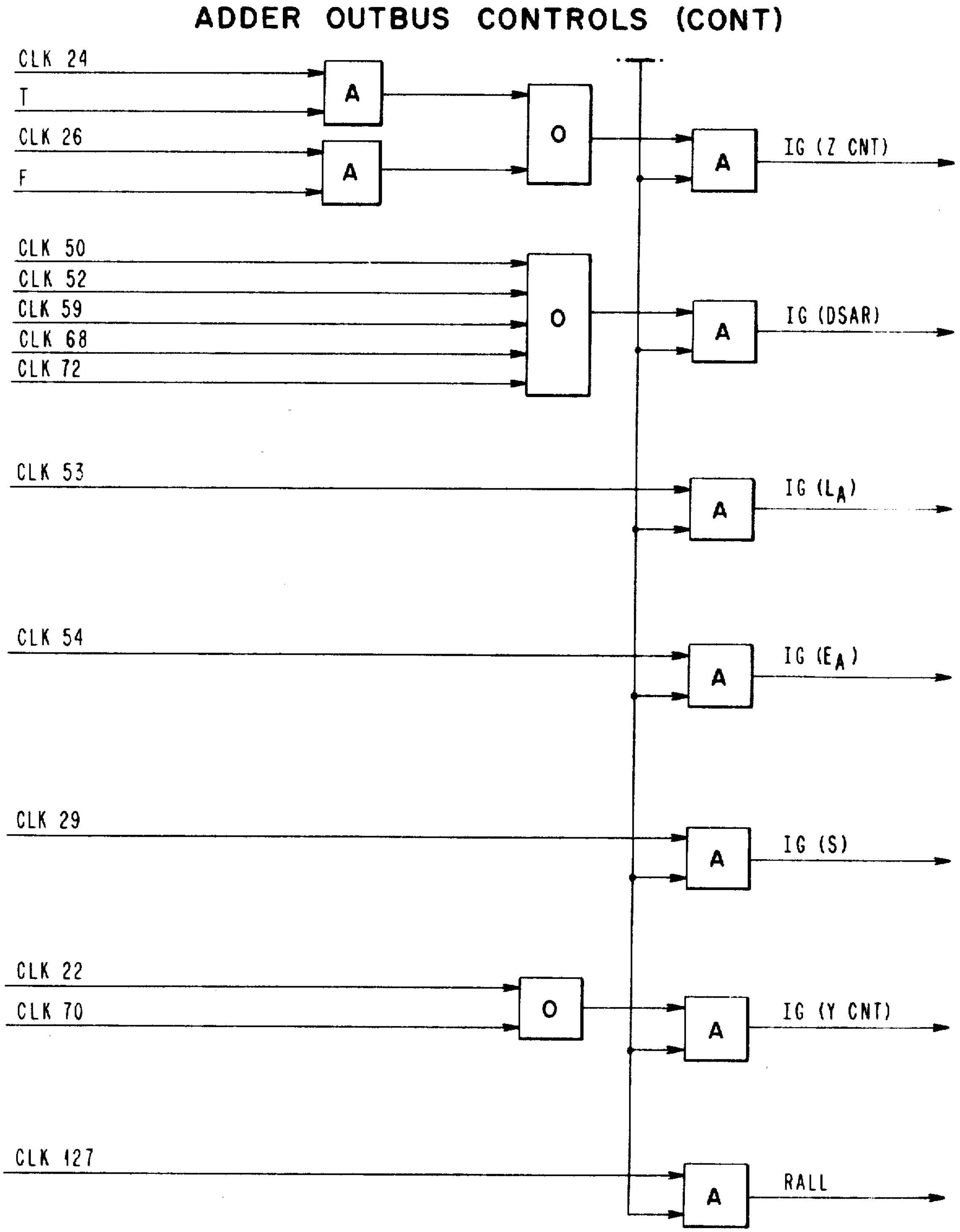
Figures 1, 2G:
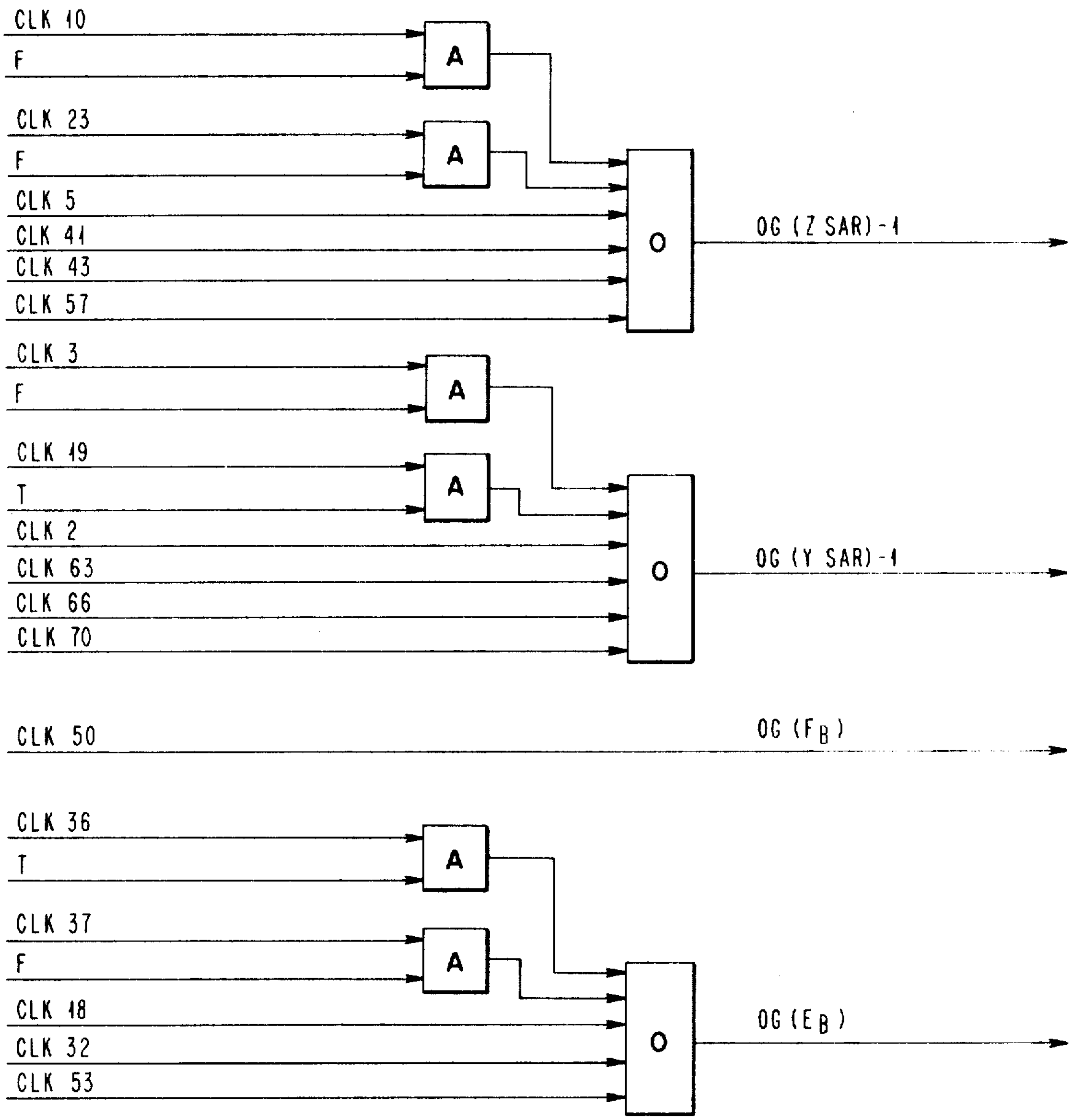
Figures 2, 2G:
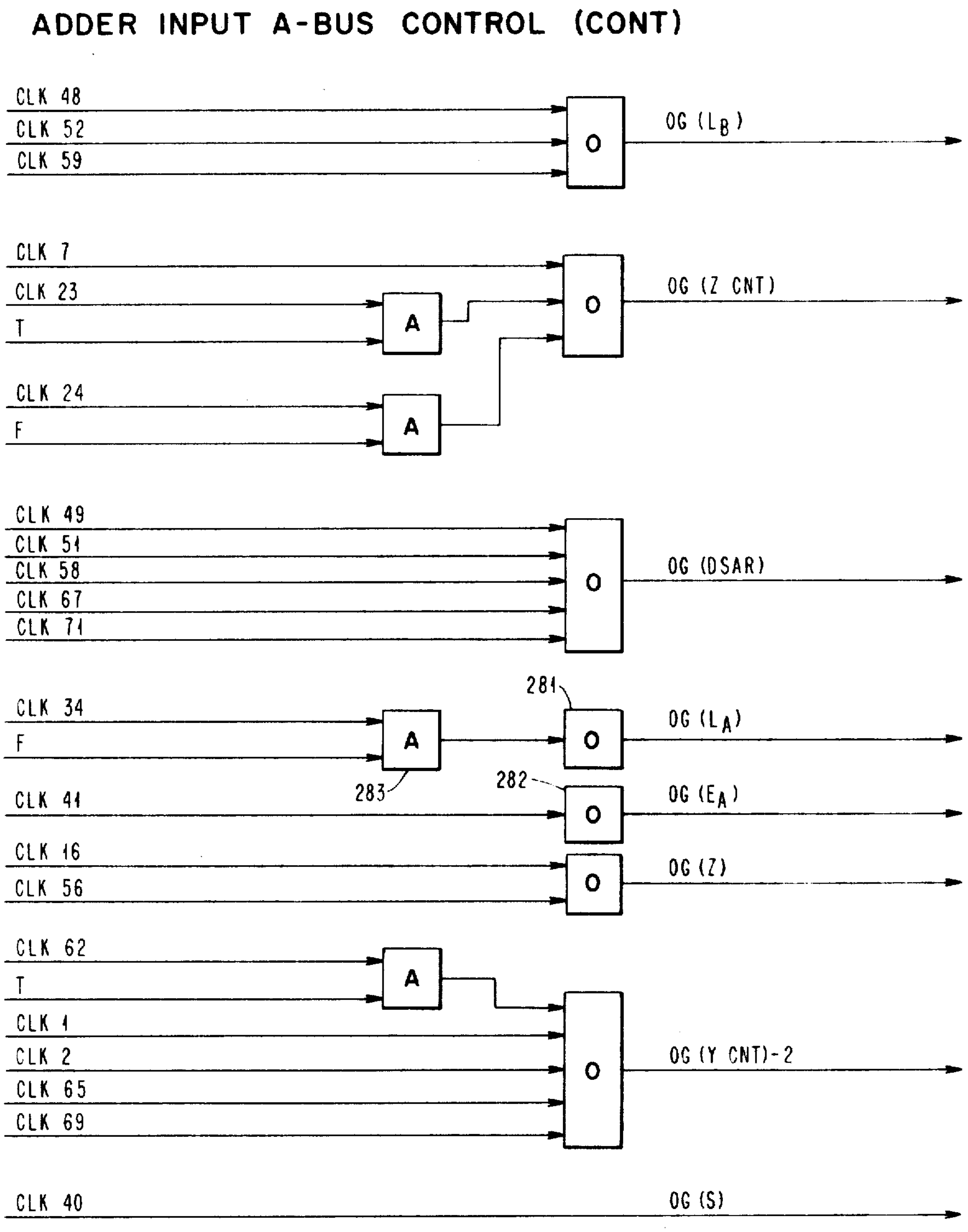

The IG control signals generated in FIGS. 2F-1 and 2F-2 control ingating from the Adder Output Bus. These IG Control signals are timed with the CLR pulses.

All of the other IG and OG signals are active throughout the required CLK cycle, which begins at CLC clock time and lasts for one cycle of clock 101. The control signals generated in FIGS. 2G-1 and 2G-2 cause outgating to the Adder Input A-Bus. The control signals generated in FIG. 2H cause outgating to the Adder B-Input. The control signals in FIG. 2J outgate to the Source Memory 83. The control signals in FIG. 2K cause ingating from the Source Memory Output Bus 87, and the control signals in FIG. 2L cause ingating to Destination Memory 84.

The Chart of FIGS. 2Q summarizes the Method of FIG. 6A as implemented on the data path of FIG. 1 using the control signal sequence shown in the flow-diagram of FIGS. 3A—F. FIG. 3 shows the relationship among FIGS. 3A—F.

In FIG. 3A, the resetting operation of all critical circuits in FIG. 1 is executed by Step 10. This executes Step 10 in FIG. 6A since registers $F_A$and $L_A$ are zeroed by the reset. The YSAR and DSAR registers are also initialized to required starting addresses in memories 83 and 84.

Then Step 11 is entered to obtain the next pair of keys UK-Y and UK-Z (beginning with the first pair). Step 11 is executed when two sequential UKCT bytes are fetched respectively into registers YCNT and ZCNT. Initially the YSAR register is set to the address of the count byte (UK CT) for the first UK-Y. Then this byte is fetched into SSDR and ingated into the YCNT register during clock cycles 0 and 1. The YCNT byte is zero tested as are all fetched UK CT bytes. Next the address of UK-Z is generated by fetching the Y-pointer count byte (PTR CT), adding it to the YCNT content, adding this sum to the YSAR content and loading the result into the ZSAR register. To do this, the YCNT and YSAR contents are transferred to Adder 88 and their sum is transferred from Adder latch 89 to the ZSAR register to obtain the address of the first PTR CT byte during CLK cycles 3 and 4. Then the ZSAR addresses memory 83 to fetch the Y-pointer count byte (PTR CT), which is transferred into the Y register during CLK cycles 4 and 5. The next UK CT byte address is generated by sending the Y register contents and the ZSAR contents to Adder 88, and their sum in Latch 89 is transferred into ZSAR to provide it with the address of the UK CT byte for he current UK-Z during CLK cycles 5, 6 and 7.

Step 12 is the Zero Test of each fetched U-Z count byte (CT BT) after it is transmitted to Adder Latch 89 during CLK 8. If zero, and End of Index is indicated and CLK cycles 9T and 10T reset the $L_B$ and $F_B$ registers to zero. If not zero, Step 13 is entered.

Step 13 is performed when corresponding Y and Z bytes are fetched from Memory 83, transferred to Y and Z registers, and compared during cycles CLK 8F, 9F, 10F and 16. The comparison is obtained between the Y and Z bytes in the registers by transmitting them to Adder 88 which adds the true binary Z byte to the two's complement binary form of the Y byte. Equality between bytes Y and Z is indicated by a zero magnitude in latch 89, as determined by Zero Test circuit 94. Inequality is indicated by a nonzero magnitude in latch 89. If Z is greater than Y, no overflow bit is provided to Sign trigger G by the two's complement addition. But if Z is less than Y, an overflow bit is provided to Sign trigger G. Whether Adder 88 adds or subtracts (compares) is controlled by an IG (C) signal to complimenter 92.

The fetching of Y and Z bytes ends for any UK pair when its $D_B$ position is sensed by finding Y less than Z, which is the only valid condition for indicating the $D_B$ position. Step 16 is then entered.

Step 14 is entered each time equality is found between Y and Z bytes by Step 13 during CLK 17 and 18T. Then one is added to the Equal Count in register $E_B$ during CLK 18T and 19T. This is done by transferring the $E_B$ content through Adder 88 while IG (B1) is activated. The incremented result is loaded from latch 89 into register $E_B$. Then the next Y and Z bytes in the UK pair are fetched by incrementing each of the YSAR and ZSAR contents by one via Adder 88 to obtain the addresses for the next Y and Z bytes in memory 83. Also the remaining UK byte counts in registers YCNT and ZCNT must each be decremented by one for each fetched Y and Z byte. This is respectively done by CLK cycles 19T, 21, 22, 23F, 24F and 23F, 24F, 26 or 23T, 24T. Decrementing is done by transferring the content of the YCNT or ZCNT register to the A-input of Adder 88 while activating the IG(C) and IG control signals. Each decremented result in Latch 89 is Zero Tested during CLK 21, 22 and 27 or 25 to determine if the end of the either UK is reached. If it is not reached, the result in Latch 89 is transferred to the YCNT or ZCNT register, respectively.

As long as the $D_B$ position is not sensed by the comparison in Step 13, and neither YCNT or ZYNT is zero in Step 14, the next Y and Z bytes are fetched in Step 14 by incrementing the YSAR and DSAR address values by one.

Whenever the $D_B$ byte position is found during comparison Step 13, the comparison operation is ended and Step 16 is entered. The currently stored $E_B$ count is valid, and this last $E_B$ count represents the UK byte position ($D_B$—1).

Until the $D_B$ position is sensed, Y and Z bytes are fetched and compared the YCNT and ZCNT register contents are decremented, and the content of the $E_B$ register is incremented, as Steps 13 and 14 alternately execute. Generally $D_B$ is found before either the YCNT or ZCNT is decremented to zero, i.e. before the end position is reached for either UK-Y or UK-Z. If YCNT becomes zero before ZCNT which is indicated during CLK 25F, the current $E_B$ count is stored, and it defines the $D_B$ position. The ZCNT cannot go to zero before the YCNT, unless a UK sorting error exists, and error 48C-1 is indicated. Also the ZCNT cannot be zero at the same byte position as the YCNT, and this error is indicated by 48C-2. Hence error 48C-1 or 48C-2 indicates UK-Y is greater than or equal to UK-Z, which is a sorting error. The key generation sorting can not proceed until any sorting error in the uncompressed key sequence is remedied.

Then Step 16 is performed by transferring the $E_B$ register contents to the A-input of Adder 88, and the $E_A$ register contents through complementer 93 to the B-input obtain the subtracted value S in Latch 89. While the S Value is transferred from Latch 89 to the S register during CLK 32 and 33, Step 17 is performed by Zero Testing and Sign Testing it to determine whether S is less than, equal to or greater than zero in Tester 94 and Sign Position G. If Tester 94 indicates not zero, Sign Position G indicates whether S is greater or less than zero. If S is less than zero by no bit being in position G with a nonzero output from Tester 94, step 30 is entered during CLK 34F and 35T, and is executed by setting the contents of the $L_B$ register to zero by inducing an Adder cycle without providing any adder inputs. This causes Adder Latch 89 to have all-zero's, and a transfer of the zero latch contents is caused from Latch 89 to register $L_B$ to complete Step 30 during CLK 36T and 37T.

Then Step 31 is executed during CLK 37T and 38T the $E_B$ register contents are incremented by one by passing the $E_B$ contents through Adder 88 while providing a one with control line IG (B1). The incremented results in Latch 89 are transferred to $F_B$ to complete Step 31.

However, if Step 17 found S=0, step 26A is entered during CLK 34T and 35T, wherein the contents of the $L_A$ register are transferred to input A of Adder 88 without providing any input B to Adder 88. Hence the unaltered $L_A$ value then exists in Adder latch 89, where Zero Tester 94 determines whether the $L_A$ value is zero or not to execute Step 26a. If the $L_A$ value is not zero, the previously described Steps 30 and 31 are performed. However, if Tester 94 determines $L_A$ is zero, Step 32 is entered instead of Step 30, and a true one value is placed in the Adder Latch 89 by activating the IG (B1) control line, and the LATCH content is transferred into the $L_B$ register to complete Step 32. Then the content of the $E_B$ register is transferred to the A-input of Adder 88 without energizing the B-input, and the $E_B$ value in Latch 89 is gated into register $F_B$ to complete Step 33.

On the other hand, if Step 17 determines S is greater than zero, during CLK 34F and 35F, Step 26*b* is entered, wherein the content of register $L_A$ is transferred to latch 89 and tested for zero in the same manner as previously explained for step 26*a*. If in this case $L_A$ is equal to zero as indicated by Tester 94, the content of the S register is passed to Adder 88, incremented by one, and the result in Latch 89 transferred to the $L_B$ register during CLK 40T, 41T to complete Step 34. Then Step 35 is executed by having the $E_A$ register content transferred without alternation through Adder 88 and Latch 89 to the $F_B$ register to complete step 35 during CLK 41T and 42T.

If $L_A$ is not zero while S is greater than zero, step 36 is executed during CLK 40F, 41F similarly to step 34 but without providing the IG(B1) control signal to Adder 88. Then step 37 is executed during CLK 41F and 42F similarly to step 35, but by also providing an IG(B1) control signal to the Adder with the contents of the $E_A$ register.

The storing of the $L_B$ and $F_B$ register contents generated by Steps 30—37 is done during CLK cycles 48—52. Hence, Step 41 is entered upon the completion of any step 33, 35 or 37 for all right shift cases and the no-shift cases with a nonzero $L_A$ during CLK 54F. During $L_B$ and $E_B$ contents are being transferred during this time, it is convenient to execute Step 44 during CLK cycles 52—54 by transferring them to the $L_A$ and $E_A$ registers. $L_B$ is tested for zero during CLK 52, 53 to determine whether Step 41 should be skipped. If $L_B$ is not zero, Step 41 is entered. However Step 41 is bypassed upon the completion of step 31 for the left-shift case, no-shift case with a zero $L_A$ by operation of CLK 54T.

During CLK 42—44, the ZSAR contents were adjusted to address the first K byte, which is to be taken from UK-Z. This adjustment depended upon whether $L_A$ was zero or not for a right-shift case. If $L_A$ is zero, the prior CK had no K bytes, and the current K bytes begin at the $D_A$ position in the current UK-Z. This is done by step 35*a*.

But if $L_A$ is not zero, then the prior CK had K bytes, and the current K bytes begin at position ($D_A$+1) in the current UK-Z. This is done by step 37*a* which adds a 2 digit instead of the 1 digit in step 35*a*. From CLK 24 through CLK 41, ZSAR contains the address value for the $D_B$ byte position in Memory 83. At CLKS 42 and 43, $D_A$ is obtainable by subtracting S from $D_B$ and adding one or two for step 35*a* or 37*a*. This ZSAR value is available to fetch the first K byte where $L_A$ is zero, such as after step 33 or 35.

If $L_A$ is not zero such as after step 36, the $D_A$+1 address is required, and the adjusted ZSAR value is transferred to the Adder A-input while an IG(B1) signal is provided at the B-input. The $D_A$+1 result is then loaded from Latch 89 into the ZSAR register to provide the first K byte address.

During Step 41, each K byte is transferred from Source Memory 83 to Destination Memory 84 by fetching the Source Memory byte at the ZSAR address during CLK 55, 56 gating it unaltered through Adder 88, and Latch 89 to the DSDR register, and storing it at the current DSAR address position in Memory 84 during CLK 56, 57.

Every time a K byte is stored in Destination Memory 84, the ZSAR and DSAR register contents are each incremented by one so that each can address the next byte location respectively in memories 83 and 84. During CLK 57, 58 or 58, 59, this is done by transferring the YSAR or DSAR content to the A input of Adder 88, while providing a true one digit to the B input, and thereafter gating the incremented contents in latch 89 back into YSAR or DSAR, respectively.

In this manner, the address for the next byte position is always available in YSAR and DSAR. The DSAR only increment by one in a forward direction, unlike YSAR or ZSAR which change nonuniformly at times.

After ZSAR and DSAR are each incremented by one, and the next K byte is transferred, the $L_B$ register content is decremented by one during CLK 59, 60, and tested for zero to determine if more K bytes are to be transferred. If $L_B$ is not zero, CLK 62F causes the next K byte to be fetched from UK-Z, and step 41 in FIG. 3 repeats for each K byte. Eventually $L_B$ is decremented to zero, indicating that all the K bytes have been transferred. Then CLK 66 indicates that the pointer associated with UK-Y should be transferred to Destination MEMORY 84, and Step 43 is entered. Step 43 transfers the PTR CT byte and pointer bytes associated with UK-Z.

Upon entering Step 43, the YCNT register contains a value representing the number of Noise bytes in UK-Y (which are the bytes following the $D_B$ byte position) because the YCNT register was not disturbed since CLK 22. Also the YSAR register then contains the address of the byte after the $D_B$ byte in UK-Y, since YSAR was not disturbed since CLK 21. If the YCNT tests to be Zero during CLK 62T and 63, YSAR has the address of the PTR CT byte. If YCNT is not zero, the address for the PTR CT byte must be generated by CLK 63, 64F. In the latter case, the PTR CT byte address is generated by adding the contents in CT YCNT register to the content in the YSAR register. CLK cycles 63 and 64F are taken to move both to Adder 88, and move their sum from Latch 89 into the YSAR, which now contains the address of the Y-pointer count byte (PTR CT).

Next, the Y-pointer count byte is fetched from Memory 83 into SSDR and to the YCNT register during CLK 64, 65 using the address in YSAR. It is then transferred from the YCNT register to DSDR during CLK 65, 66; and it is stored in Destination Memory 84 at the position currently addressed from DSAR. Then YSAR is incremented by one during CLK cycles 66 and 67 through Adder 88 in the manner previously described. YCNT is decremented and tested or zero. Then the first Y-pointer byte is fetched and transferred to the Y register, and DSAR is incremented by one during CLK 67, 68. The pointer byte is transferred from the Y register to DSDR and stored in destination Memory 84 during CLK 68, 69. Then the YCNT register contents are transferred to Adder Latch 89 and tested for zero during CLK 69, 70. If the decremented YCNT is not zero, CLK 71F is executed for decrementing the YSAR contents and fetching the next Y pointer byte. Then CLK 68 is activated and DSAR is incremented.

When the YCNT is decremented to zero when tested, the Y-pointer transfer is complete, and CLK 71T is executed. Then YSAR and DSAR are incremented during CLK 71T, 72 in preparation for the next byte storage into Memories 83 and 84, and the $E_B$ register is set to zero during CLK 73.

At the end of Step 43, Step 11 is reentered by going to CLK 0 for fetching the next pair of UK's. After the last Y-pointer transfer is completed by step 43, the YSAR contains the address for the count byte (UK CT) of UK-Z in the now completed operation. Hence the YSAR register contains the Address for the UK-Y in the next pair of UK's, and it is ready to begin execution in reentered Step 11.

A second flow diagram embodiment for the Generate Mode of the subject invention is represented by FIG. 15; and a second data-path embodiment is represented by the circuitry in FIGS. 15C–F. This embodiment implements the maximum F (Factor) field format for a compressed index, which is generated by the flow diagram in FIG. 6B. The major distinction between the flow diagrams in FIGS. 6A and B is after the output of Step 30. In FIG. 6B and the $E_A$ register is used to generate a maximum $F_B$, while in FIG. 6A, the $E_B$ register is used for generating the minimum Factor $F_B$. In FIG. 6B, a Test Step 26 is made on the $L_A$ register content to determine whether or not a one digit should be added to the $E_A$ register content in order to generate $F_B$. If $L_A$ is not zero, Step 31A is entered which adds a one to $E_A$ to generate $F_B$. On the other hand, if $L_A$ is zero, as determined by Step 26c, Step 31 B is entered which stores the current $E_A$ register content into the $F_B$ register. Both steps 31A and 31B exit to Step 44 in FIG. 6B.

Figure 15D:
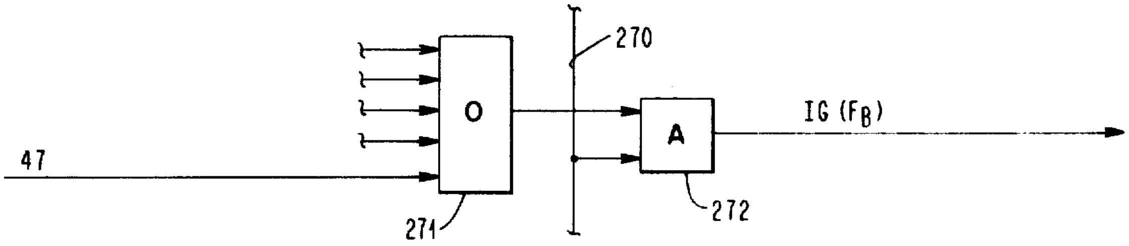
Figure 15E:
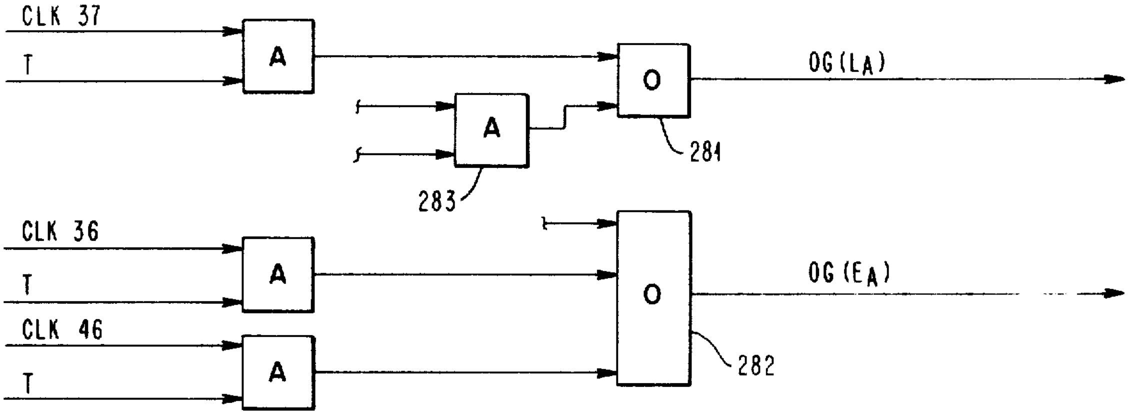

The control circuitry in FIGS. 15C—E for the second embodiment represents changes required in the circuits of the first data-path control embodiment in FIGS. 2A—N, in order to provide the second embodiment's control of the data path shown in FIG. 1. Hence the drawings represented by the Figure arrangement in FIG. 15 apply the method of FIG. 6B to the data path in FIG. 1. The Figure arrangement in FIG. 15 is different from the Figure arrangement in FIG. 3 due to the substitution of FIG. 15A for FIG. 3C. FIGS. 15A obtains the maximum $F_B$ field by the steps 31A, 16C, and 31B with a somewhat different, but equivalent, sequence than is found in FIG. 6B. During cycle 37T, 38 in FIG. 15, Step 31A adds a one to the content of register $E_A$ and stores the result in register $F_B$ during CLK 37T, 33.

Then an unconditional branch is taken to CLK 45 which executes Zero Test Step 26c on the contents of register $L_A$, which were outgated to Adder latch 89 during CLK 37T. If $L_A$ was not zero, Step 26c takes a branch to CLK 46F, which unconditionally branches to CLK 48. On the other hand, if $L_A$ was zero, Step 26c takes a branch to CLK 46T, which transfers the contents of register $E_A$ to Adder 88; and CLK 47 ingates the $E_A$ content of the Adder latch into register $F_B$ to execute Step 31B. Then Step 48 is entered, and operation thereafter continues in the same manner as provided for the first embodiment.

FIG. 15B illustrates a Control Signal Sequence Chart for the second embodiment. FIG. 15B only illustrates in detail those CLK cycles which are different from the CLK cycles in the first embodiment, represented in FIGS. 2Q–1 through 2Q–3. The illustrated cycles in FIG. 15B obtain the steps shown in FIGS. 15A.

Figure 15F:
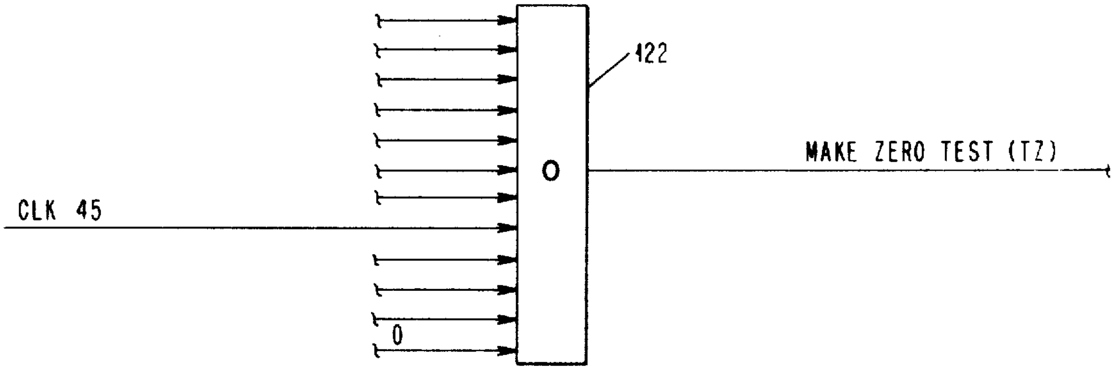

FIG. 15F illustrates the modification to FIG. 2N needed to obtain the Zero test function required by the steps and cycles in FIGS. 15A and B. The illustrated circuit in FIG. 15F is substituted for the corresponding circuit 122 in FIG. 2N, and all other circuits in FIG. 2N without change. FIG. 15C represents a substitution in FIG. 2C–2 needed to obtain a required Sequence Control Clock for the second embodiment. The second embodiment uses without change the Sequence Control Clock Latch in FIG. 2D, and the Sequence Control Decoder in FIG. 2E. Also the second embodiment substitutes the circuitry shown in FIG. 15D for the corresponding circuitry in FIG. 2F–1 and uses all other circuits in FIGS. 2F without change. Likewise the second embodiment substitutes the circuits illustrated in FIG. 15E for the corresponding circuits in FIGS. 2G–2 and uses without change the remaining circuits in FIGS. 2G.

Accordingly the circuitry illustrated in FIGS. 15C–F including the referenced circuitry from other drawings provide the second embodiment for executing the maximum F method while generating a Compressed Index.

We claim:

1. A compressed key generation method using machine-readable keys in a source index representing different items of information comprising the following steps:

machine-accessing in a sorted sequence each key and its next key to obtain a pair of keys, machine-sensing a highest-order unequal bytes position, said position having unequal bytes in the pair, machine-generating a code representing said position, and machine-registering said code as a component of a compressed key representing one of the keys in said pair.

2. A compressed key generation method as defined in claim 1 further including the step of:

machine-counting the number of bytes from said position to the highest-order byte position in said pair to perform said machine-generating step, and machine-registering the output of the machine-counting step as said code within said compressed key.

3. A compressed key generation method as defined in claim 1 further comprising:

machine-demarcing bytes of one of the keys in said pair located from said position through the highest-order byte position, whereby key bytes for the compressed key are selectable from bytes defined by said machine-demarcing step.

4. A compressed key generation method as defined in claim 3 further comprising machine-recording any selected key bytes from said key in said pair.

5. A compressed key generation method as defined in claim 3 further including the steps of:

machine-inhibiting the selection of bytes having a lower-order than said position in the next key of said pair of key bytes for the compressed key, whereby compressed key bytes are selectable from remaining bytes in said next key, and said bytes demarced by said machine-inhibiting step are search noise bytes.

6. A compressed key generation method as defined in claim 3 in which each key has an associated address for retrieving its represented item of information, further comprising the step of machine-recording with said compressed key the address associated with the next key in said pair.

7. A compressed key generation method as defined in claim 3 in which said pair is the first pair of keys in the sorted sequence, further including the steps of machine-transferring all bytes in said next key between said position and the highest-order byte position to form key bytes within the first compressed key in a compressed index.

8. A compressed key generation method as defined in claim 7 further including the step of machine-transferring with the first compressed key a pointer associated with the first key in the source index.

9. A compressed key generation method as defined in claim 1 further including the step of machine-storing the code of said machine-generating step at least until after the machine-generating step outputs a next code for the next pair.

10. A compressed key generation method as defined in claim 1 applied to two sequential pairs of keys, further including the steps of machine-comparing the codes for the two sequential pairs and outputting a comparison signal, and machine-generating a compressed key from the next pair in relation to said comparison signal.

11. A compressed key generation method as defined in claim 10, including the steps, machine-detecting said comparison signal and signalling that the code for a second pair of the two sequential pairs is greater than the code for the first pair, and machine-generating a compressed key from a key in the second pair.

12. A compressed key generation method as defined in claim 11, in which said machine-generating step includes the substep machine-selecting key bytes from the second key of said second pair.

13. A compressed key generation method as defined in claim 10 including the steps machine-detecting said comparison signal and signalling that the code for a second pair of the two sequential pairs is equal to or less than the code for the first pair, and machine-generating a compressed key from a key in the second pair 14. A compressed key generation method as defined in claim 13 in which said machine-generating method includes the substep
machine-selecting not more than one key byte from the second key of said second pair.

15. A compressed key generation method as defined in claim 3 comprising the steps of:
machine-selecting said bytes from a first key in said pair,
machine-changing the lowest-order byte of said bytes to its next byte in a collating sequence being used,
and recording the bytes selected by said machine-selecting step as modified by said changing step.

16. A compressed key generation method as defined in claim 15 comprising the steps of:
comparing said changed lowest-order byte with the byte in the same location in the next key of the pair, and if equal performing the following step:
restoring the changed byte to its original form for said recording step,
machine-selecting the adjacent next lower-order byte of said first key, increasing it to its next byte in the collating sequence,
and recording the last selected byte with the byte in the corresponding byte-position in the next key.

17. A compressed key generation method using machine-readable keys in a source index comprising the steps:
machine-accessing a pair of keys sequentially in the sorted order of the keys in said index, positioning a second key of one pair as a first key of the next pair,
machine-comparing like-ordered bytes in a current pair of equality and inequality from a highest-ordered byte position to at least a highest-order unequal byte position,
machine-counting the equal bytes of said current pair during said machine-comparing step until said highest-order unequal byte position is sensed,
and registering a count output signal from said machine counting step as a component of a compressed key.

18. A compressed key generation method as defined in claim 17, further comprising the step of:
storing the count output signal from said machine-counting step at least through the machine-counting step for the next pair.

19. A compressed key generation method as defined in claim 18, including the further steps of
changing the status of the next pair and current pair, to the current pair and prior pair respectively,
machine-comparing the count output signals for said next pair against the count output signal for said prior pair to generate a shift-type signal,
and generating a current compressed key in response to said shift-type signal.

20. A compressed key generation method as defined in claim 19, in which said shift-type signal indicates the count output signal for the current pair is greater than the count output signal for the prior pair, said generating step including the substep of
machine-copying to a current compressed key recording area those bytes in one of the keys in the current pair from a byte position determined by the count output signal for said prior pair to a lower-order byte position determined by the count output signal for said current pair.

21. A compressed key generation method as defined in claim 20, in which said generating step includes the substeps of:
machine-generating a factor byte-count code from a byte count in the range from the count output signal of said prior pair to one byte greater than said signal,
machine-generating a key-byte count code equal to the number of bytes transferred to the compressed key recording area by said machine-copying step,
and machine-copying the factor byte-count code and the key-byte count code as fields within the current compressed key area.

22. A compressed key generation method as defined in claim 20, further including the steps of:
machine-inhibiting the selection in said one of the keys of its bytes having a higher-order than a byte position determined by the count output signal for said prior pair,
whereby factor bytes are not included as compressed key bytes.

23. A compressed key generation method as defined in claim 19, in which said shift-type signal indicates the count output signal for the current pair is less than or equal to the count output signal for the prior pair, said generating step including the substep of:
machine-copying to a current compressed key recording area not more than one byte derived from one of the keys in the current pair at the highest-order unequal byte position for the current pair.

24. A compressed key generation method as defined in claim 23, in which said generating step includes the substeps of:
machine-generating a factor byte-count code from a byte count in the range from the count output signal of said prior pair through the count output signal of the current pair increased by one byte,
machine-generating a key-byte count code equal to the number of bytes transferred to the compressed key recording area by said machine-copying step,
and machine-recording the factor byte-count code and the key-byte count code as fields within the current compressed key area.

25. A compressed key generation method as defined in claim 21 in which said machine-copying step includes the substep of:
machine-recording both of said codes in a single byte of said current compressed key area.

26. A compressed key generation method as defined in claim 5, in which the machine-recording substep includes the substep of
machine-recording said single byte at the beginning of said current compressed key area.

27. A compressed key generation method as defined in claim 25, in which said machine-recording substep includes the substeps of:
machine-generating an extender code when the factor byte-count code exceeds an allocated area for said byte-count code in said single byte,
and machine-recording the factor byte-count code in another predetermined byte location in the current compressed key field.

28. A compressed key generation method as defined in claim 25, in which said machine-recording substep includes the substeps of:
machine-generating an extender code when the key byte-count code exceeds an allocated area for said byte-count code in said single byte,
and machine-recording the key byte-count code in another predetermined byte location in the current compressed key field.

29. A compressed key generation method as defined in claim 27, in which said machine-recording substep includes the substeps of:
machine-recording the factor byte count code and the key byte-count code in different predetermined bytes in the current compressed key area.

30. A compressed key generation method as defined in claim 27, in which said machine-recording substep includes the substep of:
machine-recording each of said codes before the key bytes in the current compressed key area.

31. A compressed key generation method as defined in claim 19, in which said shift-type signal indicates said count output signal for the current pair is equal to the count output signal for the prior pair, said generating step including the substep of machine-copying to a current compressed key recording area a byte from one of said keys at its highest-order unequal byte position.

32. A compressed key generation method as defined in claim 19, in which said shift-type signal indicates said count output signal for the current pair is equal to the count output signal for the prior pair, said generating step including the substeps of machine-sensing the existence of nonexistence of any key byte for the prior compressed key to generate a prior key-byte existence signal, for controlling the following substeps:

machine-copying to a current compressed key recording area from one of the keys in a current pair its byte at the highest-order unequal byte position, in response to said prior key-byte existence signal indicating the nonexistence of any key byte in the prior compressed key, and bypassing the machine-copying step, in response to said prior key-byte existence signal indicating the existence of at least one key byte in the prior compressed key, whereby alternation in the existence and nonexistence of key bytes occurs among a succession of compressed keys resulting from a succession of pairs of keys providing equal shift-type signals.

33. A compressed key generation method as defined in claim 19, in which said shift-type signal indicates the count output signal for said current pair is less than the count output signal for said prior pair, said generating step including the substep of machine-inhibiting the copying of any key byte to a current compressed key recording area.

34. A compressed key generation method as defined in claim 19, in which said shift-type signal indicates the count output signal for the current pair is greater than the count output signal for the prior pair, said generating step including the substeps of machine-sensing the existence of nonexistence of any key byte for the prior compressed key to provide a prior key-byte existence signal, for controlling the following substeps:

machine-copying to a current compressed key recording area those bytes in one of the keys in a current pair from a byte position specified by the count output signal or said prior pair through a lower-order byte position specified by the count output signal for said current pair, in response to said prior key-byte existence signal indicating the nonexistence of any key byte in the prior compressed key, machine-copying to a current compressed key recording area those bytes in one of the keys in the current pair from a lower-order byte position next to that specified by the count output signal for said prior pair through a lower-order byte position specified by the count output signal for said current pair, in response to said prior key byte existence signal indicating the existence of at least one key byte in the prior compressed key.

35. A compressed key generation method as defined in claim 32, in which said shift-type signal indicates the count output signal for said current pair is less than the count output signal for said prior pair, said generating step including the substeps of:

machine-generating a null factor signal, machine-recording a null code in the current compressed key recording area in response to said null factor signal.

36. A compressed key generation method as defined in claim 20, including the further steps of machine-generating a key-byte-count code indicating the number of key bytes for the current compressed key, and machine-recording the key-byte-count code into the current compressed key.

37. A compressed key generation method as defined in claim 20, in which the generation step includes the substeps of machine-copying bytes only from the second key in said pair from byte locations defined by the respective preceding machine-copying step, and machine-recording a pointer address to information identified by said first key in said pair, whereby the current compressed key recording area receives the output of said machine-copying steps.

38. A compressed key generation method as defined in claim 23, including the additional steps:

machine-generating a factor signal indicating not less than the value of said count output signal for the current pair increased by one, and storing said factor signal into the current compressed key area, whereby a minimum factor field is available for left-shift-type compressed keys.

39. A compressed key generation method as defined in claim 33, including the additional steps of:

machine-generating a factor signal indicating not over the value of said count output signal for the prior pair increased by one, and storing said factor signal into the current compressed key area.

40. A compressed key generation method as defined in claim 39, in which said machine-generating step includes the substeps of:

machine-sensing the existence or nonexistence of any key byte for the prior compressed key to provide a prior key-byte existence signal, for controlling the following substeps:

machine-generating a factor signal specifying not over the value represented by said count output signal for the prior pair, in response to said prior key-byte existence signal indicating the nonexistence of any key byte in the prior compressed key, machine-generating a factor signal specifying not over the value represented by said count output signal for the prior pair increased by one, in response to said prior key byte existence signal indicating the existence of at least one key byte in the prior compressed key, whereby a maximum factor field is available for left-shift-type compressed keys.

41. A compressed key generation method as defined in claim 16, including the additional steps of:

machine-sensing the existence of nonexistence of any key byte for the prior compressed key, to provide a prior key-byte existence signal, for controlling the following substeps:

machine-generating a factor signal specifying the value of the prior count output signal for the prior pair, in response to said prior key-byte existence signal indicating the nonexistence of any key byte in the prior compressed key, machine-generating a factor signal specifying not over the value represented by the count output signal of the prior pair increased by one, in response to said prior key byte existence signal indicating the existence of at least one key byte in the prior compressed key, whereby a factor field is provided for right-shift compressed keys.

42. A compressed key generation method as defined in claim 17, including the steps of:

machine-sensing the second key of said next pair for an end-of-index indication, and generating an end-of-index signal in response to the machine-sensing step detecting said indication.

43. A compressed key generation method as defined in claim 42, including the steps of:

machine-transferring a null code signal to a current compressed key recording area to represent an end-of-index compressed key, and machine-recording in the current compressed key area a point address associated with the first key of said next pair for retrieving the data item represented by said first key.

44. Compressed key generation means using machine-readable keys in a source index representing different items of information comprising:

means for accessing in a sorted sequence each key and its next key to obtain a pair of keys, means for sensing a highest-order unequal byte position, in said pair of keys, said position having unequal bytes in the pair, means for generating a code representing said position, and means for registering said code as a component of a compressed key representing one of the keys in said pair.

45. Compressed key generation means as defined in claim 44 further including:

means for counting the number of bytes from said position to the highest-order byte position in said pair to obtain said generating means, and means for registering the output of the counting means as said code within said compressed key.

46. Compressed key generation means as defined in claim 44 further comprising:

means for demarcing bytes of one of the keys in sad pair located from said position through the highest-order byte position, whereby key bytes for the compressed key are selectable from bytes defined by said demarcing means.

47. Compressed key generation means as defined in claim 46 further comprising means for recording any selected key bytes from said key in said pair.

48. Compressed key generation means as defined in claim 46 further including:

means for inhibiting the selection of bytes having a lower-order than said position in the next key of said pair as key bytes for the compressed key, whereby compressed key bytes are selectable from remaining bytes in said next key, and said bytes demarced by said inhibiting means are search noise bytes.

49. Compressed key generation means as defined in claim 46 in which each key has an associated address for retrieving its represented item of information, further comprising:

means for recording with said compressed key the address associated with the next key in said pair.

50. Compressed key generation means as defined in claim 46 in which said pair is the first pair of keys in the sorted sequence, further including means for transferring all bytes in said next key between said position and the highest-order byte position to form key bytes within the first compressed key in a compressed index.

51. Compressed key generation means as defined in claim 50 further including means for transferring with the first compressed key a pointer associated with the first key in the source index.

52. Compressed key generation means as defined in claim 44 further including means for storing the code of said generating means at least until after the generating means outputs a next code for the next pair of keys.

53. Compressed key generation means as defined in claim 44 applied to two sequential pairs of key, further including means for comparing the codes for the two sequential pairs of keys and outputting a comparison signal, and means for generating a compressed key from the next pair of keys in relation to said comparison signal.

54. Compressed key generation means as defined in claim 53, including means for detecting said comparison signal and signalling that the code for a second pair of the two sequential pairs of keys is greater than the code for the first pair of keys, and means for generating a compressed key from a key in the second pair of keys.

55. Compressed key generation means as defined in claim 54, in which said means for generating includes means for selecting key bytes from the second key of said second pair.

56. Compressed key generation means as defined in claim 53 including means for detecting said comparison signal and signalling that the code for a second pair of the two sequential pairs is equal to or less than the code for the first pair, and means for generating a compressed key from a key in the second pair.

57. Compressed key generation means as defined in claim 56 in which said means for generating includes means for selecting not more than one key byte from the second key of said second pair of keys.

58. Compressed key generation means as defined in claim 46 comprising means for selecting said bytes demarced by said demarcing means from a first key in said pair of keys, means for changing the lowest-order byte of said bytes selected by said selecting means to its next byte in a collating sequence being used, said lowest-order byte being a changed byte, and recording the bytes selected by said means for selecting as modified by said changing means.

59. Compressed key generation means as defined in claim 58 comprising means for comparing said changed lowest-order byte with the byte in the same location in the next key of the pair, and to handle the situation in which the compared bytes are equal, further including:

means for restoring the changed byte to its original form in said first key from which it was selected by said selecting means, means for selecting the adjacent next lower-order byte of said first key, increasing it to its next byte in the collating sequence, and means for recording the last selected byte with the byte in the corresponding byte-position in the next key.

60. Compressed key generation means using machine-readable keys in a source index comprising:

Means for accessing a pair of keys sequentially in the sorted order of the keys in said index, positioning a second key of one pair as a first key of the next pair, means for comparing like-order bytes in a current pair of said keys for equality and inequality from a highest-ordered byte position to at least a highest-order unequal byte position, means for counting the equal bytes of said current pair until said highest-order unequal byte position is sensed, and registering a count signal from said means for counting as a component of a compressed key.

61. Compressed key generation means as defined in claim 60, further comprising:

means for storing the count output signal from said means for counting at least through actuation of the means for counting during the next pair.

62. Compressed key generation means as defined in claim 61, including:

means for changing the status of the next pair and current pair, of keys, to the current pair and prior pair of keys respectively, means for comparing the count output signals for said next pair against the count output signal for said prior pair to generate a shift-type signal, and means for generating a current compressed key in response to said shift-type signal.

63. Compressed key generation means as defined in claim 62, in which said shift-type signal indicates the count output signal for the current pair is greater than the count output signal for the prior pair, said generating means including:

means for copying to a current compressed key recording area those bytes in one of the keys in the current pair from a byte position determined by the count output signal for said prior pair to a lower-order byte position determined by the count output signal for said current pair.

64. Compressed key generation means as defined in claim 63, in which said generating means includes:

means for generating a factor byte-count code from a byte count in the range from the count output signal of said prior pair to one byte greater than said signal, means for generating a key-byte count code equal to the number of bytes transferred to the compressed key recording area by said means for copying, and means for copying the factor byte-count code and the key-byte count code as fields within the current compressed key area.

65. Compressed key generation means as defined in claim 63, further including:

means for inhibiting the selection in said one of the keys of its bytes having a higher-order than a byte position determined by the count output signal for said prior pair, whereby factor bytes are not included as compressed key bytes.

66. Compressed key generation means as defined in claim 62, in which said shift-type signal indicates the count output signal for the current pair of keys is less than or equal to the count output signal for the prior pair of keys, said generating means including:

means for copying to a current compressed key recording area not more than one byte derived from one of the keys in the current pair at the highest-order unequal byte position for the current pair.

67. Compressed key generation means as defined in claim 66, in which said generating means includes means for generating a factor byte-count code from a byte count in the range from the count output signal of said prior pair through the count output signal of the current pair increased by one byte, means for generating a key-byte count code equal to the number of bytes transferred to the compressed key recording area by said means for copying, and means for recording the factor byte-count code and the key-byte count code as fields within the current compressed key area.

68. Compressed key generation means as defined in claim 64 in which said means for copying includes:

means for recording both of said codes in a single byte of said current compressed key area.

69. Compressed key generation means as defined in claim 68, in which means for recording includes:

means for recording said single byte at the beginning of said current compressed key area.

70. Compressed key generation means as defined in claim 68, in which said means for recording includes:

means for generating an extender code when the factor byte-count code exceeds an allocated area for said byte-count code in said single byte, and means for recording the factor byte-count code in another predetermined byte location in the current compressed key field.

71. Compressed key generation means as defined in claim 68, in which said means for recording includes:

means for generating an extender code when the key byte-count code exceeds an allocated area for said byte-count code in said single byte, and means for recording the key byte-count code in another predetermined byte location in the current compressed key field.

72. Compressed key generation means as defined in claim 70, in which said means for recording includes:

means for recording the factor byte count code and the key byte-count code in different predetermined bytes in the current compressed key area.

73. Compressed key generation means as defined in claim 70, in which said means for recording includes:

means for recording each of said codes before the key bytes in the current compressed key area.

74. Compressed key generation means as defined in claim 62, in which said shift-type signal indicates said count output signal for the current pair is equal to the count output signal for the prior pair, said means for generating including:

means for copying to a current compressed key recording area a byte from one of said keys at its highest-order unequal byte position.

75. Compressed key generation means as defined in claim 62, in which said shift-type signal indicates said count output signal for the current pair of keys is equal to the count output signal for the prior pair of keys, including:

means for sensing the existence or nonexistence of any key byte for the prior compressed key obtained by said generating means to provide a prior key-byte existence signal, for controlling the following:

means for copying to a current compressed key recording area from one of the keys in a current pair its byte at the highest-order unequal byte position, in response to said prior key-byte existence signal indicating the nonexistence of any key byte in the prior compressed key, and means for bypassing the means for copying, in response to said prior key-byte existence signal indicating the existence of at least one key byte in the prior compressed key, whereby alternation in the existence and nonexistence of key bytes occurs among a succession of compressed keys resulting from a succession of pairs of keys providing equal shift-type signals.

76. Compressed key generation means as defined in claim 62, in which said shift-type signal indicates the count output signal for said current paid is less than the count output signal for said prior pair, said generating means further including means for inhibiting the copying by said copying means of any key byte to a current compress key recording area.

77. Compressed key generation means as defined in claim 62, in which said shift-type signal indicates the count output signal for the current pair is greater than the count output signal for the prior pair, said generating means further including means for sensing the existence or nonexistence of any key byte for the prior compress key obtained by said generating means to provide a prior key-byte existence signal, for controlling the following:

means for copying to a current compressed key recording area those bytes in one of the keys in a current pair from a byte position specified by the count output signal for said prior pair through a lower-order byte position specified by the count output signal for said prior pair through a lower-order byte position specified by the count output signal for said current pair, in response to said prior key-byte existence single indicating the nonexistence of any key byte in the prior compressed key, means for copying to a current compressed key recording area those bytes in one of the keys in the current pair from a lower-order byte position next to that specified by the count output signal for said prior pair through a lower-order byte position specified by the count output signal for said current pair, in response to said prior key byte existence signal indicating the existence of at least one key byte in the prior compressed key.

78. Compressed key generation means as defined in claim 75, in which said shift-type signal indicates the count output signal for said current pair is less than the count output signal for said prior pair, said generating means including:

means for generating a null factor signal, means for recording a null code in the current compressed key recording area in response to said null factor signal.

79. Compressed key generation means as defined in claim 63, including means for generating a key-byte-count code indicating the number of key bytes copied by said copying means for the current compressed key, and means for recording the key-byte-count code into the current compressed key.

80. Compressed key generation means as defined in claim 63, in which the copying means further includes means for selecting bytes only from the second key in said current pair being operated upon by said copying means, and means for recording a pointer address to information represented by said first key in said pair, whereby the current compressed key recording area receives the output of said copying means.

81. Compressed key generation means as defined in claim 66, including:

means for generating a factor signal indicating not less than the value of said count output signal for the current pair of keys increased by one, and storing said factor signal into the current compressed key area, whereby a minimum factor field is available for left-shift-type compressed keys.

82. Compressed key generation means as defined in claim 76, including:

means for generating a factor signal indicating not over the value of said count output signal for the prior pair of keys increased by one, and means for storing said factor signal into the current compressed key area.

83. Compressed key generation means as defined in claim 82, in which said means for generating further includes:

means for sensing the existence or nonexistence of any key byte for the prior compressed key to provide a prior key-byte existence signal, for controlling the following:

means for generating a factor signal specifying not over the value represented by said count output signal for the prior pair, in response to said prior key-byte existence signal indicating the nonexistence of any key byte in the prior compressed key, means for generating a factor signal specifying not over the value represented by said count output signal for the prior pair increased by one, in response to said prior key byte existence signal indicating the existence of at least one key byte in the prior compressed key, whereby a maximum factor field is available for left-shift-type compressed keys.

84. Compressed key generation means as defined in claim 79, further including:

means for sensing the existence or nonexistence of any key byte for an immediately prior compressed key, to provide a prior key-byte existence signal, for controlling the following:

means for generating a factor signal specifying a value of a prior count output signal for the prior pair, in response to said prior key-byte existence signal indicating the nonexistence of any key byte in the prior compressed key, means for generating a factor signal specifying not over the value represented by the count output signal of the prior pair increased by one, in response to said prior key byte existence signal indicating the existence of at least one key byte in the prior compressed key, whereby a factor field is provided for right-shift compressed keys.

85. Compressed key generation means as defined in claim 60, including:

means for sensing the second key of said next pair for an end-of-index indication, and generating an end-of-index signal in response detecting said indication by said means for sensing.

86. Compressed key generation means as defined in claim 85, including:

means for transferring a null code signal to a current compressed key recording area to represent an end-of-index compressed key, and means for recording in the current compressed key area a pointer address associated with the first key of said next pair for retrieving the date item represented by said first key.

87. Means for generating compressed keys using machine-readable keys in a source index representing different items of information, comprising means for accessing in a sorted sequence each key and its next key to obtain a pair of keys, in which the next key represents the upper-bound for said first key, means for generating a compressed key representation for said first key from the upper-bound represented by said next key.

88. Means for generating compressed keys as defined in claim 87, further comprising means for recording each compressed key representation in the sequence in which it is generated by said generating means.

89. Means for generating compressed keys as defined in claim 88, further comprising means for transferring a pointer address associated with said each key, and said means for recording also said pointer address following its compressed key representation.

90. A compressed key generation method as defined in claim 24, in which said machine-copying step includes the substep of:

machine-recording both of said codes in a single byte of said current compressed key area.

91. A compressed key generation method as defined in claim 28, in which said machine-recording substep includes the substep of:

machine-recording the factor byte count code and the key byte-count code in different predetermined bytes in the current compressed key area.

92. A compressed key generation method as defined in claim 28, in which said machine-recording substep includes the substep of:

machine-recording each of said codes before the key bytes in the current compressed key area.

93. A compressed key generation method as defined in claim 23 including the further steps of machine-generating a key-byte-count code indicating the number of key bytes for the current compressed key, and machine-recording the key-byte-count code into the current compressed key.

94. A compressed key generation method as defined in claim 31, including the further steps of machine-generating a key-byte-count code indicating the number of key bytes for the current compressed key, and machine-recording the key-byte-count code into the current compressed key.

95. A compressed key generation method as defined in claim 32, including the further steps of machine-generating a key-byte-count code indicating the number of key bytes for the current compressed key, and machine-recording the key-byte-count code into the current compressed key.

96. A compressed key generation method as defined in claim 33, including the further steps of machine-generating a key-byte-count code indicating the number of key bytes for the current compressed key, and machine-recording the key-byte-count code into the current compressed key.

97. A compressed key generation method as defined in claim 34, including the further steps of machine-generating a key-byte-count code indicating the number of key bytes for the current compressed key, and machine-recording the key-byte-count code into the current compressed key.

98. A compressed key generation method as defined in claim 35 including the further steps of machine-generating a key-byte-count code indicating the number of key bytes for the current compressed key, and machine-recording the key-byte-count code into the current compressed key.

99. A compressed key generation method as defined in claim 23 in which the generating step includes the substeps of machine-copying bytes only from the second key in said pair from byte locations defined by the respective preceding machine-copying step, and machine-recording a pointer address to information identified by said first key in said pair, whereby the current compressed key recording area receives the output of said machine-copying steps.

100. A compressed key generation method as defined in claim 31 in which the generating step includes the substeps of machine-copying bytes only from the second key in said pair from byte locations defined by the respective preceding machine-copying step, and machine-recording a pointer address to information identified by said first key in said pair, whereby the current compressed key recording area receives the output of said machine-copying steps.

101. A compressed key generation method as defined in claim 33 in which the generating step includes the substeps of machine-copying bytes only from the second key in said pair from byte locations defined by the respective preceding machine-copying step, and machine-recording a pointer address to information identified by said first key in said pair, whereby the current compressed key recording area receives the output of said machine-copying steps.

102. A compressed key generation method as defined in claim 34 in which the generating step includes the substeps of machine-copying bytes only from the second key in said pair from byte locations defined by the respective preceding machine-copying step, and machine-recording a pointer address to information identified by said first key in said pair, whereby the current compressed key recording area receives the output of said machine-copying steps.

103. A compressed key generation method as defined in claim 35 in which the generating step includes the substeps of machine-copying bytes only from the second key in said pair from byte locations defined by the respective preceding machine-copying step, and machine-recording a pointer address to information identified by said first key in said pair, whereby the current compressed key recording area receives the output of said machine-copying steps.

104. A compressed key generation method as defined in claim 33, including the additional step:

machine-generating a factor signal indicating not less than the value of said count output signal for the current pair increased by one, and storing said factor signal into the current compressed key area, whereby a minimum factor field is available for left-shift-type compressed keys.

105. A compressed key generation method as defined in claim 36, including the additional steps of;

machine-sensing the existence or nonexistence of any key byte for the prior compressed key, to provide a prior key-byte existence signal, for controlling the following substeps:

machine-generating a factor signal specifying the value of the prior count output signal for the prior pair, in response to said prior key-byte existence signal indicating the nonexistence of any key byte in the prior compressed key, machine-generating a factor signal specifying not over the value represented by the count output signal of the prior pair increased by one, in response to said prior key byte existence signal indicating the existence of at least one key byte in the prior compressed key, whereby a factor field is provided for right-shift compressed keys.

106. Compressed key generation means as defined in claim 67 in which said means for copying includes:

means for recording both of said codes in a single byte of said current compressed key area.

107. Compressed key generation means as defined in claim 71, in which said means for recording includes:

means for recording the factor byte count code and the key byte-count code in different predetermined bytes in the current compressed key area.

108. Compressed key generation means as defined in claim 71, in which said means for recording includes:

means for recording each of said codes before the key bytes in the current compressed key area.

109. Compressed key generation means as defined in claim 66, including means for generating a key-byte-count code indicating the number of key bytes copied by said copying means for the current compressed key, and means for recording the key-byte-count code into the current compressed key.

110. Compressed key generation means as defined in claim 74, including means for generating a key-byte-count code indicating the number of key bytes copied by said copying means for the current compressed key, and means for recording the key-byte-count code into the current compressed key.

111. Compressed key generation means as defined in claim 75, including means for generating a key-byte-count code indicating the number of key bytes copied by said copying means for the current compressed key, and means for recording the key-byte-count code into the current compressed key.

112. Compressed key generation means as defined in claim 76, including means for generating a key-byte-count code indicating the number of key bytes copied by said copying means for the current compressed key, and means for recording the key-byte-count code into the current compressed key.

113. Compressed key generation means as defined in claim 77, including means for generating a key-byte-count code indicating the number of key bytes copied by said copying means for the current compressed key, and means for recording the key-byte-count code into the current compressed key.

114. Compressed key generation means as defined in claim 78, including means for generating a key-byte-count code indicating the number of key bytes copied by said copying means for the current compressed key, and means for recording the key-byte-count code into the current compressed key.

115. Compressed key generation means as defined in claim 66, in which the copying means further includes means for selecting bytes only from the second key in said current pair being operated upon by said copying means, and means for recording a pointer address to information represented by said first key in said pair, whereby the current compressed key recording area receives the output of said copying means.

116. Compressed key generation means as defined in claim 74, in which the copying means further includes means for selecting bytes only from the second key in said current pair being operated upon by said copying means, and means for recording a pointer address to information represented by said pair, whereby the current compressed key recording area receives the output of said copying means.

117. Compressed key generation means as defined in claim 76, in which the copying means further includes means for selecting bytes only from the second key in said current pair being operated upon by said copying means, and means for recording a pointer address to information represented by said first key in said pair, whereby the current compressed key recording area receives the output of said copying means.

118. Compressed key generation means as defined in claim 77, in which the copying means further includes means for selecting bytes only from the second key in said current pair being operated upon by said copying means, and means for recording a pointer address to information represented by said first key in said pair, whereby the current compressed key recording area receives the output of said copying means.

119. Compressed key generation means as defined in claim 78, in which the copying means further includes means for selecting bytes only from the second key in said current pair being operated upon by said copying means, and means for recording a pointer address to information represented by said first key in said pair, whereby the current compressed key recording area receives the output of said copying means.

120. Compressed key generation means as defined in claim 76, including:

means for generating a factor signal indicating not less than the value of said count output signal for the current pair of keys increased by one, and storing said factor signal into the current compressed key area, whereby a minimum factor field if available for left-shift-type compressed keys.

PO-1050
(5/69)

UNITED STATES PATENT OFFICE
CERTIFICATE OF CORRECTION

Patent No. 3,593,309 Dated July 13, 1971

Inventor(s) William A. Clark, IV, Kent A. Salmond, Thomas S. Stafford

It is certified that error appears in the above-identified patent and that said Letters Patent are hereby corrected as shown below:

Column 1, line 44, the number "3,366,918" should read --3,366,928--. Column 10, line 13, "F=0" should read --F = # --; line 14, "L = 0" should read -- L = # --. Column 18, line 9, following "FIG. 1." it should read -- , to enable it to operate according to the method of FIGURE 6A.--. Column 20, line 17, "s" should read --is--; line 38, following the second occurrence of "CLK" it should read --127 --; line 67, "cycles" should read --cycle--. Column 21, line 5, "G(YSAR)-2" should read -- OG(YSAR)-2--. Column 22, line 28, "110" should read --100--. Column 24, line 24, "IG" should read -- IG(B1)--. Column 26, line 17, "66" should read --62--. Column 27, line 10, "FIGS. 15C-E" should read --FIGS. 15C-F--. Column 30, line 36, "5" should read --25--. Column 33, line 23, "sad" should read --said--. Column 34, line 9 in front of "is equal" should be --of keys--. Column 40, line 69, after the word "by" insert -- said first key in --. Column 42, line 14, "if" should read -- is --.

Signed and sealed this 9th day of May 1972.

(SEAL)
Attest:

EDWARD M.FLETCHER,JR.
Attesting Officer

ROBERT GOTTSCHALK
Commissioner of Patents